US009000675B2

(12) United States Patent
Chang et al.

(10) Patent No.: US 9,000,675 B2
(45) Date of Patent: Apr. 7, 2015

(54) TRANSMITTING AND RECEIVING DIGITAL AND ANALOG SIGNALS ACROSS AN ISOLATOR

(71) Applicant: Avago Technologies General IP (Singapore) Pte. Ltd., Singapore (SG)

(72) Inventors: Kwee Chong Chang, Singapore (SG); Jia Peng, Singapore (SG); Gek Yong Ng, Singapore (SG); Kok Keong Richard Lum, Singapore (SG)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/333,411

(22) Filed: Jul. 16, 2014

(65) Prior Publication Data

US 2014/0328427 A1  Nov. 6, 2014

Related U.S. Application Data

(63) Continuation-in-part of application No. 13/858,789, filed on Apr. 8, 2013, now Pat. No. 8,847,503, which is a continuation-in-part of application No. 12/886,672, filed on Sep. 21, 2010, now Pat. No. 8,462,003.

(51) Int. Cl.
*H04B 1/48*  (2006.01)
*H05B 33/08*  (2006.01)
*H04L 27/10*  (2006.01)

(52) U.S. Cl.
CPC ................................. *H04L 27/10* (2013.01)

(58) Field of Classification Search
None
See application file for complete search history.

(56) References Cited

U.S. PATENT DOCUMENTS

| 5,237,310 | A  | * | 8/1993  | Smith ......................... 340/679 |
| 6,181,086 | B1 | * | 1/2001  | Katyl et al. .................. 315/307 |
| 6,225,927 | B1 | * | 5/2001  | Scott et al. .................. 341/110 |
| 6,388,396 | B1 | * | 5/2002  | Katyl et al. .................. 315/294 |
| 6,389,063 | B1 | * | 5/2002  | Kanekawa et al. ........... 375/222 |
| 6,570,343 | B1 | * | 5/2003  | Shoji et al. .................. 315/224 |
| 6,611,553 | B1 | * | 8/2003  | Scott et al. .................. 375/220 |
| 7,009,534 | B2 | * | 3/2006  | Nachamiev et al. .......... 341/110 |
| 7,020,189 | B2 | * | 3/2006  | Sweitzer et al. ............. 375/222 |
| 7,439,764 | B2 | * | 10/2008 | Twigg et al. .................. 326/38 |

(Continued)

FOREIGN PATENT DOCUMENTS

| EP | 1715586   | 10/2006 |
| KP | 100987727 | 10/2010 |

OTHER PUBLICATIONS

Co-pending U.S. Appl. No. 13/858,789, filed Apr. 8, 2013.

(Continued)

*Primary Examiner* — Crystal L Hammond

(57) ABSTRACT

Various embodiments of systems for transmitting and receiving digital and/or analog signals across a single isolator, solid state lighting systems, or DC/DC converter feedback regulation control systems are disclosed. In one embodiment, a first signal may be modulated into a first modulated signal. The first modulated signal is then modulated into a second modulated signal in accordance to a second signal. The second modulated signal is in turn, modulated into a third modulated signal in accordance with a third signal. At least some of the apparatuses, circuits, systems and methods disclosed herein may be implemented using conventional CMOS design and manufacturing techniques and processes to provide, for example, at least one or more integrated circuits.

35 Claims, 30 Drawing Sheets

(56) References Cited

U.S. PATENT DOCUMENTS

| | | | |
|---|---|---|---|
| 7,525,365 B1* | 4/2009 | Henry | 327/307 |
| 7,571,063 B2* | 8/2009 | Howell et al. | 702/60 |
| 7,701,731 B2* | 4/2010 | Dhuyvetter et al. | 363/16 |
| 7,864,546 B2* | 1/2011 | Dhuyvetter et al. | 363/17 |
| 7,920,010 B2 | 4/2011 | Chen | |
| 8,289,011 B2* | 10/2012 | Vigelius | 323/283 |
| 8,462,003 B2* | 6/2013 | Ng et al. | 340/635 |
| 8,552,695 B2* | 10/2013 | Stracquadaini | 323/207 |
| 8,847,503 B2 | 9/2014 | Chang et al. | |
| 2003/0127997 A1* | 7/2003 | Shoji et al. | 315/291 |
| 2008/0279288 A1 | 11/2008 | Crawley et al. | |
| 2011/0019446 A1* | 1/2011 | Wu et al. | 363/79 |
| 2012/0242378 A1 | 9/2012 | Taghivand et al. | |
| 2013/0163688 A1 | 6/2013 | Calvin | |
| 2013/0257527 A1 | 10/2013 | Dong | |

OTHER PUBLICATIONS

"Isolation Technologies for Reliable Industrial Measurements", National Instruments, Sep. 26, 2013, 2013, 1-7.

"Power: Telecom DC/DC Module: Analog Solution", TI.com Block Diagram (SBD), Texas Instruments. http://www.ti.com/solution/power_Telecom_dc_dc_module_analog. pp. 7/9-8/9. 2011.

"Quad-Channel, 2.5 Kv Isolators With Integrated DC-To-DC Converter", Amtel Corporation, 2005, 2005.

"Watchdog IC ATA6025", Amtel Corporation, 2005, 2005.

Avago Technologies, "40 ns Propagation Delay, CMOS Optocoupler", Jun. 10, 2000.

Avago Technologies, "HCNR200 and HCNR201 High-Linearity Optocouplers", Nov. 18, 2008.

Chen, at al., "High Speed Digital Isolators Using Microscale On-Chip Transformers", Elektronik Magazine, Jul. 22, 2003, 1-6.

Coffey, "Analog Transmission Across Digital Barriers", 2006, Bodo's Power, Devices and Components, September, Signal Isolators. Downloaded from website <www.powerguru.org>, 2006, 6 pages.

Hatzidakis, et al., "Multichannel Data Transmission Through a Fiber Optic Cable", URL: //hdl.handle.net/10945/22375> 1987, 1987, 1-105.

Ho, et al., "Ramp Signal Generation in Voltage Mode CCM Random Switching Frequency Buck Converter for Conductive EMI Reduction", IEEE, 2010 pp. 1-4, 2010.

"A Simple Alternative to Analog Isolation Amplifiers," Silicon Labs, 2013, 10 pages.

\* cited by examiner

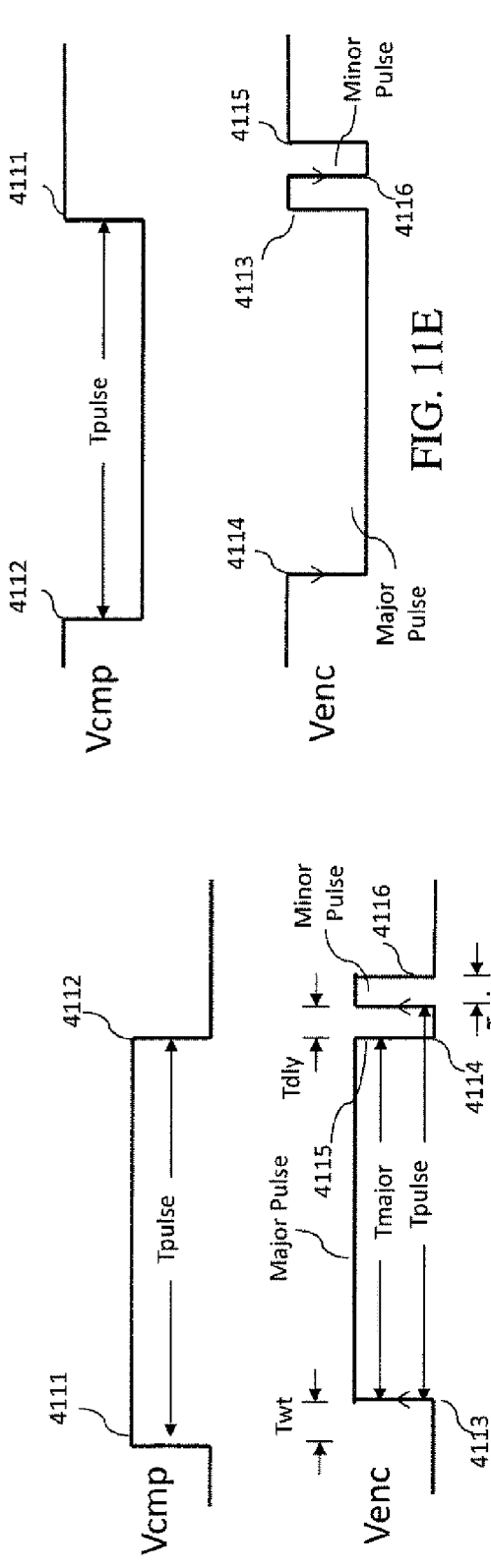
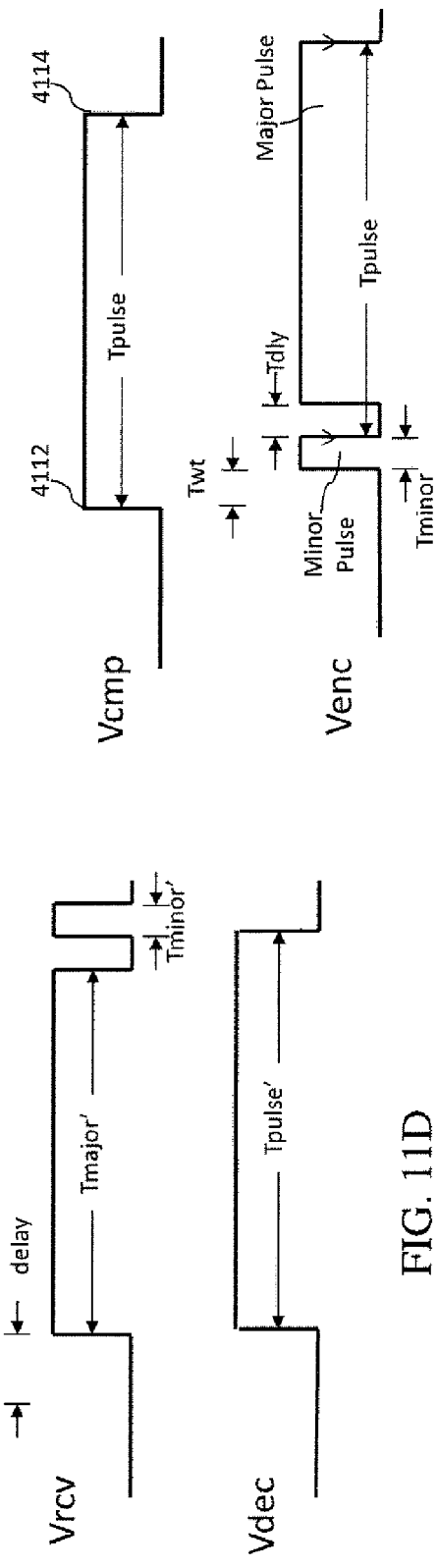
FIG. 11E
FIG. 11F
FIG. 11D

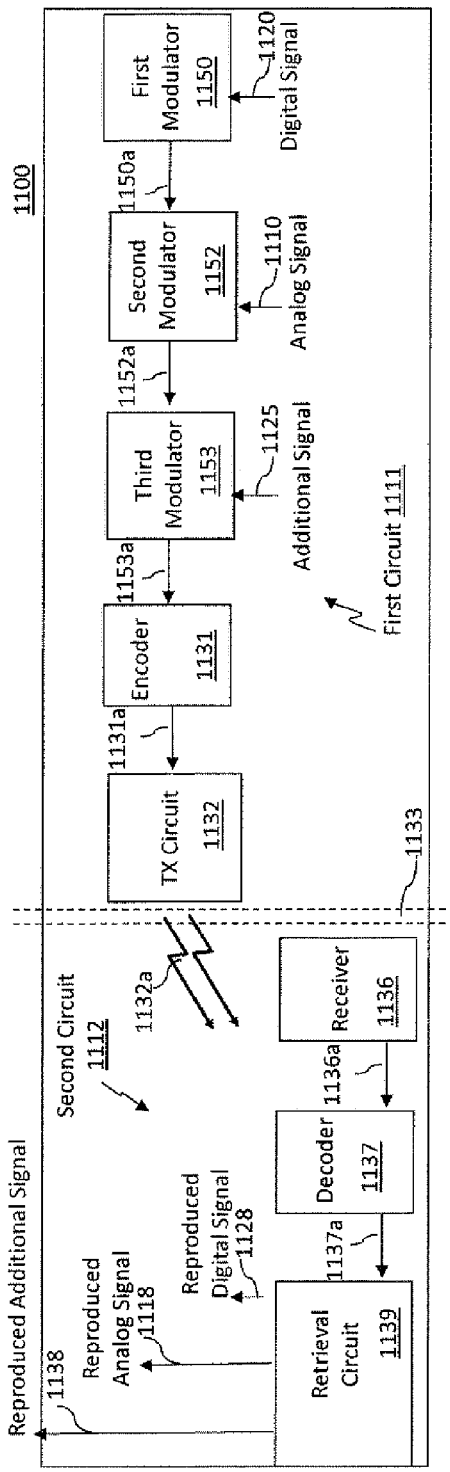
FIG. 22A
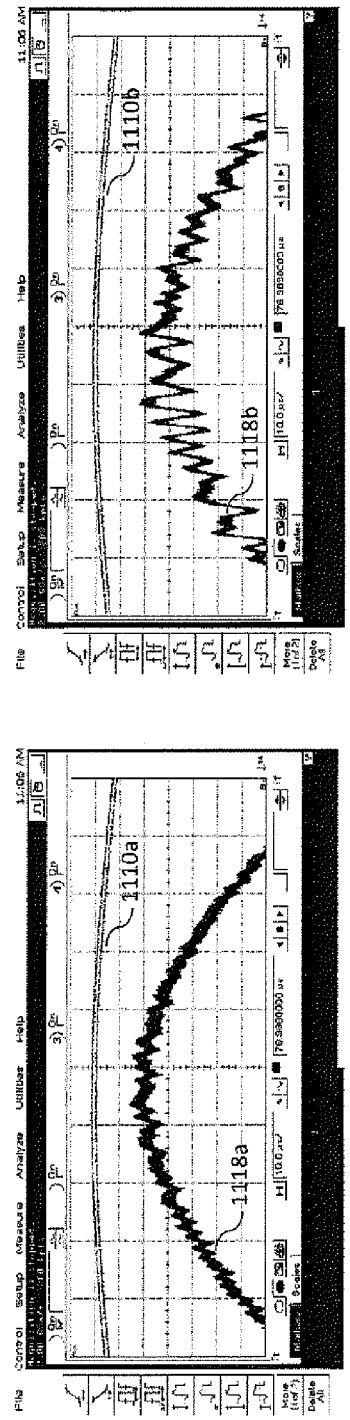
FIG. 22B
FIG. 22C

TRANSMITTING AND RECEIVING DIGITAL AND ANALOG SIGNALS ACROSS AN ISOLATOR

This is a continuation-in-part of U.S. application Ser. No. 13/858,789, filed on Apr. 8, 2013, which is a continuation-in-part of U.S. application Ser. No. 13/886,672 filed on Sep. 21, 2010, now U.S. Pat. No. 8,462,003, all of which are incorporated by reference herein.

FIELD OF THE INVENTION

Various embodiments of the inventions described herein relate to the field of isolators, such as galvanic isolators, and components, devices, systems and methods associated therewith.

BACKGROUND

In an isolated communication system where both analog and digital signals are transmitted across an isolation barrier, two isolation channels are typically required to transmit the two different types of signals across the barrier. Such an isolated communication system is shown in FIG. 1, where input analog signal 10 in isolated communication system 5 is transmitted by transmitter 12 across analog isolator 14 for reception by receiver 16, which in turn generates output analog signal 18, and where input digital signal 20 is transmitted by transmitter 22 across digital isolator 24 for reception by receiver 26, which in turn generates output digital signal 28. The requirement for two different types of isolators in such a system 5 adds to cost. Furthermore, in some cases it is not feasible to employ two isolators in an integrated circuit package due to space constraints.

What is need is an isolated communication system where analog and digital signals can be transmitted and received through a single isolation channel.

SUMMARY

In some embodiments, there is provided a system for transmitting and receiving digital and analog signals across an isolator, comprising a modulator, a transmitter operably connected to the modulator, a signal isolator operably connected to the modulator, a receiver operably connected to the isolator, a frequency discriminator operably connected to the receiver, and a filtering circuit operably connected to the receiver, wherein the modulator is configured to accept as inputs thereto an analog signal and a first digital signal having a first frequency, and the modulator is further configured to modulate the analog signal according to the first frequency and corresponding logic state of the first digital signal to form a frequency-modulated (FM) signal as an output therefrom to the transmitter, the transmitter being configured to encode and transmit the FM signal to the isolator for conveyance thereacross to the receiver as an input thereto, the receiver providing the received FM signal to the frequency discriminator and the filtering circuit, the frequency discriminator being configured to decode the FM signal and provide a reconstructed first digital signal as an output therefrom, the filtering circuit being configured to filter the FM signal and provide the analog signal as an output therefrom.

In other embodiments, there is provided a solid state lighting system comprising, an AC/DC rectification circuit operably connectable to a source of AC voltage as an input thereto, and configured to provide a rectified DC output voltage, an isolation transformer comprising a switched mode power supply (SMPS) controller, the transformer being configured to receive the rectified DC output voltage as an input thereto and to provide an isolated DC output voltage therefrom, a lighting circuit comprising at least first and second pluralities of LEDs connected in series and driven by the isolated DC output voltage, a current sensing circuit being operably connected to a current sensing node in the lighting circuit and configured to provide a sensed current signal as an output therefrom, a voltage sensing circuit arranged in parallel with respect to the lighting circuit and comprising a voltage sensing node disposed between first and second resistors of a voltage dividing network, the voltage monitoring circuit being configured to provide a voltage monitoring signal as an output therefrom through the voltage sensing node, a first comparator configured to receive as inputs thereto the voltage monitoring signal and a first reference voltage, the first comparator being configured to generate a fault state output signal when the voltage monitoring signal exceeds or falls below a predetermined threshold, a triangle wave generator circuit having as an input thereto the output signal of the first comparator, the triangle wave generator being configured to generate a triangle wave output signal having a first frequency when an output signal corresponding to the fault state is received thereby, and a triangle wave signal having a second frequency when the fault state output signal is not received thereby, a second comparator configured to receive as inputs thereto the triangle wave output signal and the sensed current signal, the second comparator being configured to generate a modulated output signal comprising the sensed current signal and the triangle wave output signal, and an optical isolator circuit configured to receive as an input thereto the modulated output signal, the isolator comprising an LED driver operably connected to the output of second comparator, the LED driver providing optical output signals, the isolator further comprising a photodetector configured to generate current in response to the LED driver providing the optical output signals thereto.

In further embodiments, there is provided a DC/DC converter feedback regulation control system comprising a DC/DC converter configured to receive a first DC input voltage and to provide a regulated second DC output voltage, an isolation transformer comprising a switched mode power supply (SMPS) controller, the transformer being configured to receive the second DC voltage as an input thereto and to provide an isolated DC output voltage therefrom, a load circuit driven by the isolated DC output voltage, a current fault generation circuit being operably connected to a current sensing node in the load circuit and configured to provide a current fault signal as an output therefrom through the current sensing node when the sensed current falls below or exceeds a first predetermined threshold, a voltage sensing circuit arranged in parallel with respect to the load circuit and comprising voltage sensing and feedback nodes disposed between first and second resistors of a voltage dividing network, the voltage monitoring circuit being configured to provide voltage monitoring and feedback signals as outputs therefrom through the voltage sensing and feedback nodes, respectively, a first comparator configured to receive as inputs thereto the voltage monitoring signal and a first reference voltage, the first comparator being configured to generate a voltage fault state output signal when the voltage monitoring signal exceeds a predetermined threshold, a triangle wave generator circuit having as inputs thereto the output signal of the first comparator and the current sensing node, the triangle wave generator being configured to generate a triangle wave output signal having a first frequency when an output signal corresponding to no voltage or current fault state is received thereby, a triangle wave signal having a second frequency when the voltage fault state output signal is received thereby, and a triangle wave signal having a third frequency when the current fault state output signal is received thereby, a second comparator configured to receive as inputs thereto the triangle wave output signal and the voltage feedback signal, the second comparator being configured to generate a modulated output signal comprising the triangle wave output signal and the voltage feedback signal, and an optical isolator circuit configured to receive as an input thereto the modulated output signal, the isolator comprising an LED driver operably connected to the output of second comparator, the LED driver providing optical output signals, the isolator further comprising a photodetector configured to generate current in response to the LED driver providing the optical output signals thereto.

Further embodiments are disclosed herein or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

FIG. 11D shows waveforms of outputs of encoder and decoder;

FIG. 11E shows waveforms of alternative outputs of encoder and decoder;

FIG. 11F shows waveforms of an alternative encoded signal where the minor pulse precedes the major pulse;

FIG. 22A shows a block diagram illustrating an additional modulation scheme of an isolation system;

FIG. 22B shows measurement results of an isolator system having a high-resolution modulator;

FIG. 22C shows measurement results of an isolator system having a low-resolution modulator;

The drawings are not necessarily to scale. Like numbers may refer to like parts or steps throughout the drawings, unless otherwise noted.

DETAILED DESCRIPTIONS OF SOME EMBODIMENTS

Figure 1:
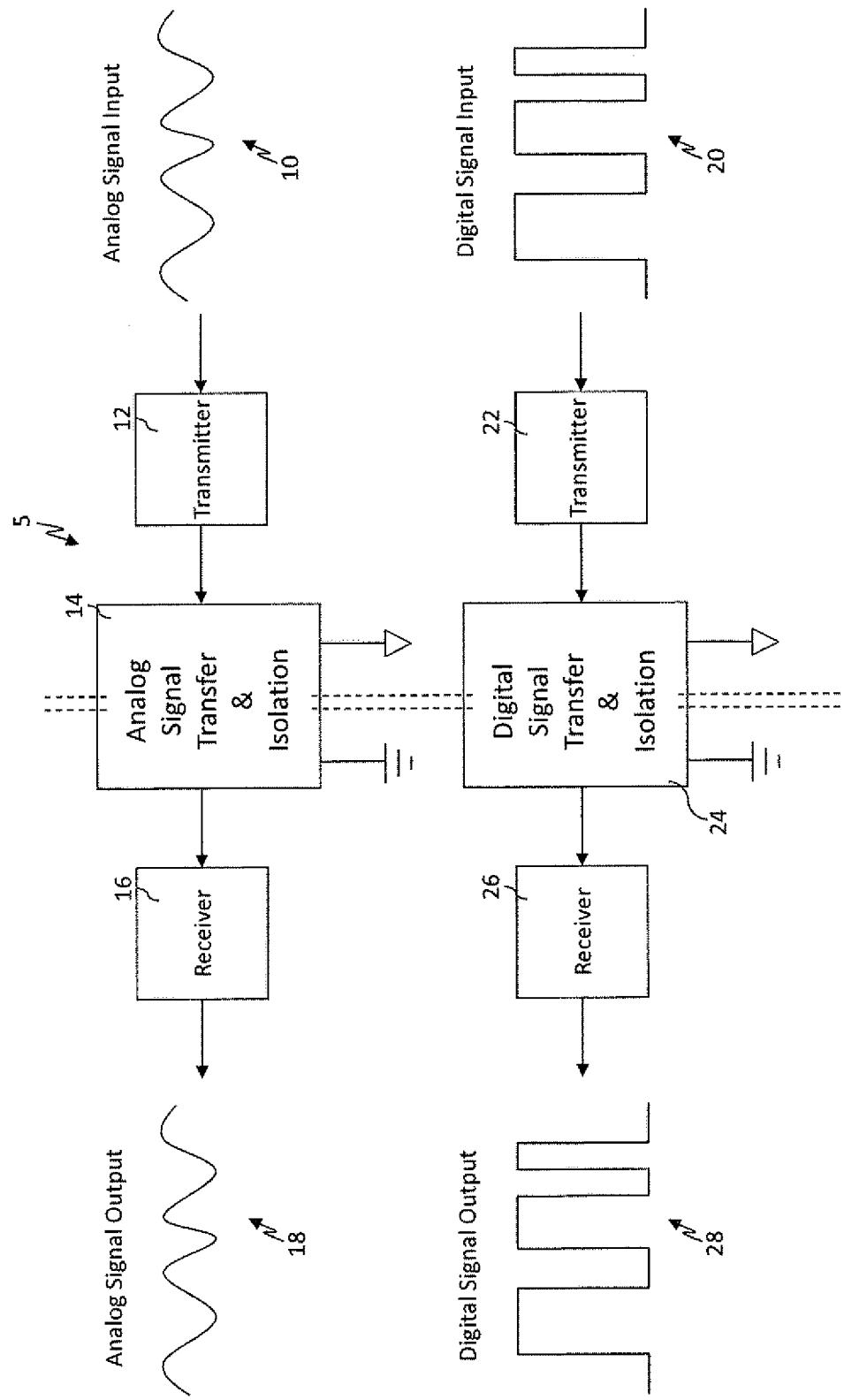
FIG. 1 shows an isolated communication system of the prior art.
Figure 2:
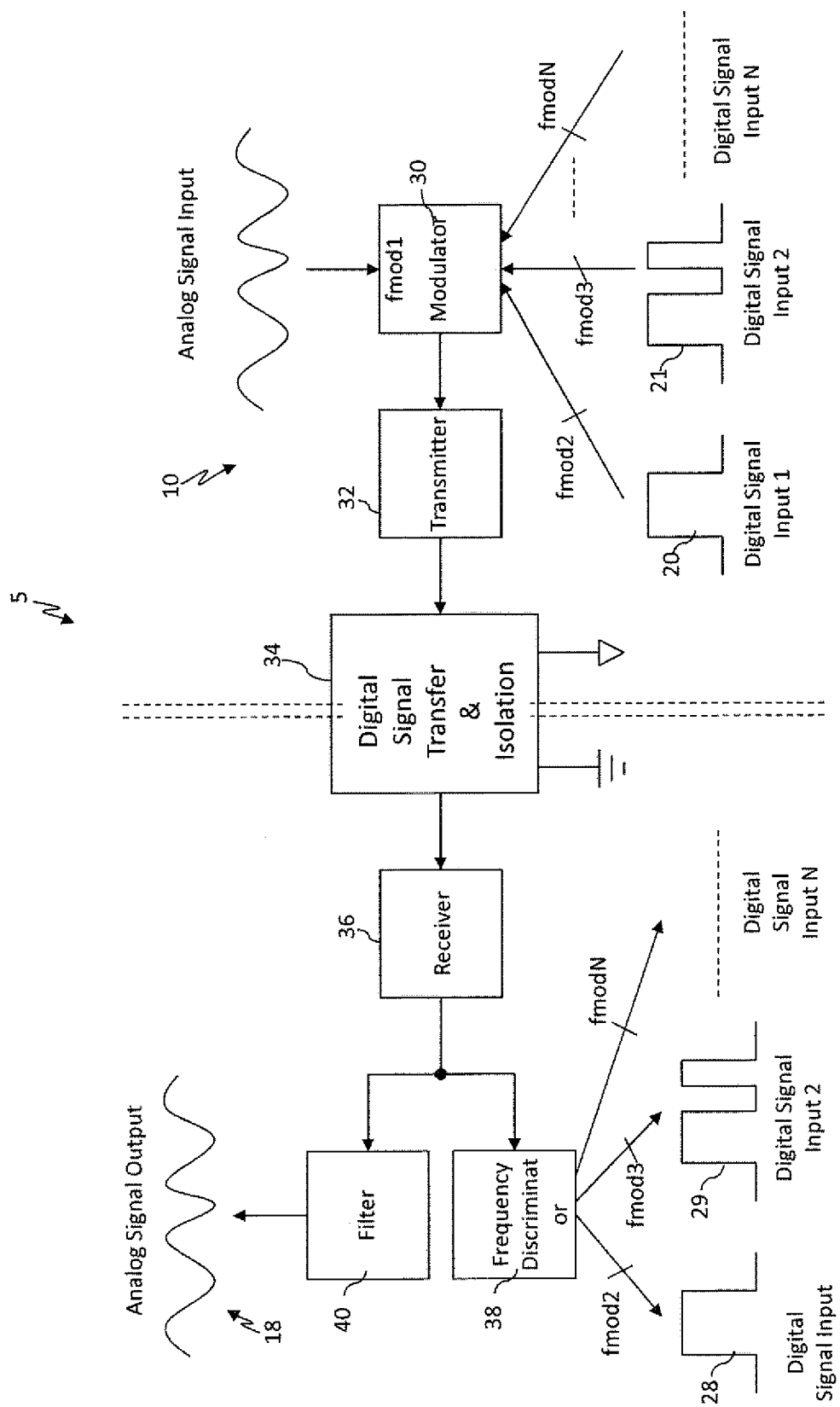
FIG. 2 shows a block diagram of one embodiment of an isolated communication system.

FIG. 2 shows a block diagram of one embodiment of an isolated communication system 5, which employs a single digital isolator for transmitting and receiving both analog and digital signals. Analog signal 10 is converted into a digital signal by modulator 30, which modulates analog signal 10 at a first frequency fmod1. This modulation frequency can be changed according to the status of one or more of digital input signals 1, 2, ... N.

In a situation where only one digital signal is to be sent across isolation barrier 34, when digital input signal input 1 (or 20) is at a logic low level, the modulation frequency remains at fmod1. Analog input signal 10 is then modulated by modulator 30 in accordance with a digital signal having a frequency of fmod1. If digital input signal input 1 (or 20)

changes to a logic high level, the modulation frequency is changed by modulator 30 to a second frequency fmod2. Analog input signal 10 is then modulated in accordance with the second frequency fmod2. In such a manner, digital input signal 1 is embedded into analog input signal 10, which is translated to a frequency modulated (FM) signal. This FM signal is routed through transmitter 32 and sent through digital isolator or barrier 34. On the other side of isolator 34, receiver 36 receives the transmitted signal, which is then filtered to recover the analog signal to generate analog output signal 18. At the same time, the received signal is also routed through frequency discriminator 38 to detect and recover the embedded digital signal.

In general, more than one digital signal input may be transmitted through digital isolator or barrier 34, in which case the modulation frequency is changed by modulator 30 according to the state of each of the transmitted digital signals. For successful decoding of analog and digital signals, frequencies fmod1, fmod2, . . . , fmodN should all be selected to lie outside the passband of filter 40. In addition, frequencies fmod1, fmod2, . . . , fmodN should be sufficiently well separated from one another such that frequency discriminator 38 can distinguish between the various frequencies.

Figure 3:
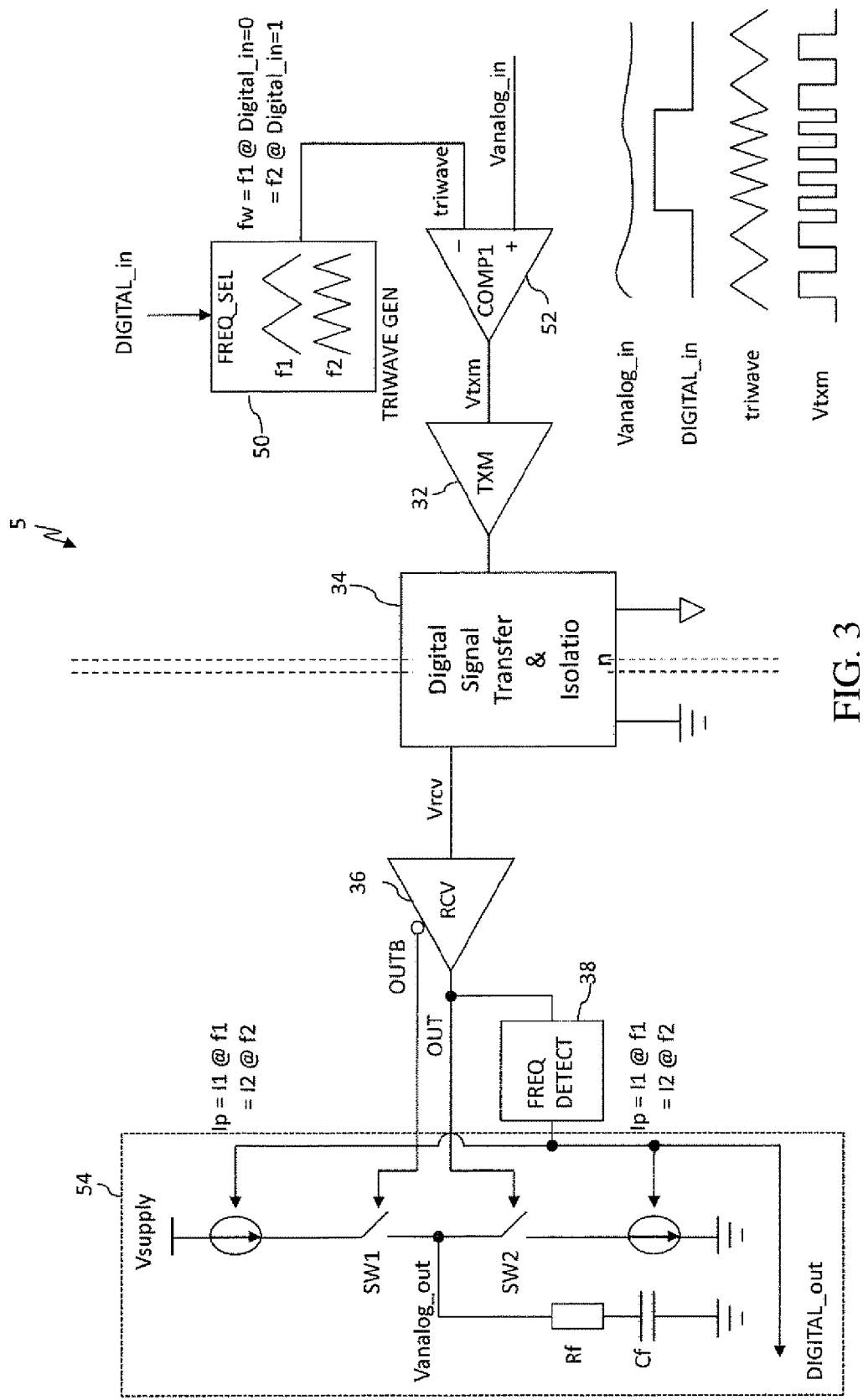
FIG. 3 shows a block diagram of another embodiment of an isolated communication system.

FIG. 3 shows a block diagram of another embodiment of an isolated communication system 5. FIG. 3 shows one embodiment of circuitry configured to multiplex the analog and digital input signals through a single digital isolator or barrier 34. The analog input signal, Vanalog_in, is connected to the positive input of comparator COMP1 (or 52). The negative input signal of COMP1 is connected to the output of triangle wave generator TRIWAVE GEN 50. The digital input signal DIGITAL_in controls the FREQ_SEL input of TRIWAVE GEN 50, which determines the frequency of the triangle wave output provided thereby. When DIGITAL_in is at logic low, the triangle wave oscillates at a first frequency f1. When digital input signal DIGITAL_in is in a logic high state, the triangle wave oscillates at a second frequency f2. The waveforms at the various nodes indicated in the lower right-hand portion of FIG. 3 show the effect of modulation on the output signal Vtxm transmitted by COMP1. On the receiving side, the receiver replicates the transmitted signal at its output, and this output is then used to control switches SW1 and SW2 of charge pump circuit 54. For example, when signal OUT provided by receiver 36 is in a low state and signal OUTB is in a high state, SW1 turns on and charges the RC loop filter, which comprises resistor Rf and capacitor Cf. When signal OUT is in a high state and signal OUTB is in a low state, SW2 turns on and discharges the RC loop filter. The rate of turning on and off of switches SW1 and SW2 thus depends on the frequency of the received signal Vrcv. The charge pump current Ip provided by charge pump current 54 also depends on the frequency of Vrcv. When Vrcv switches at frequency f1, charge pump circuit 54 switches at a rate of f1 with a current of I1. When Vrcv switches at frequency f2, charge pump circuit 54 switches at a rate of f1 with a current of I2. The relationship between the charge pump current Ip and the switching frequency is such that when f2=A·f1, then I2=A·I1. This ensures that the charge pump current Ip is scaled such that the charging or discharging time constant associated therewith is not affected by a change in the switching frequency, and thus the characteristics of the output analog signal, Vanalog_out, are preserved. This ensures that loop dynamics and system behaviour are not modified. The filtered analog signal Vanalog_out therefore represents faithfully the original analog input signal, Vanalog_in, which is preserved and reproduced regardless of additional modulation provided by the embedded digital signal. To recover the embedded digital signal, the receiver output is provided to frequency detector FREQ DETECT 38, which discriminates between frequencies f1 and f2 and reproduces the input digital signal DIGITAL_in as output digital signal DIGITAL_out.

Figure 4:
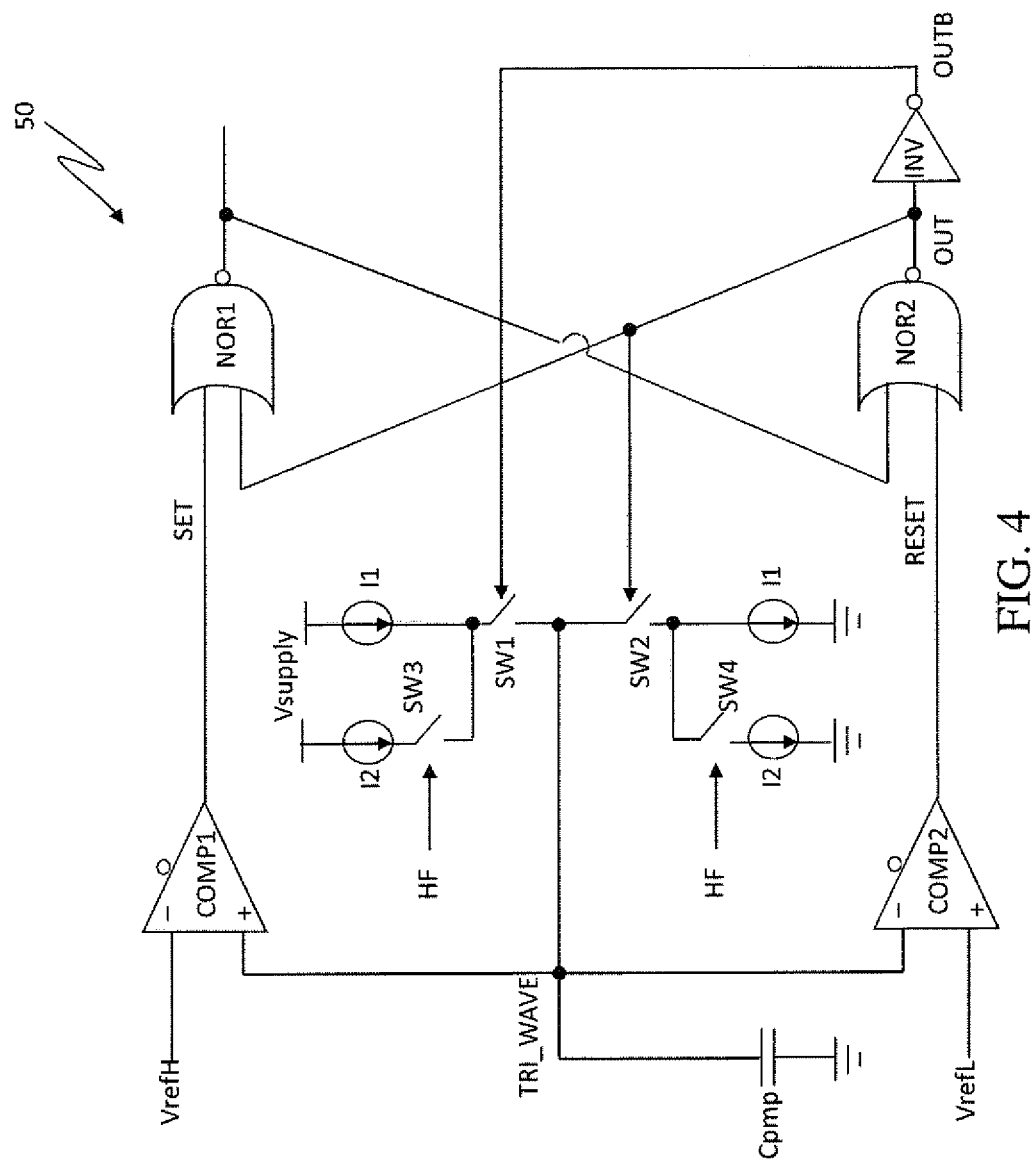
FIG. 4 shows one embodiment of circuitry corresponding to circuit TRIWAVE GEN 50 of FIG. 3.
Figure 5:
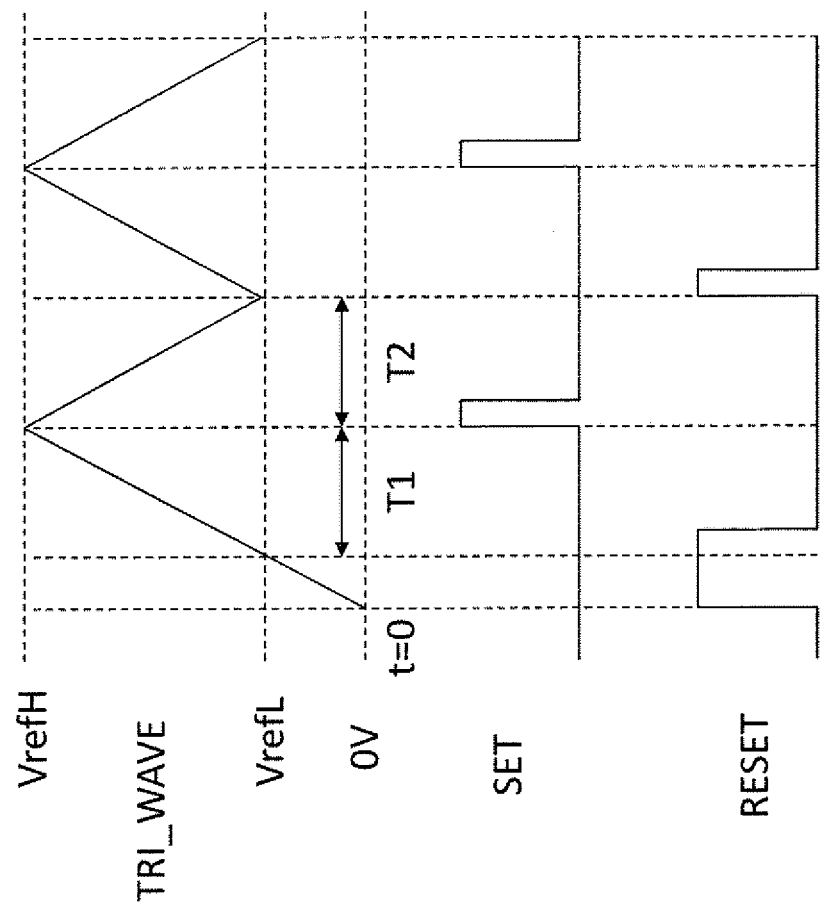
FIG. 5 shows waveforms generated at various nodes of the circuitry of FIG. 4.

FIG. 4 shows one embodiment of circuitry corresponding to circuit TRIWAVE GEN 50 of FIG. 3. Note that other embodiments of circuitry for TRIWAVE GEN 50 are contemplated, in addition to that shown in FIG. 4. FIG. 5 shows waveforms generated at various nodes of the circuitry of FIG. 4. The triangle wave generator circuit of FIG. 4 comprises two comparators, a charge pump circuit and an RS latch. Circuit 50 of FIG. 4 generates an output signal TRI_WAVE, which is a triangle wave with a peak-to-peak voltage level extending between VrefL and VrefH. These two reference levels, VrefL and VrefH, are the threshold voltages corresponding to the two comparators. At time t=0, and assuming the capacitor Cpmp starts up with zero charge, RESET goes high causing OUT to go low and OUTB to go high. Switch SW1 then turns on and SW2 turns off. The charge pump sources current into Cpmp and so circuit TRIWAVE 50 charges up at a rate determined by the source current and Comp. As circuit TRI_WAVE 50 charges up and reaches VrefH, SET goes high causing OUT to go high and OUTB to go low. Switch SW1 then turns off and SW2 turns on. The charge pump sinks current from Cpmp and so circuit TRI_WAVE 50 discharges at a rate determined by the sink current and Cpmp. As shown in FIG. 5, if the source and sink currents have the same value I1, then the charge and discharge times are the same, which is given by:

$$T1=T2=(VrefH-VrefL)*Cpmp/I1 \qquad \text{(eq. 1)}$$

To change the frequency of the triangle wave, such as for example to a higher frequency, control signal HF controlling switches SW3 and SW4 can be set high. This turns on both SW3 and SW4, and increases both the source and the sink currents of the charge pump. As a result, the capacitor Cpmp charges and discharges faster, and circuit TRI_WAVE 50 then oscillates between the two levels VrefL and VrefL at a higher rate.

In some embodiments directed to solid state lighting applications, light emitting diodes (LEDs) are used as a light source, a linear optocoupler is used for optical isolation, and linear feedback control of the LED current is employed to precisely control the LED current. In the event of LED failure, however, such information typically is not fed back to a controller to report a fault condition so that the system can be shut down to save power and the faulty LED can be replaced. In the case of LEDs connected in a series stack, such a result can lead to degradation of luminous intensity or uneven luminosity in the array of LEDs. This problem may be addressed by multiplexing isolated signal sensing in combination with fault feedback through a single optocoupler. Such a system can therefore react and respond appropriately to a fault condition. For example, a controller can be configured to shut down the system to save power until the faulty LED bulb is replaced.

Figure 6:
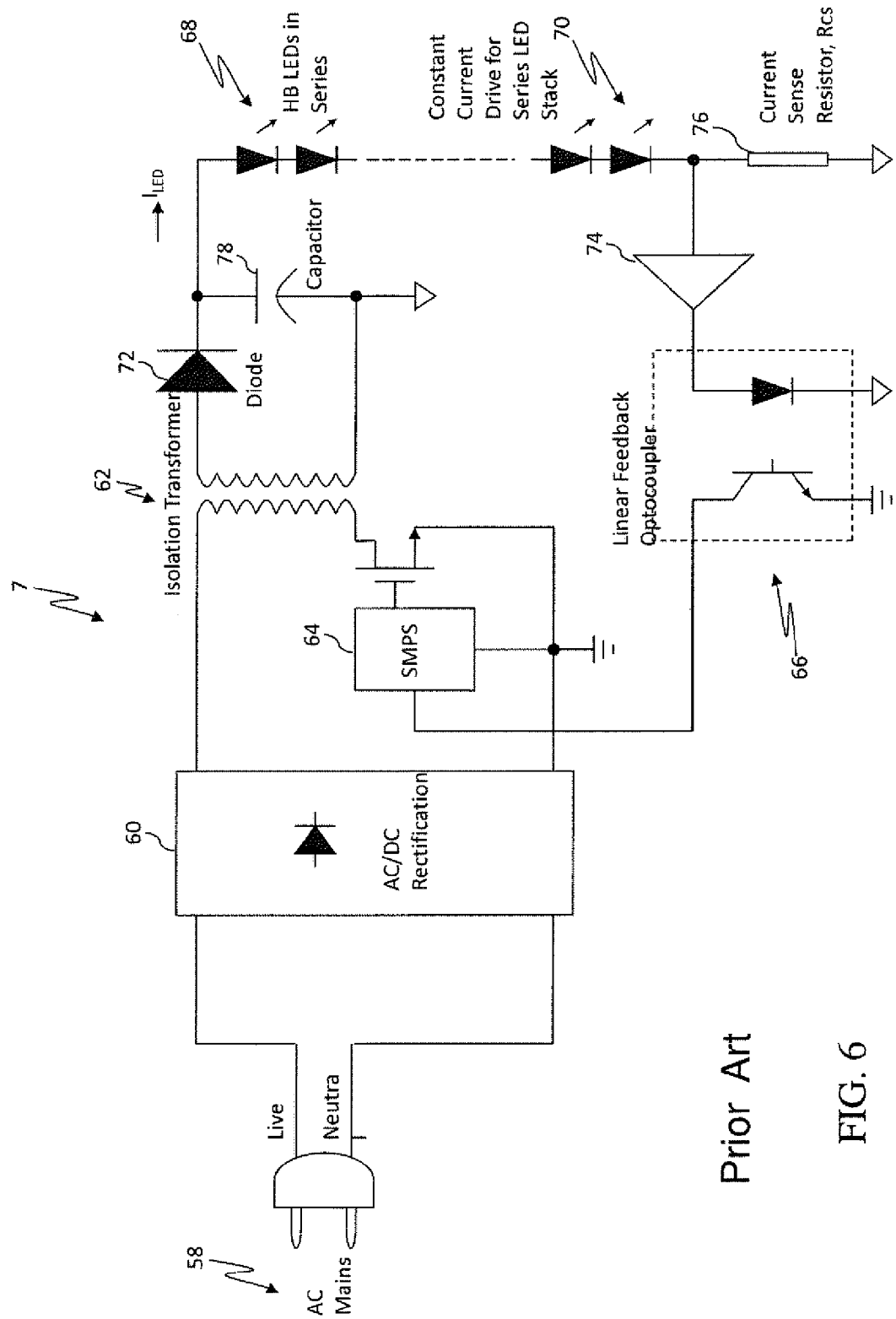
FIG. 6 shows one prior art implementation of a solid state lighting system.

FIG. 6 shows one prior art implementation of a solid state lighting system 7 which employs analog linear signal feedback, but which is not capable of providing fault sensing and feedback through linear feedback optocoupler 66. System 7 of FIG. 6 comprises a power generation circuit, LEDs 68 and 70 in a series stack, and linear feedback optocoupler 66 for loop regulation of the LED current. The power generation circuit consists of AC-to-DC rectification block 60, an isolated flyback converter comprising switched mode power supply (SMPS) controller 64, transformer 62, diode 72 and output capacitor 78. LEDs 68 and 70 are usually connected in a series stack so that a constant current flows through all the LEDs to provide a constant level of brightness. The LED current develops a voltage drop across current sense resistor Rcs. The resulting analog voltage level is sensed through linear feedback optocoupler 66 and provided to SMPS controller 64 to regulate the system response. The failure mode of any of LEDs 68 and 70 can occur as an open or short circuit, and a fault condition occurs when one or more of LEDs of LEDs 68 and 70 in the stack fail. In the undesirable situation where an LED fails by short-circuiting, the faulty bulb will continue to draw power and its loss of luminance will go undetected by system 7.

Figure 7:
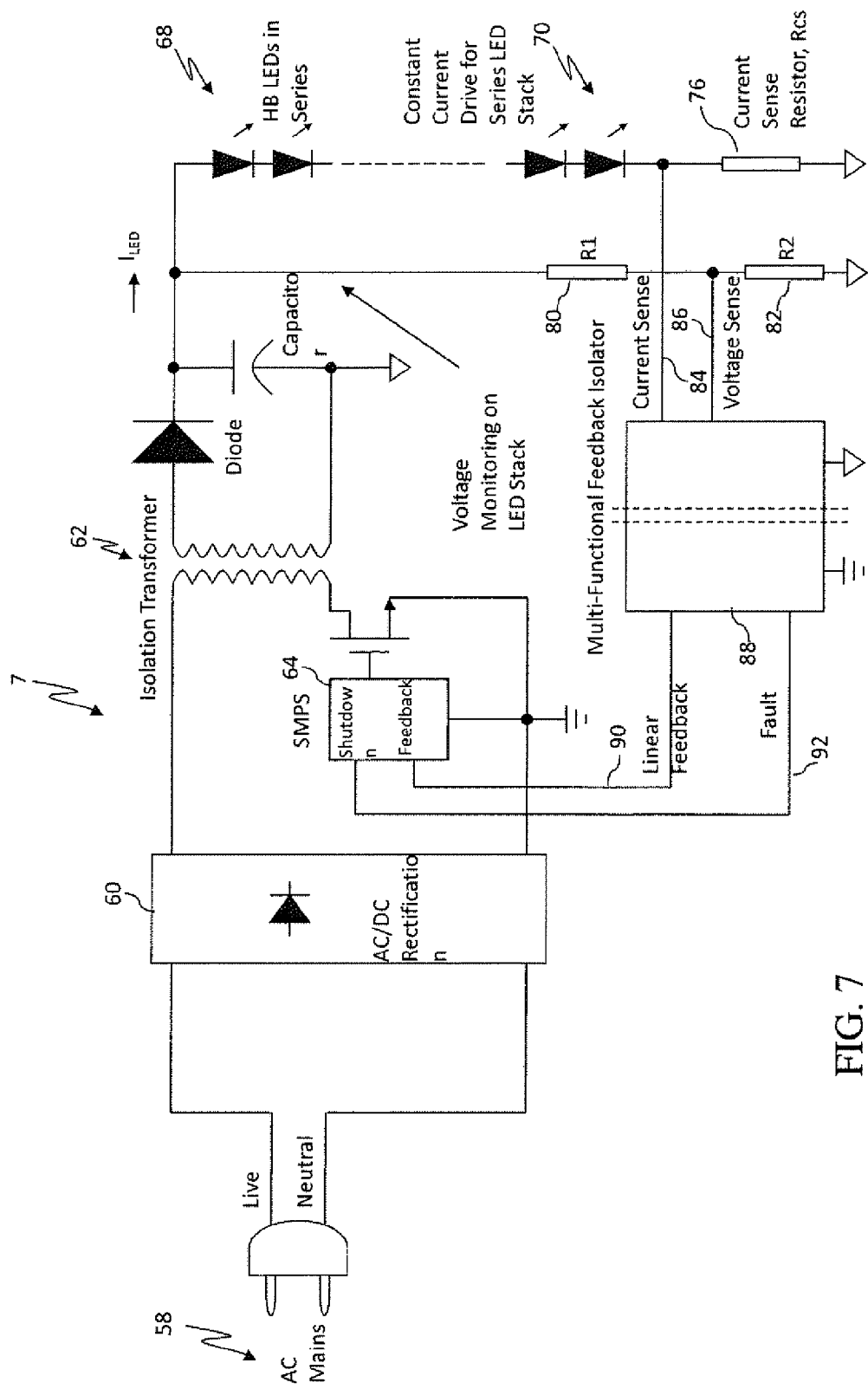
FIG. 7 shows one embodiment of a solid state lighting system 7.

FIG. 7 shows one embodiment of a solid state lighting system 7 that overcomes some of the problems of solid state lighting system 7 of FIG. 6. IN FIG. 7, system 7 incorporates linear feedback for loop control and voltage sensing for LED fault management in an isolated solid state lighting system. Compared to system 7 of FIG. 6, besides the linear feedback of the LED current level through resistor Rcs, an additional resistor divider network comprising resistors R1 and R2 provides voltage monitoring of the overall voltage of the LED stack comprising LEDs 68 and 70. Such voltage monitoring is achieved by feeding back the voltage sense level developed by the resistor divider network through multi-functional feedback isolator 88. Because the forward voltage drop of an LED is generally fairly consistent, the total forward voltage drop of a series stack of LEDs can be determined and regulated by the feedback loop. If a fault condition occurs, where for example one or more LEDs 68 and 70 fails by short-circuiting, a drop in the voltage sense level is detected and fed back to switched mode power supply (SMPS) controller 64. In such a manner, system 7 shown in FIG. 7 is configured to provide LED fault information to controller 64 so that system 7 can be shut down to conserve power until the fault condition can be remedied.

Figure 8:
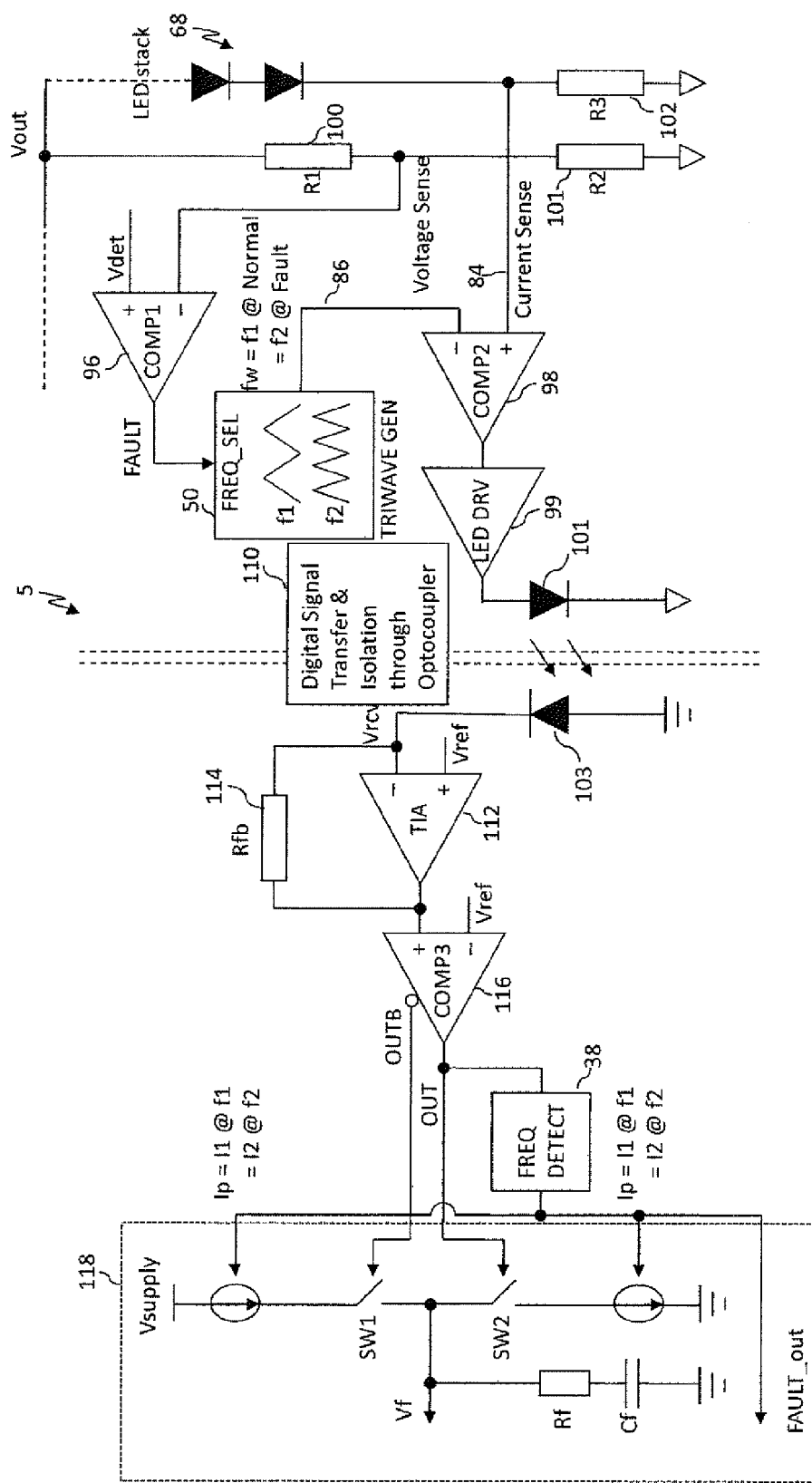
FIG. 8 shows one embodiment of circuitry configured to multiplex linear signal feedback with fault sensing through a single optocoupler in an isolated solid state lighting system.

FIG. 8 shows one embodiment of circuitry configured to multiplex linear signal feedback with fault sensing through a single optocoupler in an isolated solid state lighting system. The functional blocks to monitor the LED current and voltage levels comprise a first comparator COMP1 (96) to monitor the voltage sense level, a second comparator COMP2 (98) to detect the current sense level, and a triangle wave generator circuit TRIWAVE GEN 50, which outputs a triangle wave with a frequency determined by the FAULT input. Comparator COMP1 (96) has its positive input connected to a reference voltage Vdet and its negative input connected to the LED voltage sense level. The voltage sense level is determined by the ratio set by the resistor divider network comprising resistors R1 and R2. When LED stack comprising LEDS 68 is operating normally, the voltage sense level is designed to be higher than the LED under-voltage reference level Vdet by less than the forward voltage drop of a LED. Hence, the status of the FAULT signal which is provided by the output of COMP1 (96) is in a low state under normal operating conditions. The FAULT signal controls the frequency selection pin FREQ_SEL of circuit TRIWAVE GEN 50. When FAULT is in a low state, the triangle wave frequency generated oscillates at a first frequency f1. This triangle wave is then connected to the negative input of the second comparator COMP2 (98), which has its positive input connected to the LED current sense level. As a result, the current sense level is modulated by the triangle wave and is converted to a digital format at the output of COMP2 (98). The output of COMP2 (98) produces a pulse-width-modulated digital signal having a duty cycle representing the analog current sense level. The frequency of this pulse-width-modulated signal is the same as that of the triangle wave. In the event of an LED failure, when for example one or more LEDs in stack 68 fail by short-circuiting, the voltage sense level drops below its normal level, and triggers comparator COMP1 (96) to cross the Vdet threshold and to register a high state with respect to the FAULT status. FREQ_SEL is then driven high and causes the triangle wave frequency to switch to a second frequency f2. As a result, the pulse-width-modulated signal provided at the output of COMP2 (98) has its frequency switched to f2. The duty cycle of the output signal provided by COMP2 (98) remains the same as in the case of normal operation, however, because the current sense level, which is a product of the LED current through LED stack 68 and resistor R3, is not affected by the drop in the LED stack voltage. The output of COMP2 (98) is then provided to LED driver LED DRV 99, which turns LED 101 connected to its output on or off depending on whether the output of COMP2 (98) is high or low.

On the receiving side, photodiode 103 is turned on when light generated by LED 101 is in the on state shines thereon. The photodiode current provided by photodiode 103 is detected by transimpedance amplifier TIA 112 having its negative input connected to photodiode 103. The photodiode current flows through the TIA feedback resistor Rfb, which is translated into a voltage signal at the output of TIA 112. Thus, TIA 112 outputs a delayed version of the exact data pattern received from the transmitting side. When the output voltage level of TIA 112 is larger than the comparator COMP3 (116) reference level Vref connected at its negative input, the output of COMP3 116 switches to the logic high level. The outputs of COMP3 116 are used to control switches SW1 and SW2 of charge pump circuit 118. For example, when OUT of COMP3 116 is in the low state and OUTB of COMP3 (116) is in the high state, SW1 turns on and charges the RC loop filter, which comprises resistor Rf and capacitor Cf. When OUT is high and OUTB is low, SW2 turns on and discharges the RC loop filter. The rate of at which switches SW1 and SW2 are turned on and off thus depends on the frequency of the received signal Vrcv. The charge pump current Ip also depends on the frequency of Vrcv. When Vrcv switches at frequency f1, charge pump circuit 118 switches at a rate f1 with a current I1. When Vrcv switches at frequency f2, charge pump circuit 118 switches at a rate f2 with a current of I2. The relationship between the charge pump current I1 and the switching frequency is such that when f2=A·f1, I2=A·I1. This ensures that charge pump current I1 is scaled such that the charge or discharge time constant associated therewith is not affected by a change in the switching frequency. Thus, the characteristics of the output analog signal, Vf, are preserved, and ensure that the loop dynamics and system behaviour are not modified. The filtered analog signal Vf thus represents the input analog current sense signal level, which is preserved regardless of additional modulation associated with the embedded digital signal. The Vf voltage level is then fed back to the SMPS controller to regulate the converter. To recover the embedded FAULT digital signal, the output of COMPS (116) is provided to frequency detector FREQ DETECT 38, which discriminates between frequencies f1 and f2 to reproduce the digital signal at FAULT_out. In such a manner, the regulation and feedback loop operates as usual without being disrupted by the feedback FAULT signal. Using FAULT feedback information, however, the SMPS controller can then be configured to shut down system 7 when a failure event occurs.

Figure 9:
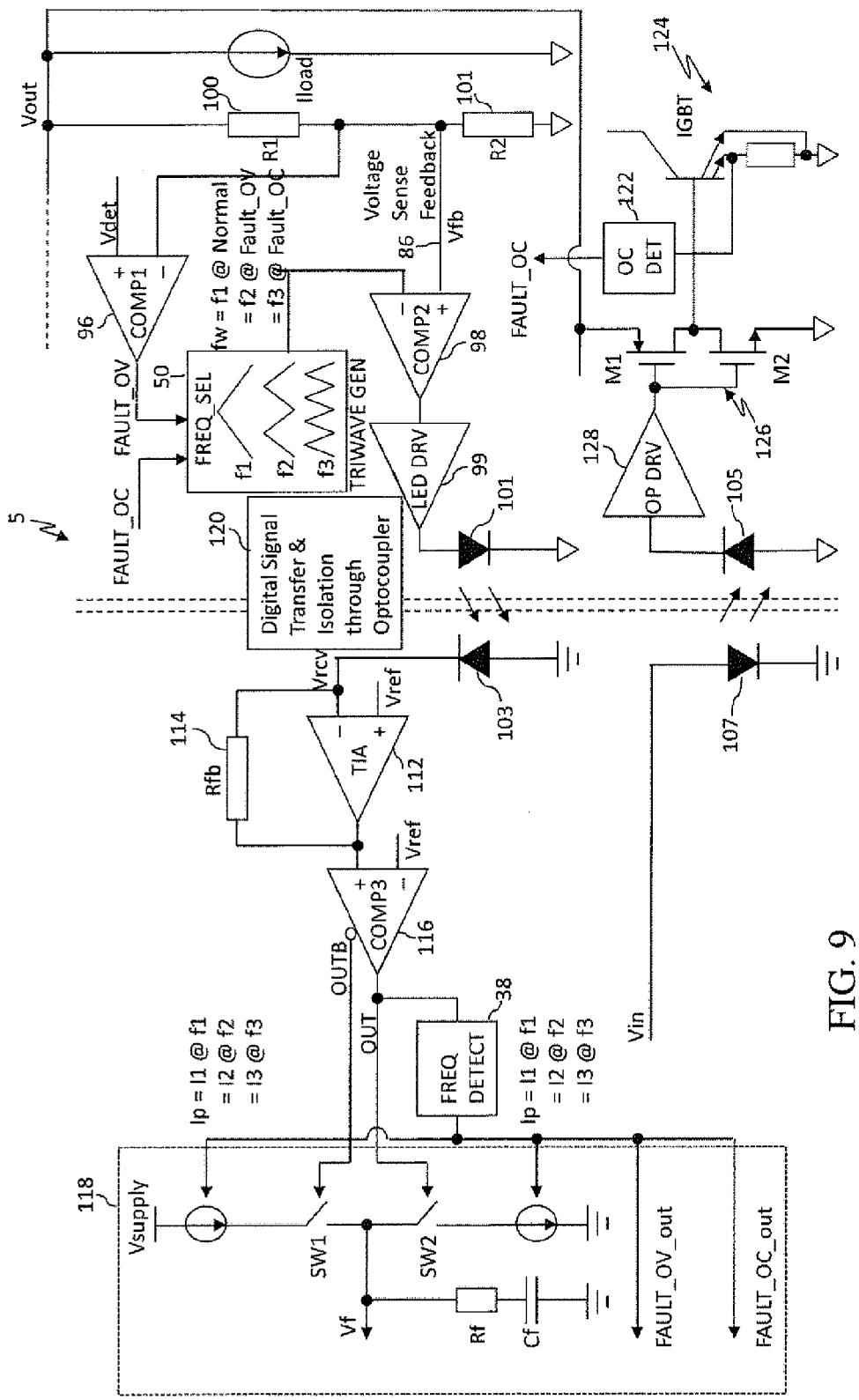
FIG. 9 shows an embodiment of an optically isolated gate driver integrated with a DC-DC converter.

FIG. 9 shows an embodiment of an optically isolated gate driver integrated with a DC-DC converter, where more than one digital feedback signal is provided together with an analog signal. In such an implementation, the output of the DC-DC converter, Vout, serves as the supply to the gate driver comprising transistors M1 and M2 (126). The output of the gate driver in turns drives the external insulated gate bipolar transistor (IGBT or 124). The regulation of the DC-DC converter loop is via a voltage sense feedback node at Vfb, which is provided by a resistor divider network comprising resistors R1 and R2. Under normal operation, circuit TRIWAVE GEN 50 outputs a triangle wave having a frequency f1, which modulates the feedback voltage Vfb into a pulse-width-modulated digital signal which appears at the output of comparator COMP2 (98). Through LED driver 99, a digitized version of the analog feedback signal Vfb is sent across by means of optical isolation to the receiving side. After going through TIA amplifier 112 and comparator COMP3 (116), and after being filtered by the action of charge pump circuit 118 and its corresponding loop filter, the digitized signal is converted back into an analog signal as analog signal Vf. Analog signal Vf is then fed back to the SMPS controller to regulate the output Vout of the converter loop. In such an embodiment, the digital input signals that are to be multiplexed with the analog input signal across isolator or barrier 120 can be configured to include two fault events. One such fault event can correspond to the detection of an over-voltage condition at the Vout voltage level, which may be provided by comparator COMP1 (96) with a threshold set at the over-voltage level, and a status provided by output FAULT_OV. Another fault can correspond to the detection of an over-current condition of IGBT 124, which may be provided by over-current detection circuit OC DET (122), and a status provided by output FAULT_OC. The two fault outputs FAULT_OV and FAULT_OC are then employed to alter the frequency at which the output of circuit TRIWAVE GEN 50 is modulated. For example, if FAULT_OV is in a high state to indicate an output over-voltage condition, the modulation frequency is switched from the normal rate of f1 to a rate of f2. If FAULT_OC is in a high state to indicate IGBT 124 is in an over-current condition, the modulation frequency is switched to a rate of f3. At the receiving end, frequency discriminator block FREQ DETECT 38 determines the presence of either of frequencies f2 and f3, or both, and updates the status of the recovered outputs FAULT_OV out and FAULT_OC_out accordingly. In such a manner, the SMPS controller is configured to determine the best course for system 5 to follow based on such fault status feedback signals. Note that the occurrence of a fault event does not disrupt the normal operation of the DC-DC converter operation, as the digital fault signals are merely embedded in a digitized format for feedback, and the filtered output Vf represents the same analog input signal as in the normal operation mode.

The entire signal and fault feedback path of system 5 employs the use of a single digital optocoupler for signal transfer through isolator or barrier 120. This provides a significant advantage compared to using a linear optocoupler because the digital signal transfer does not suffer from LED degradation, which is a major problem in linear signal transfer. Besides using optical isolator 101/103, the embodiment shown in FIG. 9 works well with other isolation media, such as magnetic or capacitive isolators or barriers.

Included within the scope of the present invention are methods of making and having made the various components, devices and systems described herein. At least some of the circuits, systems and methods disclosed herein may be implemented using conventional CMOS design and manufacturing techniques and processes to provide, for example, a single integrated circuit or ASIC.

Various embodiments of the invention are contemplated in addition to those disclosed hereinabove. The above-described embodiments should be considered as examples of the present invention, rather than as limiting the scope of the invention. In addition to the foregoing embodiments of the invention, review of the detailed description and accompanying drawings will show that there are other embodiments of the invention. Accordingly, many combinations, permutations, variations and modifications of the foregoing embodiments of the invention not set forth explicitly herein nevertheless fall within the scope of the invention.

At least some of the circuits, systems and methods disclosed herein may be implemented using conventional CMOS design and manufacturing techniques and processes to provide, for example, a single integrated circuit or ASIC. Therefore, systems and method disclosed herein may also equally applicable to devices or apparatuses implemented using one or more ASICs.

As discussed in FIGS. 2-3 and other previous embodiments, the receiver 36 may be configured to replicate the transmitted signal that is sent across the isolation barrier 34. The replicated transmitted signals 28, 29 may be substantially similar to the digital signal inputs 20, 21 as shown in FIG. 2. As appreciated by a person skilled in the art, using the methods, systems and circuits disclosed in the previously discussed embodiments, the received signals such as digital signals 28, 29 may be theoretically similar to the digital input signals 20, 21, whereas the analog signal output 18 may be theoretically similar to the analog signal input 10.

In actual implementation, the replicated signals 18, 28, 29 may not be actually similar to the respective input signals 10, 20, 21. There may be a limit as to what extend the replicated output signals 10, 20, 21 may resemble or duplicate the input signals 10, 20, 21. For example, there may be pulse width error due to the fact that the analog receiver 36 has a limited bandwidth. The pulse width error may also be referred to as pulse width distortion. In addition, the transmitter 32 and the receiver 36 may be implemented in different semiconductor dies that may introduce errors to the signals due to process variation. The difference may be substantially small. On many occasions, the difference between the replicated output signals 18, 28, 29 and the input signals 10, 20, 21 may be so small that the difference may only be visible using an oscilloscope if users make an attempt to measure or to look for the errors. Therefore, the term "replicate" and "reproduced" used throughout the specification including the previously disclosed paragraphs may mean "attempt to reproduce as exactly as possible".

In the embodiment shown in FIGS. 2-3, the replicated output signals 18 28, 29 may be substantially similar but not exactly the same as the input signals 10, 20, 21. The replicated output signals 28, 29 may have a pulse width error due to the bandwidth of the receiver 36. For example, for one implementation example where the bandwidth of the receiver 36 is 15 MHz, a pulse width error of 23 ns may be observed on the replicated output signals 28, 29 compared to the input signals 20, 21. The pulse width error of 23 ns may be acceptable for many systems with the digital signals 20, 21 having lower frequency. For example, if the bandwidth of the digital signal 20, 21 is 100 kHz, the cycle period of the digital signal 20, 21 may be 1000 ns. Thus, pulse width error of 23 ns which is 2.3% may be negligible. However, for digital signals having higher speed such as 50 MHz, the cycle period of the digital signals 20, 21 may be 20 ns and thus, the pulse width error of 23 ns may be substantial.

The pulse width error may be reduced if the bandwidth of the circuits involving in the signal transmission, for example the modulator 30, the transmitter 32, the receiver 36 and all other circuits previously discussed have higher bandwidth. For example, if the bandwidth of the receiver 36 is improved to 500 MHz, the pulse width error may be substantially reduced. However, this may increase the complexity of the designs and may also increase power consumption of the entire system 5. Another way to achieve higher bandwidth may be by using more advance fabrication technology but this may be at the expense of cost.

Figure 10:
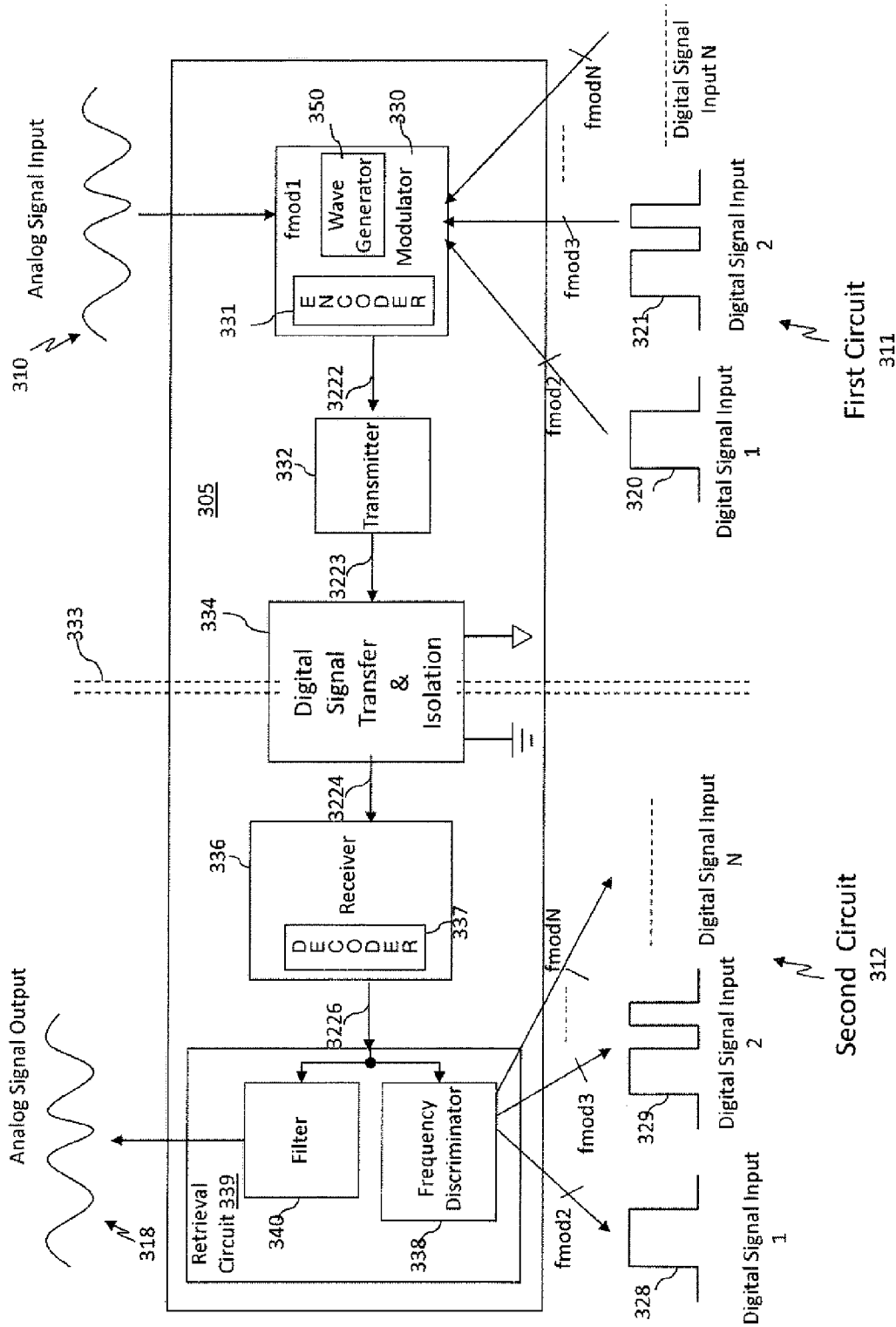
FIG. 10 shows a block diagram of another embodiment of an isolation system.

FIG. 10 illustrates a block diagram of another embodiment of an isolation system 305. The block diagram may be applicable to a circuit, a device, or an apparatus configured to implement the isolation system 305. The isolation system 305 may comprise a first circuit 311 and a second circuit 312 that may be electrically isolated, but components within the first circuit 311, and components within the second circuit 312 may be electrically connected. The first and second circuits 311, 312 may be isolated through an isolation barrier 333. Therefore, electrical signals may not be transmitted across the isolation barrier 333. However, signals may be communicated between the two circuits 311, 312 via optical signals, magnetic signals, wireless electro-magnetic waves, electric fields or any other similar methods that does not involve electrical signals. Therefore, isolation system 305 may also be known as isolated communication system. Previously discussed embodiments shown in FIGS. 2, 3, 7, 8 and 9 are examples of isolation systems 305.

As shown in FIG. 10, the isolation system 305 may comprise a modulator 330, an encoder 331, a transmitter 332, a signal isolator 334, a receiver 336, a decoder 337, and a retrieval circuit 339. Similar to the isolated communication system 5 shown in FIG. 3, the isolation system 305 may be configured to modulate the analog signal 310, and one or more digital signals 320, 321 into a modulated signal 3222 using the modulator 330. In one embodiment, the one or more digital signals 320, 321 may be modulated through frequency modulation. The analog signal input 310 may be modulated through pulse width modulation as illustrated in FIG. 3. However, this arrangement may be reversed. Similarly, the one or more digital signals 320, 321 and the analog signal input 310 may be modulated under different modulation scheme such as code division modulation.

The modulator 330 may comprise a wave generator circuit 350 configured to generate a wave signal for modulating at least one or all of the analog signal input 310 and the one or more digital signal inputs 320, 321. The wave generator circuit 350 may be configured to generate the wave signal that may be periodic. The wave generator circuit 350 may be configured to generate a substantially sine-cosine signal, or a substantially triangular waveform signal similar to the triangle wave generator 50 shown in FIG. 3. As understood by a person skilled in the art, in actual practice it may be difficult to generate ideal sine-cosine or triangular waveforms. Therefore, the term "triangle wave" and "sine-cosine wave" in the entire specification may be referred to "substantially triangular wave" or "substantially sine-cosine waveform". If code division modulation is employed, the wave generator 350 may comprise a code generator circuit (not shown).

In the event that pulse width modulation is employed to modulate the analog signal input 310, the modulator 330 may further comprise a comparator (not shown) electrically coupled to wave generator 350 and to the analog signal input 310 similar to the embodiment shown in FIGS. 2-3. Similarly, in the event that frequency modulation is employed to modulate the one or more digital signal input 320, 321, the wave generator circuit 350 may be configured to generate the wave signal (not shown) in a first frequency when the one or more digital signal is in one logic state and is configured to generate the wave signal (not shown) in a second frequency when the one or more digital signal input 320, 321 is in other signal state. Optionally, the second frequency may be double or a multiple of the first frequency. The wave generator circuit 350 may be configured to generate the wave signal in one or more frequency when more digital signal inputs 320, 321 are involved.

The encoder 331 may be optional. As shown in FIG. 10, the encoder 331 may be formed within the modulator 330, alternatively, the encoder 331 may be a separate block distanced from but coupled to the modulator 330. The encoder 331 may be configured to encode the modulated signal 3222 of the one or more digital signal 320, 321 and the analog signal 310 such that each pulse of the modulated signal 3222 may be encoded into a major pulse and a minor pulse.

The signal isolator 334 may comprise an isolation barrier 333. The signal isolator 334 may be electrically coupled to the transmitter 332 as an input 3223, and may be electrically coupled to the receiver 336 as an output 3224. The signal isolator 334 may be configured to electrically isolate the first circuit 311 and the second circuit 312 while allowing an isolation signal to be sent across the isolation barrier 333. The signal isolator 334 may be configured to convert the isolation signal to an electrical signal as output 3224. In the embodiment shown in FIG. 10, the signal isolator 334 may be configured to electrically isolate the transmitter 332 and the receiver 336. The signal isolator 334 may be an optical isolator, a capacitive isolator, a magnetic isolator or other similar isolator allowing non-electrical signals to be sent across an isolation barrier 333.

For example, when an optical isolator is used as the signal isolator 334, the signal isolator 334 may comprise a light source (not shown) electrically coupled to the transmitter 332, and a photo-detector (not shown) electrically coupled to the receiver 336. When the transmitter 332 is configured to send a signal, the signal may be converted into non-electrical signal such as light. The photo-detector (not shown) of the signal isolator 334 may be configured to convert the light signal detected into an electrical signal. Hence, the input 3223 and output 3224 of the signal isolator 334 may be electrical signal while keeping the input 3223, and output 3224 isolated.

When a capacitive isolator is used as the signal isolator 334, electric field may be employed instead of light. Similarly, for signal isolator 334 comprising a magnetic isolator, magnetic field may be employed instead of light. The input 3223 and output 3224 may be housed in one package. The isolation barrier 333 may be insulating material such as epoxy, polyimide or other insulating material electrically separating the input 3223 and the output 3223 of the signal isolator 324. Therefore, indirectly the signal isolator 334 may be configured to electrically isolate the transmitter 332 and the receiver 336 although each of the transmitter 332 and the receiver 336 may be electrically coupled to the signal isolator 334.

The receiver 336 may be configured to detect and reproduce the modulated signal 3222 into a reproduced modulated signal 3226. Optionally, the receiver 336 may comprise a decoder 337 to decode the received signal 3224 if the modulated output 3222 is encoded. The use of the encoder 331 and the decoder 337 may reduce pulse width error without substantially increasing the bandwidth of the circuits involved in the signal transmission, such as the modulator 330, the transmitter 332, the receiver 336 and the retrieval circuit 339.

The transmitter 332 may be a buffer circuit, a driver circuit, a gate, a transistor or any other similar devices capable of generating an electrical signal as input 3223 to the signal isolator 334. Similarly, the receiver 336 may be a buffer circuit, a driver circuit, a gate, a transistor or any other similar devices capable detecting the electrical signal output from the signal isolator 334. The retrieval circuit 339 may comprise various filter circuits configured to retrieve or to demodulate the one or more digital signal 320, 321 into a reproduced digital output signals 328, 329, and to retrieve or to demodulate the analog signal input 310 into reproduced analog output 318. The reproduced digital output signals 328, 329 and the reproduced analog signal output 318 may be configured as output of the isolation system 305. Alternatively, the reproduced digital output signals 328, 329 and the reproduced analog signal output 318 may be configured as inputs for other circuits (not shown) in the second circuit 312.

In the embodiment shown in FIG. 10, the retrieval circuit 339 may comprise a filter 340 and a frequency discriminator 338 electrically coupled to the receiver 336. The filter 340 may be configured to filter the reproduced modulated signal 3226 and to reconstruct the analog signal input 310 into the reproduced analog signal output 318. In another embodiment, the filter 340 may comprise a charge pump circuit 54 as shown in FIG. 3. As discussed previously. The charge pump circuit 54 (See FIG. 3) may have switches that open and close according to the reproduced modulated signal 3226. More specifically, the switches may be configured to open and close according to the pulse width of the reproduced modulated signal 3226, or the frequency of the reproduced modulated signal 3226. In addition, the charge pump circuit 54 (See FIG. 3) may be configured to provide current that varies in accordance with the reproduced modulated signal 3226 received in order to reproduce the analog signal input 310.

Similarly the frequency discriminator 338 may be configured to decode the reproduced modulated signal 3226 and may be configured to reconstruct the one or more digital signal 320, 321 into the reproduced digital output signal 328, 329. In another embodiment, the retrieval circuit 339 may comprise other circuits configured to reproduce and reconstruct the analog signal input 310, and the one or more digital signal input 320, 321. For example, if the code division modulation scheme is chosen to modulate the analog signal input 310 and the one ore more digital signal input 320, 321, the retrieval circuit 339 may comprise a code generator (not shown) and other type of filtering circuits.

Figure 11A:
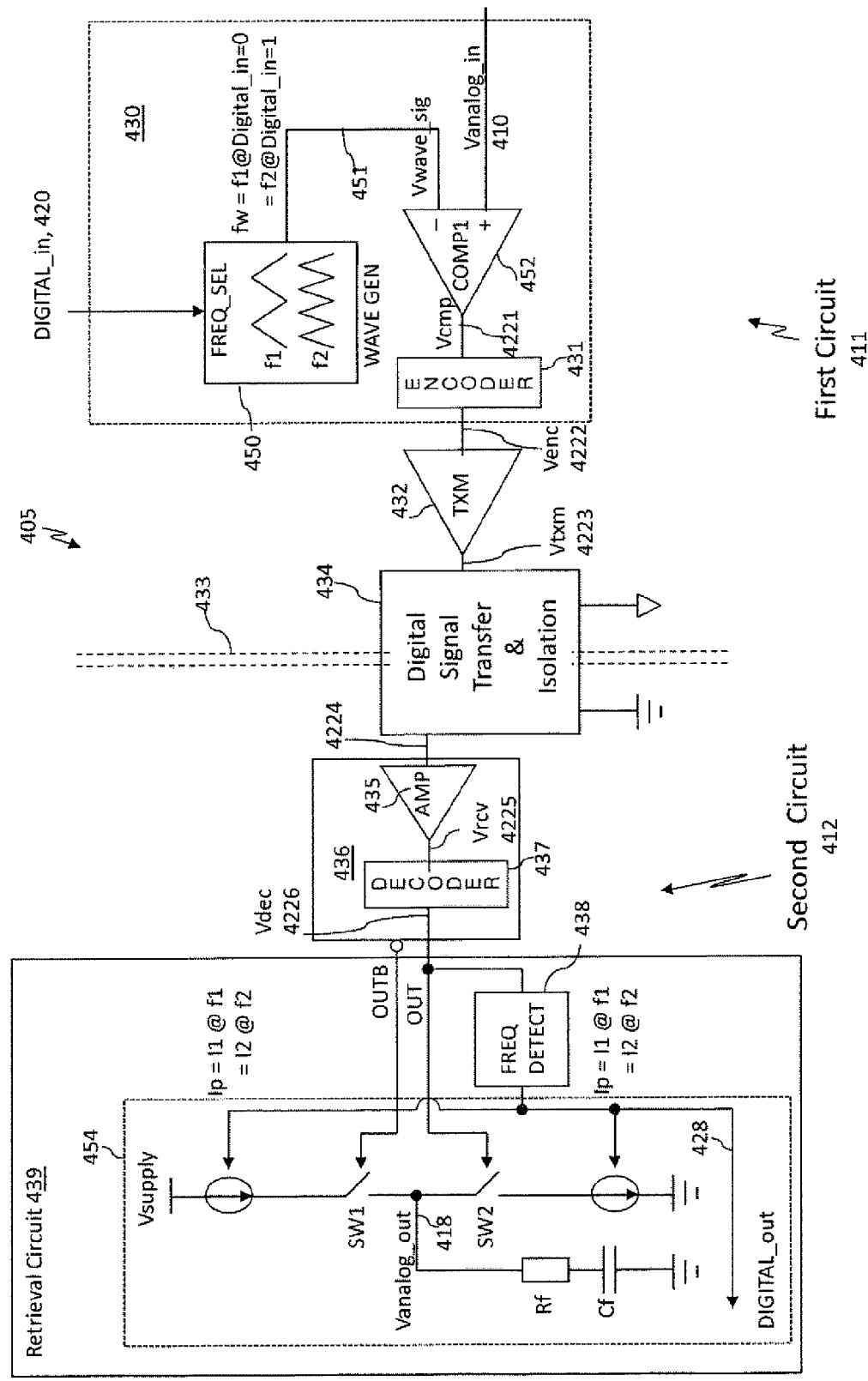
FIG. 11A shows a block diagram of an embodiment of an isolator.

FIG. 11A illustrates a block diagram of an isolator 405. The block diagram of the isolator 405 and the discussion about the isolator 405 may be applicable to a system, a circuit, a device, and an apparatus of such isolator. As shown in FIG. 11A, the isolator 405 may comprise a first circuit 411 and a second circuit 412. The first circuit 411 may comprise a modulator 430 and a transmitter 432 whereas the second circuit 412 may comprise a receiver 436 and a retrieval circuit 439. The retrieval circuit 439 may comprise a frequency detector 438 and a charge pump circuit 454. The first circuit 411 may be isolated from the second circuit 412 through an isolation barrier 433. The first circuit 411 may further comprise an encoder 431, a comparator 452 and a wave generator 450. In the embodiment shown in FIG. 11A, the encoder 431, the comparator 452 and the wave generator 450 may be a portion of the modulator 430. In another embodiment, the modulator 430 may comprise the comparator 452 whereas the wave generator 450 and the encoder 431 may be formed outside the modulator 430.

The modulator 430 may be configured to modulate a first digital signal 420, "DIGITAL_in", and a first analog signal 410 into a modulated signal 4222. The modulation may be pulse width modulation, code division modulation or frequency modulation. In the embodiment shown in FIG. 11A, the first digital signal 420 may be modulated through frequency modulation whereas the first analog signal 410 may be modulate through a pulse width modulation scheme. As shown in FIG. 11A, the modulator 430 may comprise the wave generator 450 configured to generate a wave signal 451 for frequency modulation, and the comparator 452 for pulse width modulation.

Specifically, the wave signal 451 may be generated in accordance with logic state of the first digital signal 420 similar to the previously discussed embodiment shown in FIG. 3. In other words, the wave signal 451 may be a first modulated signal that may be modulated in accordance with the first digital signal 420. For example, the wave generator 450 may be configured to generate the wave signal 451 having a first frequency f1 when the first digital signal is "LOW". When the first digital signal 420 is "HIGH", the wave generator 450 may be configured to generate the wave signal 451 having a second frequency, f2. The first frequency f1 may be dissimilar to the second frequency f2. In another embodiment, the first frequency f1 may be double or a multiple of the second frequency f2. In this way, the first digital signal 420 may be modulated through frequency modulation into the wave signal 451 as output of the wave generator 450. An example circuit implementation of the wave signal 451 is shown in FIG. 4 and FIG. 5.

In FIG. 11A, a substantially triangular wave form is illustrated. However, it is noted that the wave signal 451 generated by the wave generator 450 may not be limited to triangular waveform but may be some other periodic wave signals such as a substantially sine-cosine waveforms. In yet another embodiment where code division modulation is employed, the wave signal 451 may not be a periodic signal.

Figure 11B:
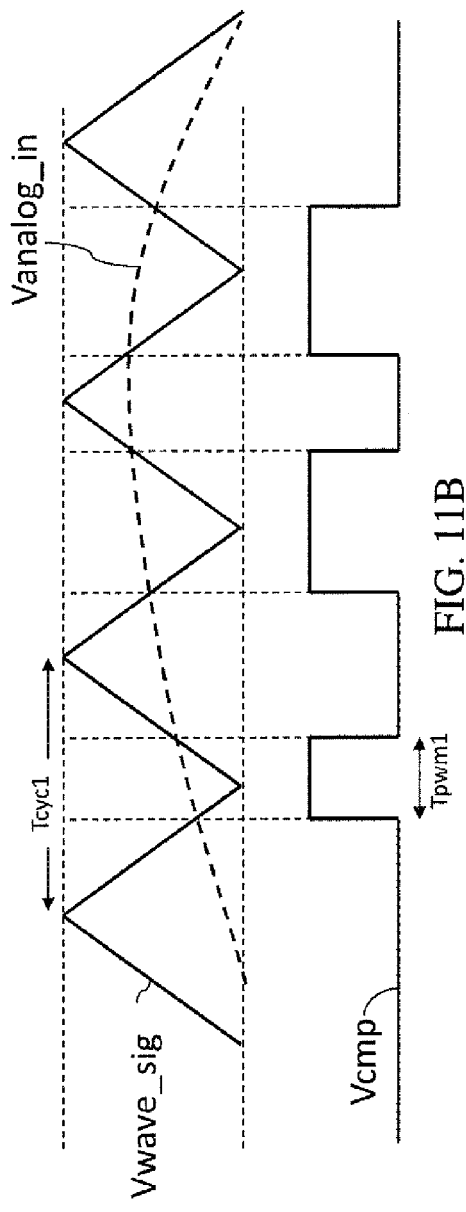
FIG. 11B shows how an analog signal is modulated using a first frequency.

Pulse width modulation scheme may be a way of modulating the first analog signal 410 into digital form. This may be done through comparing the first analog signal 410 and the wave signal 451 via the comparator 452. This is illustrated in the waveforms shown in FIG. 11B having horizontal time axes and vertical voltage axes. FIG. 11B shows how the first analog signal 410 may be modulated using the wave signal 451 having a first frequency.

Referring to FIG. 11B, voltage of the first analog signal 410 is illustrated as "Vanalog_in" is drawn overlaying the wave signal 451 having a voltage labeled as "Vwave_sig". The wave signal 451 may be periodic having a time period of Tcyc1. The comparator 452 may be configured to produce a second modulated signal 4221, having a voltage labeled as "Vomp". The second modulated output 4221 may have a plurality of pulses. The plurality of pulses may be produced when the first analog signal 410 is larger than the wave signal 451 as shown in FIG. 11B. Alternatively, the pulse may be produced when the wave signal 451 is larger than the first analog signal 410 in another embodiment. As shown in FIG. 11B, each of the plurality of pulses may have a respective pulse duration of "Tpwm1" that varies in accordance with the first analog signal 410. Hence, the second modulated output signal 4221 may be a digital signal having a duty cycle, defined as the ratio of Tpwm1 to Tcyc1, that may vary from 0% to 100%. For example, when the first analog signal 410 is at the middle of the range, then the second modulated output waveform 4221 is a digital signal having 50% duty cycle. The first analog signal 410 may be reproduced calculating the duty cycle of the second modulated output 4221.

Figure 11C:
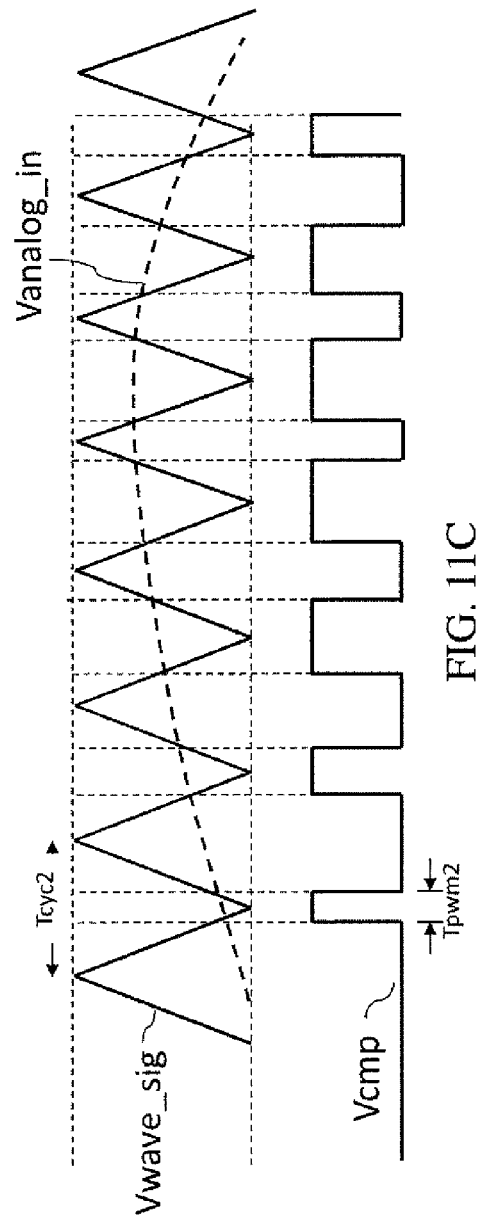
FIG. 11C shows how an analog signal is modulated using a second frequency.

FIG. 11C illustrates how the first analog signal 410 may be modulated when the frequency of the wave generator 450 changes into a second frequency. Similar to FIG. 11B, the horizontal axes represent time period whereas the vertical axes represent the voltage value. At the second frequency, the wave signal 451 may have a time period of Tcyc2. The plurality of pulses may be generated when the first analog signal 410 is larger than the wave signal 451, and that each pulse may have pulse duration of "Tpwm2". The first analog signal 410 may be calculated and reconstructed using the duty cycle that is defined as the ratio of Tpwm2 and Tcyc2.

Although the pulse duration Tpwm1 may appear longer than the pulse duration Tpwm2 when the frequency changes, this may not substantially affect the duty cycles because the period Tcyc1 and Tcyc2 of the triangular wave signals changes accordingly. As shown in FIGS. 11B-11C, the sampling rate may change when the frequency of the wave signal 451 changes. This may introduce error due to the different sampling rate. However, in actual implementation, the voltage, Vanalog_in of the first analog signal 410 changes much slower than the voltage Vwave_sign of the wave signal 451. Therefore, the error introduced due to the different sampling frequency may be negligibly small.

The second modulated signal 4221 may be coupled to the transmitter 432 for transmission to the receiver 436 via the signal isolator 434 from the first circuit 411 to the second circuit 412. The receiver 436 of the second circuit 412 electrically coupled to the signal isolator 434 may be configured to detect and reproduce the second modulated signal 4221 into a reproduced modulated signal 4226 as illustrated in the embodiments shown in FIGS. 2, 3, 7, 8, 9 and 10. The retrieval circuit 439 of the second circuit 412 may be configured to reconstruct the first digital signal 420 and the first analog signal 410 from the reproduced modulated signal 4226 into a reproduced first digital output 428 and a reproduced first analog output 418 respectively.

For example the frequency detector 438 may be configured to detect frequency of the reproduced modulated signal 4226 to determined logic state of the first digital signal 420. Similarly, the charge pump circuit 454 may be configured to open and close according to the reproduced modulated signal 4226. Specifically, the charge pump circuit 454 may be configured to open and close according to the pulse width of the reproduced modulated signal 4226. In another embodiment, the charge pump circuit 454 may be configured to open and close according to the frequency of the reproduced modulated signal 4226.

In order to substantially reduce pulse width error of the reproduced modulated signal 4226, an optional encoder 431 and an optional decoder 437 may be employed. The encoder 431 may be configured to encode the second modulated signal 4221 whereas the decoder 437 may be configured to decode the received signal 4225. The encoder 431 and the decoder 437 may be configured to reproduce the second modulated signal 4221 in a more precise manner compared to an isolator 405 without the encoder 431 and the decoder 437.

FIG. 11D illustrates a graph showing waveforms of the modulated signal 4221, before and after encoding together with the reproduced modulated signal 4226. The second modulated signal 4221 may be illustrated via the voltage output of the comparator 452 labeled as "Vcmp" in FIG. 11D. The transmitter's output 4223 may be substantially similar to the encoder's output 4222. Both the transmitter's output 4223 and the encoder's output 4222 may be represented by "Venc" in the graph shown in FIG. 11D. Similarly, the signal isolator's output 4224 may be substantially similar to the amplifier's output 4225 and are represented by "Vrcv" in the graph shown in FIG. 11D. As discussed earlier, the decoder 437 may be configured to produce a voltage output labeled as "Vdec", indicating the reproduced modulated signal 4226.

The second modulated signal 4221 may have a plurality of edge transitions 4111, 4112 to define a pulse. Each of the edge transition 4111, 4112 may be followed by a complimentary edge transition 4112, 4111. The edge transitions 4111, 4112 may be a rising edge 4111 or a falling edge 4112. The rising edge 4111 may be followed by the complimentary edge transitions, i.e. the falling edge 4112 to define the pulse.

Each pulse of the second modulated signal 4221 may have pulse duration of Tpulse. The pulse duration Tpulse may be measuring from an edge transition 4111 to a complimentary edge transition 4112. The pulse duration may be measured from the rising edge 4111 to the falling edge 4112 as shown in FIG. 11D. The pulse shown in FIG. 11D may be an active high type, with output LOW state when a pulse does not exist. However, the pulse may be inverted to be an active low type as shown in FIG. 11E. For such active low type, the pulse duration may be measuring from the falling edge 4112 to the rising edge 4111 as shown in FIG. 11E.

Each pulse of the second modulated signal 4221 may be encoded by the encoder 437 into a major pulse and a minor pulse respectively in the encoder's output 4222 or "Venc". The encoder's output 4222 may be referred to as an encoded modulated signal 4222. The respective major pulse may have pulse duration Tmajor whereas the respective minor pulse may have pulse duration, Tminor as illustrated in FIG. 11D. The pulse duration of the major pulse Tmajor may be substantially larger than the pulse duration of the minor pulse Tminor.

Similar to the pulse of the second modulated signal 451, each of the major pulse and the minor pulse comprises a first edge transition 4113, 4115 and a second edge transition 4114, 4116 respectively. The second edge transitions 4114, 4116 may be complimentary to the first edge transitions 4114, 4116 respectively. For a active high type as shown in FIG. 11D, the rising edges 4113, 4115 may be followed by the falling edges 4114, 4116 respectively. For an active low type as shown in FIG. 11E, the arrangement may be reversed. For example, the major pulse in FIG. 11D may be defined by a rising edge 4113 and the falling edge 4114. For active low type as shown in FIG. 11E, this arrangement may be inversed with the pulse defined by the falling edge 4114 and the rising edge 4113.

As explained previously, the duty cycle of each pulse of the second modulated signal 4221 may represent analog value of the first analog signal 410. When the isolator 405 is implemented into different semiconductor dies, duration of the edge transitions 4111, 4112 may be dissimilar. For example, duration of rise time/fall time of a gate in the transmitter 432 may be substantially different from duration of rise time/fall time of a gate in the receiver 436 fabricated in different a semiconductor die. This may introduce pulse width error into the second modulated signal 451. The encoder 431 may be configured to reduce the pulse width error by encoding the pulse duration Tpulse of each pulse of the second modulated signal 451 into time duration measuring from one of the first and second edge transitions 4113-4116 of one of the major pulse and the minor pulse, to the one of the first and second edge transitions 4113-4116 of the other of the major pulse and the minor pulse. For example, the pulse duration Tpulse, may be measuring from rising edge 4113 of the major pulse to the rising edge 4115 of the minor pulse as shown in FIG. 11D. Alternatively, the pulse duration Tpulse may be measuring from the falling edge 4114 of the major pulse to the falling edge 4116 of the minor pulse. Duration of edge transition may be susceptible to process variation. However, by encoding the signal measuring from one particular edge transition to another similar edge transition, the encoded signal 4222 Venc may be independent of process variation.

As shown in FIG. 11D, the major pulse precedes the minor pulse. In other words, the encoder 437 may be configured to generate the major pulse followed by the minor pulse. This arrangement can also be reversed as shown in FIG. 11F, the encoder 437 may be configured to generate the minor pulse followed by the major pulse. In FIG. 11F, the pulse duration Tpulse may be encoded into time duration measuring from the falling edge of the minor pulse to the falling edge of the major pulse as shown in FIG. 11F. In another embodiment, the pulse duration Tpulse may be encoded into time duration measuring from the rising edge of the minor pulse to the rising edge of the major pulse.

The encoder 437 may be configured to generate the major pulse and the minor pulse after a waiting time period Twt. In the embodiment shown in FIG. 11D, the waiting time period Twt may be measured from the first edge transition 4111 defining the pulse duration Tpulse to the first edge transition 4113 to the first edge transition 4113 of the major pulse. In the event that the minor pulse precedes the major pulse as shown in FIG. 11F, the waiting time period Twt may be measured from the first edge transition 4112 defining the pulse duration Tpulse to the first edge transition 4116 of the minor pulse. The waiting time period Twt may be substantially small relative to the pulse duration Tpulse. Therefore, the pulse duration Tmajor of the major pulse may be slightly smaller relative to the pulse duration Tpulse of the second modulated signal 451. The pulse duration Tminor of the minor pulse may be approximately similar to the waiting time period Twt.

In addition, there may be a delay between the major pulse and the minor pulse having delay duration, Tdly. The delay duration Tdly may be approximately equal to the pulse duration Tminor of the minor pulse. In addition, the delay duration Tdly may be approximately equal to the waiting time period Twt. This may be beneficial because frequency filtering may be performed subsequently as discussed hereinafter. In the embodiment shown in FIG. 11D, the respective encoded pulse duration Tpulse may be approximately equal to the major pulse duration Tmajor and the delay duration Tdly.

When the second modulated signal 4221 is encoded, the output 4224 of the signal isolator 434 and the output 4225 of the amplifier 435 Vrcv may comprise a major pulse and a minor pulse. The amplifier 435 may be configured to receive and reproduced the signal transmitted across the isolation barrier 433 into a reproduced encoded signal 4225, as output of the amplifier 435. Although visually resembling the second modulated signal 4221, the reproduced encoded signal 4225 may have some pulse width error such that the pulse duration Tmajor' of the major pulse of the reproduced encoded signal 4225 may be slightly dissimilar to the pulse duration Tmajor of the second modulated signal 4221. Similarly, the pulse duration Tminor of the minor pulse of the reproduced encoded signal 4225 may be susceptible to distortion.

However, the decoder 437 may be configured to decode the reproduced encoded signal 4225, or shown as Vrcv in FIG. 11D, using edge transitions of the major pulse and minor pulse instead of the pulse duration Tmajor' of the major pulse and/or the pulse duration Trainor' of the minor. More specifically, the decoder 437 may be configured to decode and to reproduce the second modulated signal 451 using edge transitions into a reproduced modulated signal 4226, as output of the decoder 437. The pulse duration Tpulse' of the reproduced modulated signal 4226 may be substantially similar to the pulse duration Tpulse of the second modulated signal 451.

In one embodiment without the encoding and decoding, the reproduced modulate signal 4226 and the second modulated signal 451 may be substantially similar but having a pulse width distortion of approximately less than 23 ns. In the embodiment shown in FIG. 11A where encoding and decoding are employed, the reproduced modulate signal 4226 and the second modulated signal 451 may be substantially similar such that the pulse width distortion may be approximately less than 2 ns, reducing the pulse width distortion to approximately 10%.

Figure 11G:
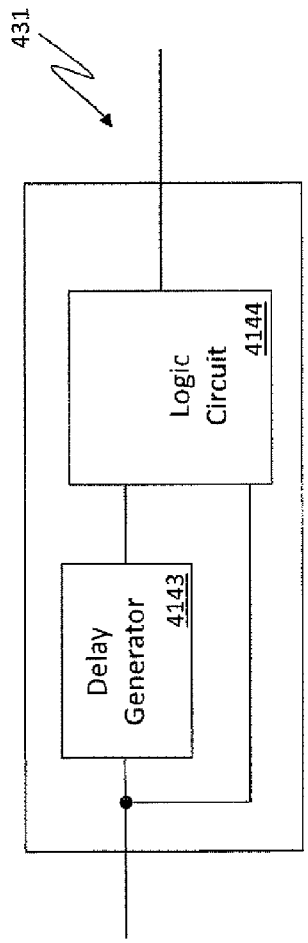
FIG. 11G shows a block diagram of an embodiment of a digital encoder.

FIG. 11G shows a block diagram of an encoder 431 implemented using digital circuits. The digital encoder shown in FIG. 11G may comprise a delay generator 4143 and a logic circuit 4144 configured to produce the desired output. For asynchronous design, the delay generator 4143 may comprise delay gates. For synchronous design using a high speed clock, the delay generator 4143 may comprise a counter (not shown) and a digital comparator (not shown). A set back for synchronous design digital encoder 431 may be that the clock in the encoder block 431 may be required to have high frequency. Therefore, the encoding accuracy may be achieved at the expense of higher clock speed, implying higher power consumption.

Figure 11H:
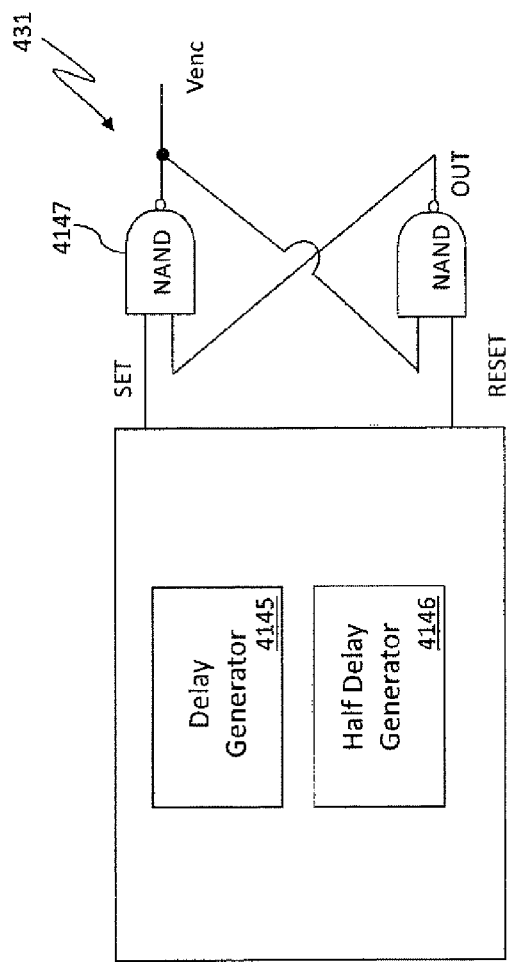
FIG. 11H shows a block diagram of an embodiment of an analog decoder.

Alternatively, the encoder 431 may be designed using analog circuits. FIG. 11H shows a block diagram of an analog decoder 431 having a delay generator 4145 and a half delay generator 4146. The delay generator 4145 may be used to generate the waiting duration Twt, whereas the half delay generator 4146 may be configured to generate pulse duration Tminor of the minor pulse and the delay duration Tdly between the major pulse and the minor pulse. The encoder 431 may further comprise a latch having two NAND gates 4147.

Figures 11I, 11J:
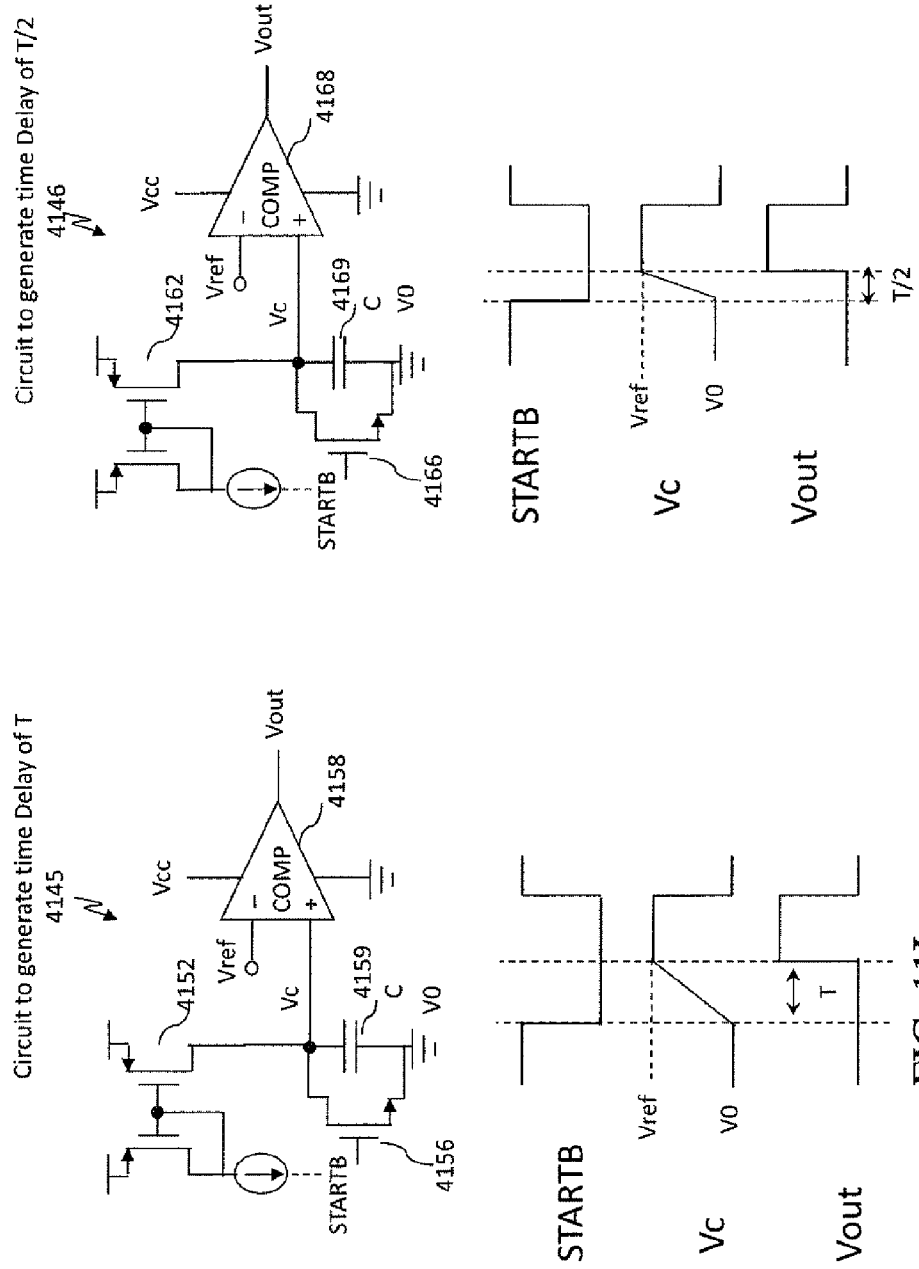
FIG. 11I shows a circuit diagram of an embodiment of a delay generator.
FIG. 11J shows a circuit diagram of an embodiment of a half delay generator.

FIG. 11I shows a circuit diagram of a delay generator 4145, whereas FIG. 11J shows a circuit diagram of a half delay generator 4146. Referring to FIG. 11I, the delay generator 4145 may comprise a transistor 4152, a switch 4156, a comparator 4158, a capacitor 4159. When the switch 4156 is turned on, the capacitor 4159 having capacitance of C will be discharged to ground voltage of V0. In FIG. 11I, the switch 4156 may be an NMOS and the gate voltage signal STARTB being logic HIGH may turn on the switch 4156. When the switch 4156 is turned off, a charging current that is controlled by the transistor 4152 may charge the capacitor 4159. The transistor 4152 may be a transistor of a current mirror as shown in FIG. 11I. The transistor 4152 may be configured to control the charging current. As shown in FIG. 11I, the transistor 4152 may be coupled directly to the capacitor 4159, or alternatively, the transistor 4152 may be a portion of a current mirror (not shown) controlling the charging current indirectly.

With the switch 4156 being turned off, the voltage Vc across the capacitor 4159 may gradually increase due to the charging process as shown in the graph below the circuit diagram in FIG. 11I. When the voltage Vc across the capacitor 4159 becomes more than a reference voltage of Vref, the comparator 4158 may have the output Vout inversed as shown in the timing chart in FIG. 11I. When the switch 4156 is turned on again when the signal STARTB turns high, the capacitor 4159 may be discharged, returning the comparator 4158 output to logic low.

Similarly, the half delay generator 4146 shown in FIG. 11J may comprise a transistor 4162, a switch 4166, a comparator 4168, a capacitor 4169. The half delay generator 4146 may be operated in a substantial similar manner compared to the delay generator 4145. However, the capacitor 4169 may have half the capacitance of the capacitor 4159 shown in FIG. 11I. Therefore, compared to the delay generator 4145, the time needed to charge up the capacitor 4169 may be approximately halved compared to the delay generator 4145. In another embodiment, the capacitor 4169 of the half delay generator 4146 may have substantially similar capacitance to the capacitor 4159 of the delay generator 4145 but having an additional transistor (not shown) arranged in parallel the transistor 4162 so that the charging current may be doubled compared to the delay generator 4145.

The choice of sizes of the capacitors 4159, 4169 and the circuit arrangement may be beneficial contributing to reproduced modulated signal 4226 to be substantially independent from process variation. For example, the charge up time of the circuits may depend on the relative value of the capacitor 4159 and the capacitor 4169. The charge up time may not depend on the absolute capacitance. Similarly, in the other embodiment where the half delay generator 4146 comprises an additional transistor, the charging current may be doubled by adding the additional transistor having same size and biased similarly to the transistor 4162. The delay time produced may be relying on the ratio of the number of transistors 4162 and may be independent from process variation.

Figure 11L:
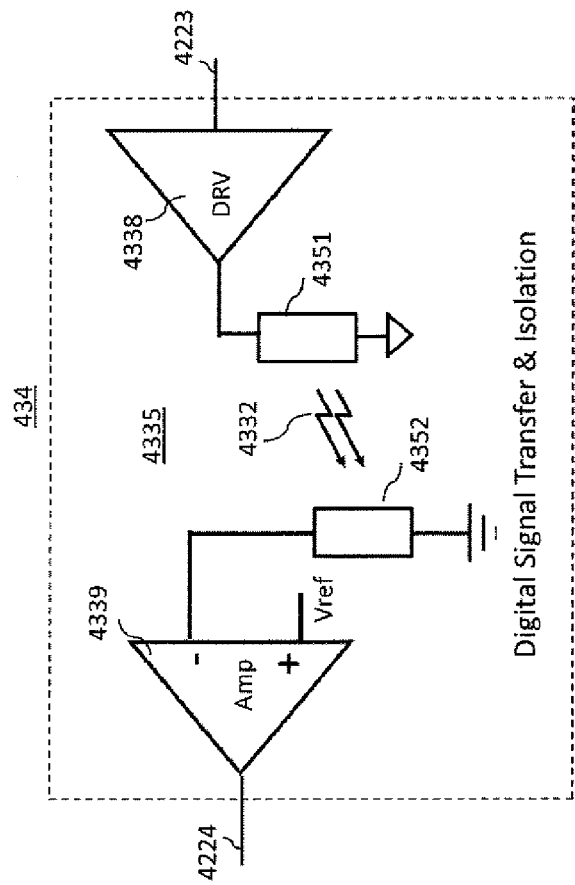
FIG. 11L shows a circuit diagram of the signal isolator.
Figure 11K:
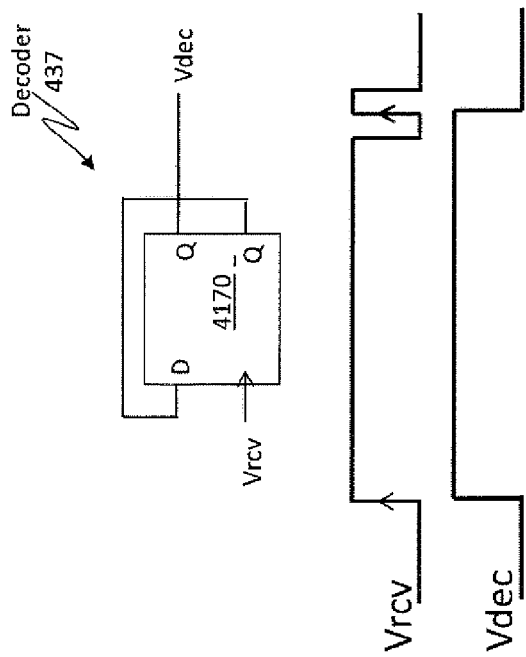
FIG. 11K shows a circuit diagram of an embodiment of a decoder.

FIG. 11K shows a circuit diagram of a decoder 437, comprising a toggle flip flop 4170. The toggle flip flop 4170 may toggle the output on a specific edge transition. For example, the toggle flip flop 4170 may be configured to toggle the output based on a rising edge as shown in FIG. 11K. In another embodiment, the toggle flip flop 4170 may be configured to toggle on a falling edge.

FIG. 11L shows a circuit diagram of the signal isolator 434. The signal isolator 434 may comprise an emitter 4351 and a sensor 4352. For example, the signal isolator 434 may be an optical isolator and the emitter 4351 may be a light source, and the sensor 4352 may be a photo-detector. In other embodiment where the signal isolator is a capacitor isolator or a magnetic isolator, the emitter 4351 and the sensor 4352 may be capacitors or coils. The emitter 4351 may be a device configured to send an isolation signal 4332 across an isolating material 4335, whereas the sensor 4352 may be configured to convert the isolation signal 4332 detected into electrical signal for output. The isolation signal 4332 may be a signal being transmitted between the first and second circuits 411, 412 while allowing the first and second circuits 411, 412 to remain isolated, without direct current flowing between the first and second circuits 411, 412.

The isolation signal 4332 may be light, magnetic signal, electric field or any other signal that may not electrically connecting the emitter 4351 and the sensor 4352. The isolating material 4335 may be an insulator such as polyimide, epoxy or any other material used to encapsulate the emitter 4351 and the sensor 4352. The signal isolator 434 may further comprise an optional driver 4338 to receive the signal 4223, and an optional amplifier 4339 to drive the output 4224. Alternatively, the emitter 4351 of the signal isolator 434 may be electrically connected to the input signal 4223 whereas the sensor 4352 may be electrically connected to the output 4224.

Figure 12:
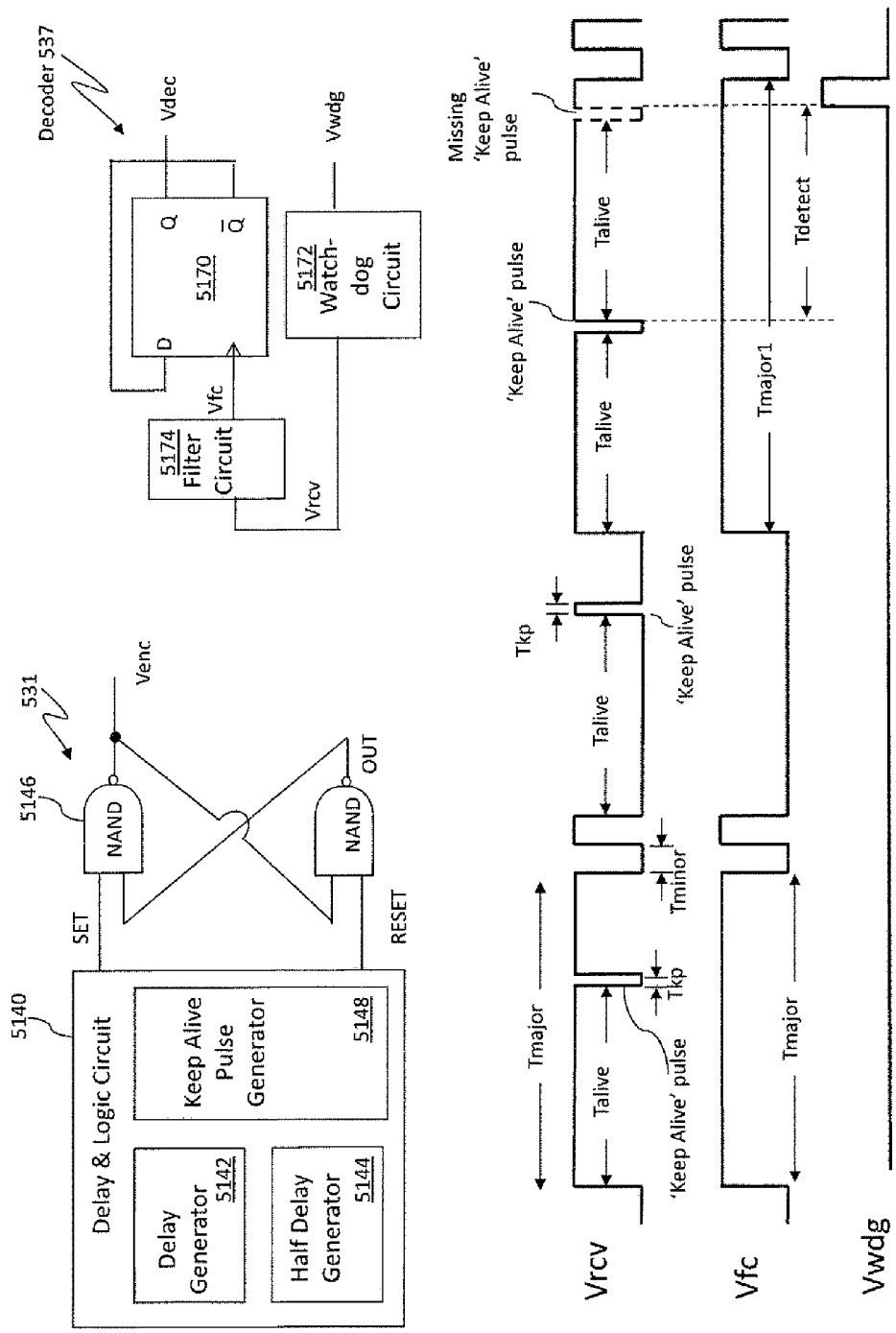
FIG. 12 shows a block diagram of an embodiment of an alternative encoder and an alternative decoder having keep-alive checking function.

FIG. 12 shows a block diagram of an alternative encoder 531 and an alternative decoder 537 having keep-alive checking function. The alternative encoder 531 may comprise an additional block of keep-alive pulse generator 5148 in addition to the elements shown in FIG. 11G and FIG. 11H. For example, the alternative encoder 531 may comprise a delay generator 5142, a half delay generator 5144, a NAND gate 5146, and a keep-alive pulse generator 5148. The alternative decoder 537 may comprise a toggle flip-flop 5170, a watchdog circuit 5172, and an optional filter circuit 5174.

In addition to the major pulse and the minor pulse, the alternative encoder 531 may be further configured to encode a keep-alive pulse into the modulated signal after a predetermined time period Talive. For example, the alternative encoder 531 may be configured to encode the keep-alive pulse when the modulated signal 4221 (See FIG. 11A) remains static after a predetermined time period Talive. Alternatively the alternative encoder 531 may be configured to encode the keep-alive pulse when the first digital signal 420 (See FIG. 11A) remains static after a predetermined time period. This is illustrated in the timing chart shown in FIG. 12.

The keep-alive pulse generator 5148 may be configured to generate the keep-alive pulse only when there is no major or minor pulse to be communicated, or alternatively the keep-alive pulse generator 5148 may be configured to generate so the keep-alive pulse concurrently together with the major or minor pulses.

The keep-alive pulse generator 5148 may be configured to generate a keep-alive pulse at a time interval of the predetermined time period Talive. For example, after the predetermined time period Talive, the keep-alive pulse generator 5148 may generate a keep-alive pulse having duration of Tkp. The pulses may be detected at the decoder 537. If a keep-alive pulse is missing, the watchdog circuit 5172 may be configured to output a signal, Vwdg indicating a faulty situation of a continuously LOW or HIGH signal. In this manner, the keep-alive pulses may enable the decoder 537 to differentiate a continuously LOW/HIGH signal to that of a faulty signal.

Duration of the major pulse may depend on the modulation, and on many occasions, the duration of the major pulse Tmajor may be relatively shorter than the predetermined time period Talive. However, on some occasions that the major pulse may be continuously HIGH, the duration of such pulse Tmajor may be relatively longer than the predetermined time period Talive. There may be more than one keep-alive pulse being generated within a major pulse signal if the pulse duration Tmajor of the major pulse is multiple the predetermined time period Talive as illustrated in FIG. 12. Similarly, the keep-alive pulse may be generated when there is no major nor minor pulses but the keep-alive pulse may be inverted as shown in FIG. 12.

The watchdog circuit 5172 of the decoder 537 may be configured to detect the keep-alive pulses at a detection time interval Tdetect. The detection time interval may be relatively longer than the predetermined time period Talive, factoring in potential delay caused by the communication channel. If a keep-alive pulse is not detected after the detection time interval Tdetect, the watchdog circuit 5172 may be configured to output the signal Vwdg indicating that a missing pulse has occurred as illustrated in FIG. 12.

In order to differentiate the minor pulses from the keep-alive pulses, the pulse duration Tkp of the keep-alive pulse may be relatively shorter than the duration Tminor of the minor pulse. The filter circuit 5174 may be optional. If the keep-alive pulses is to be transmitted concurrently together with the major and minor pulses, the filter circuit 5174 may be configured to filter out the keep-alive pulse to output the major pulse and the minor pulse (shown as Vrcv signal) to the toggle flip flop 5170. As shown in FIG. 12, the output Vfc of the filter circuit may comprise only the major and minor pulses without the keep-alive pulses.

Figure 13A:
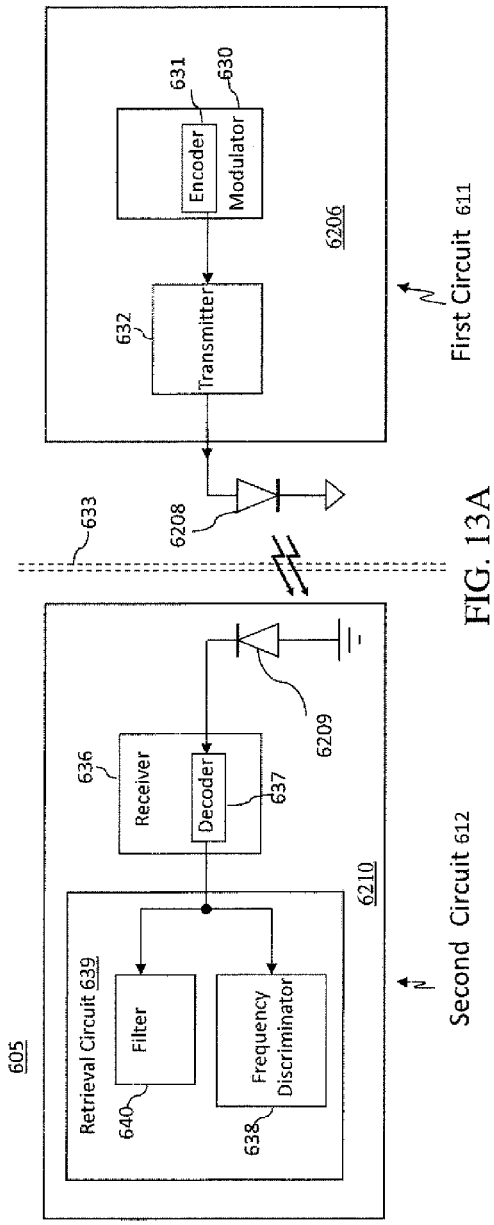
FIG. 13A shows a block diagram of an embodiment of an isolator device.

FIG. 13A shows a block diagram of an embodiment of an isolator device 605. The isolator device 605 may comprise a modulator 630, a transmitter 632, an emitter 6208, a sensor 6209, a receiver 636, and a retrieval circuit 639. The transmitter 632 may be a circuit for transmitting output of the modulator 630 such as a LED driver, an amplifier, or other similar devices. The emitter 6208 on the other hand may be an LED or a device that converts electrical signal into other form of radiation. Optionally, the isolator device 605 may comprise an encoder 631 and a decoder 637. In addition, the retrieval circuit 639 may optionally comprise a filter 640 and a frequency discriminator 638 similar to the embodiment shown in FIG. 11A. The modulator 630, the transmitter 632, the emitter 6208 and the optional encoder 631 may be a portion of a first circuit 611. The sensor 6209, the receiver 636 and the retrieval circuit 639 may be a portion of a second circuit 612 isolated from the first circuit 611.

Figure 13B:
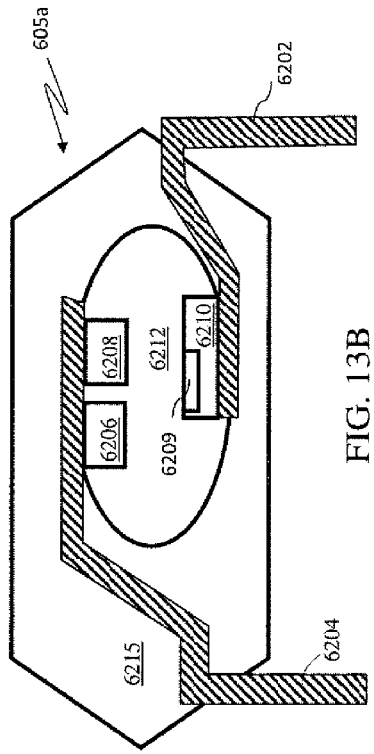
FIG. 13B shows one embodiment of an isolator package comprising the isolator device shown in FIG. 13A.

The first circuit 611 may be integrated into a single die 6206. The encoder 631, the modulator 630, and the transmitter 632 may be integrated into the single die 6206. On some occasions where the emitter 6208 may be more cost effectively manufactured using different fabrication technology, it may be desirable to separate the emitter 6208 in a separate die. For example, if the emitter is a light source 6208, it may be more economical to integrate the emitter 6208 as a separate die as shown in FIGS. 13A and 13B. Similarly, the second circuit 612 may be integrated into a single die 6210. On some occasions, each of the first circuit 611 and the second circuit 612 may be integrated into more than one die respectively.

FIG. 13B shows an isolator package 605a comprising the isolator device 605 shown in FIG. 13A. Referring to FIG. 13B, the isolator package 605a may comprise a plurality of leads 6202, 6204, a first semiconductor die 6206 having the first circuit 611 shown in FIG. 13A, an emitter die 6208, a second die 6210 having the second circuit 612, a first encapsulant 6212 encapsulating at least the first die 6206, the emitter die 6208 and the second die 6210. The first die 6206 and the emitter die 6208 of the first circuit 611 may be attached on one side or on a same lead frame 6204, whereas the second die 6210 may be attached on the other side or a separate lead frame 6202.

In one embodiment where the isolator device is an optical isolator, the first encapsulant 6212 may be substantially transparent. The isolator package 605a may comprise an additional encapsulant 6215 encapsulating the first encapsulant 6212, a portion of the lead frames 6202, 6204, the first die 6206, the emitter die 6208 and the second die 6210. The additional encapsulant 6215 may be substantially opaque, so as to substantially prevent light from exiting the isolator package 605a.

Figure 14:
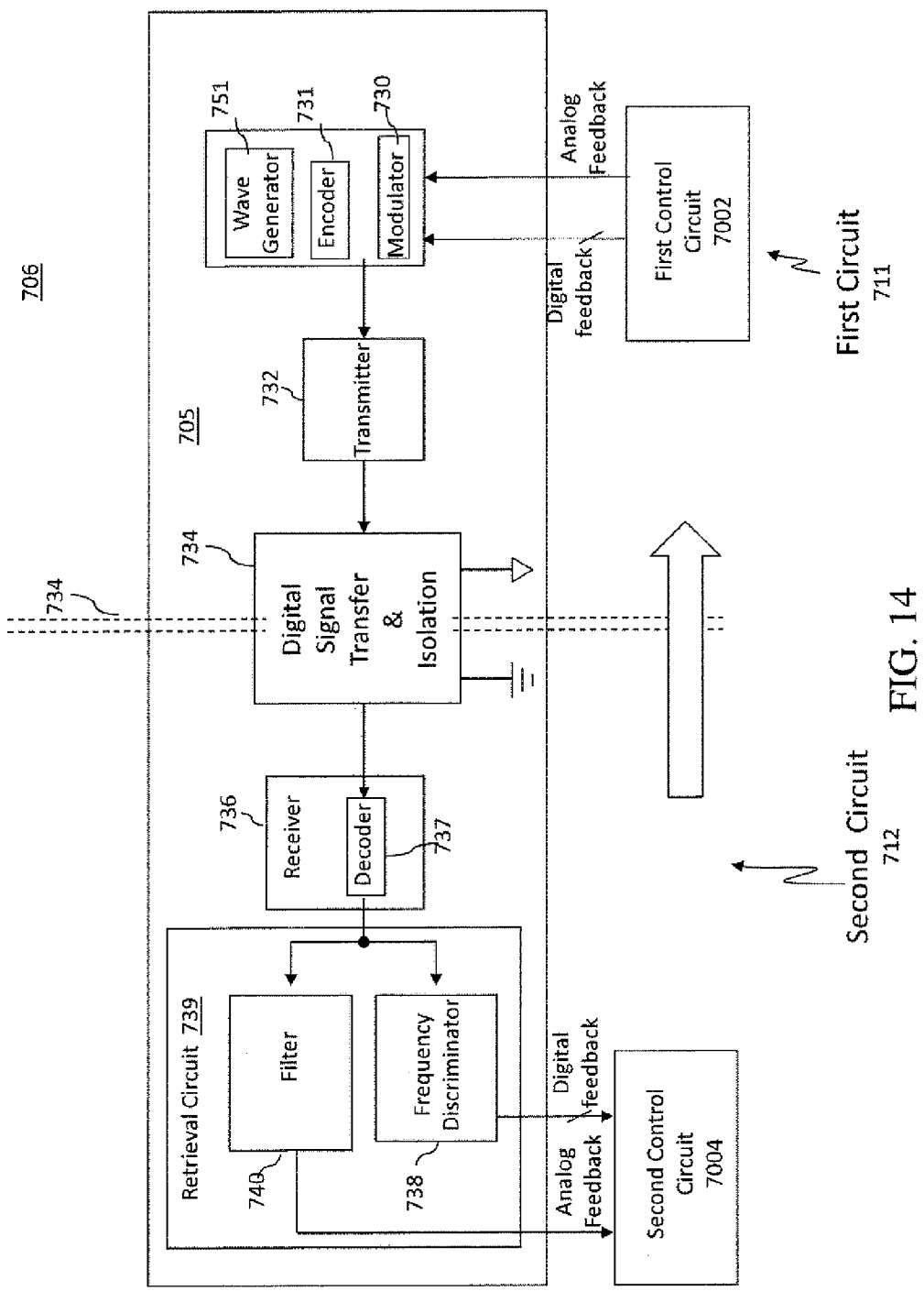
FIG. 14 shows a block diagram of an embodiment of a control system.

FIG. 14 shows a block diagram of an embodiment of a control system 706. The control system 706 may comprise a first control circuit 7002, a second control circuit 7004, and an isolation system 705 having a modulator 730, a wave generator 751, a transmitter 732, a signal isolator 734, a receiver 736, and a retrieval circuit 739. The wave generator 751 may be a portion of the modulator 730. Optionally, the control system 705 may comprise an encoder 731 and a decoder 737. The isolation system 705 may be configured to transmit and receive at least one digital signal and at least one analog signal from of a first circuit 711 across to a second circuit 712 similar to the isolation systems 5, 305, 405, 605 shown in previous embodiments in FIGS. 2, 3, 10, 11A and 13A. As shown in FIG. 14, the first circuit 711 may comprise the modulator 730, the wave generator 751, the encoder 731, the first control circuit 7002 whereas the second circuit 712 may comprise the receiver 736, the retrieval circuit 739, the filter 740, the frequency discriminator 738, and the second control circuit 7004.

Referring to FIG. 14, the first control circuit 7002 of the first circuit 711 may be configured to send a digital feedback signal and an analog feedback signal to the second controller circuit 7004 located in the second circuit 7004 via the isolation system 705. For this purpose, the wave generator 751 may be configured to generate a first modulated signal corresponding to logic state of at least one of the digital feedback signal. The modulator 730 may be configured to further modulate the analog feedback signal with the modulated signal into a second modulated signal. The digital feedback signal and the analog feedback signal may be output from the first control circuit 7002. The transmitter 732 may be configured to output the second modulated signal to the signal isolator 734 for transmission across the isolation barrier 733 located in the signal isolator 734. The receiver 736 may be configured to reproduce the second modulated signal into a reproduced modulated signal. The reproduced modulated signal may be then output to the retrieval circuit 739 configured to reproduce the analog feedback signal into a reproduced analog feedback signal and to reproduce the digital feedback signal into a reproduced digital feedback signal to the second control circuit 7004.

There may be more than one digital or analog feedback signal to be sent across from the first circuit 711 to the second circuit 712. For example, in order to send across an additional digital feedback signal, the modulator 751 may be further configured to modulate the analog feedback signal into the modulated signal corresponding to logic state of the digital feedback signal and logic state of the additional digital feedback signal. On the second circuit 712, the retrieval circuit 739 may be further configured to decode the reproduced modulated signal and to reconstruct the additional digital signal.

In one embodiment, the digital feedback signals may be transmitted via frequency modulation whereas the analog feedback signals may be transmitted via pulse width modulation. Hence, the retrieval circuit 739 may comprise a frequency discriminator 738 to reproduce the digital feedback signal and the additional digital feedback signal.

The control system 706 shown in FIG. 14 may form a portion of a feedback system. For example, the second circuit 712 of the control system 706 may be configured to provide power supply to the first circuit 711, whereas the first circuit 711 may provide a feedback to the second circuit 712 through the isolation system 705. Examples of such feedback control systems may be illustrated in a solid-state lighting control system 707 shown in FIG. 15 and a direct-current to direct-current converter feedback regulation control system 708 (referred hereinafter as "DC/DC regulation control system" shown in FIG. 16.

Figure 15:
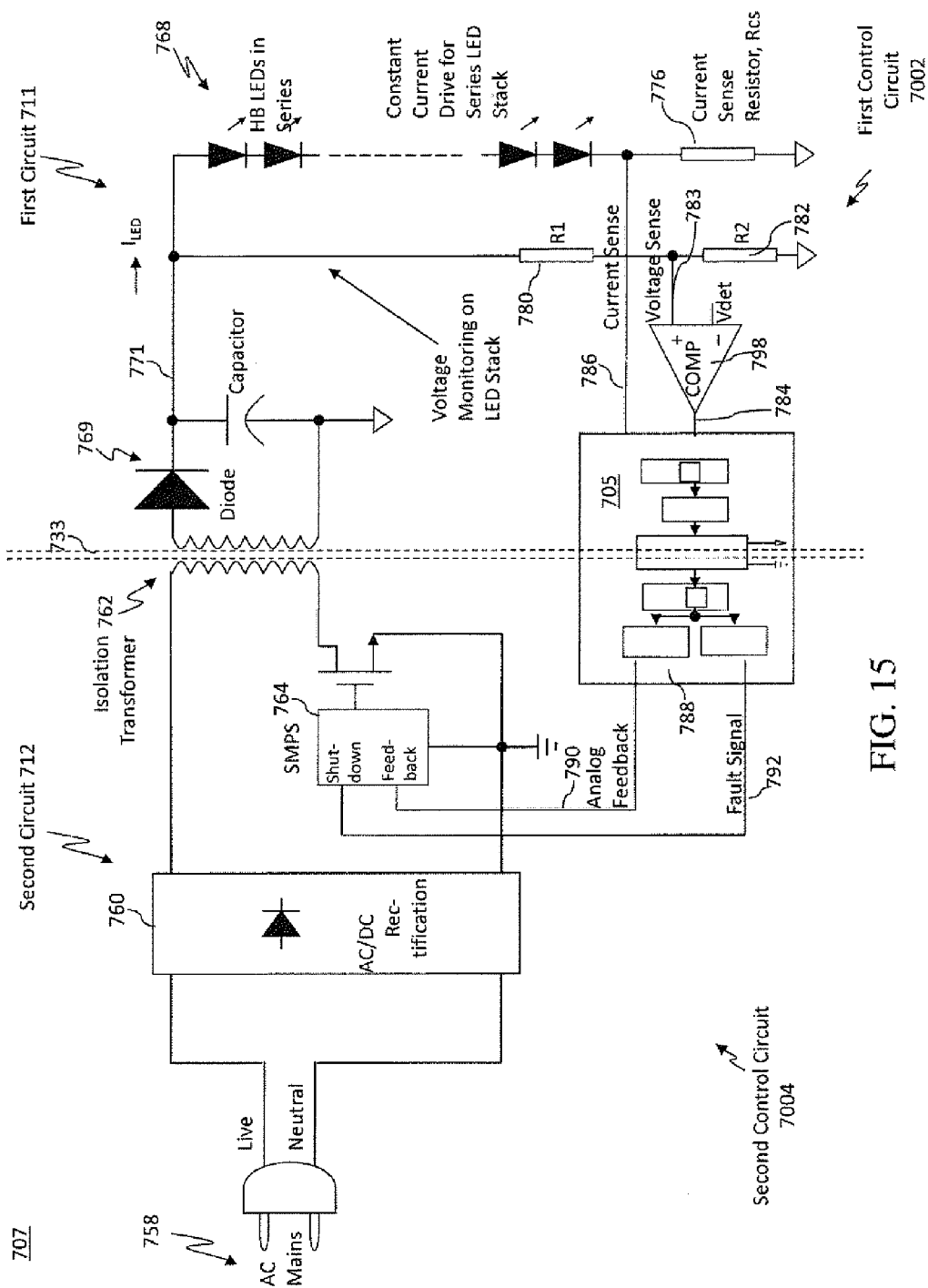
FIG. 15 shows a block diagram of an embodiment of a lighting control system.

Referring to FIG. 15, the solid-state lighting control system 707 may comprise an isolation transformer 762, an isolation system 705 electrically coupled to a first circuit 711 and a second circuit 712. The first and second circuits 711, 712 may be isolated. As shown in FIG. 15, the first circuit 711 may comprise a plurality of light sources 768, a current sensing circuit 776 coupled to the light sources 768, a comparator 798, a voltage monitoring circuit 780, 782, a rectifier circuit 769 and a portion of the isolation system 705 electrically coupled to the first circuit 711 as explained in FIG. 14. The second circuit may comprise an AC/DC rectification circuit 760, a switched mode power supply controller (referred hereinafter as "SMPS controller") 764 and a portion of the isolation system 705 electrically coupled to the second circuit as explained in FIG. 14. The first circuit 711 and the second circuit 712 may be interconnected through the isolation transformer 762 and the isolation system 705 but isolated through the isolation barrier 733.

The second circuit 712 may be configured to draw power from a main AC power supply 758. The second circuit 712 may be further configured to regulate power to the first circuit 711 through the isolation transformer 762. The power supply from the isolation transformer 762 may be then coupled to the rectifier circuit 769 to provide an isolated DC output 771. The isolated DC output 771 may be configured to supply current to drive the plurality of light sources 768. Similar to the embodiment shown in FIG. 8, the current sensing circuit 776 may be configured to generate an analog feedback signal 786 as feedback to the second circuit 712 that supplies the power to the first circuit 711 through the isolation system 705. In addition, the voltage monitoring circuit 780, 782 may be configured to generate a voltage sensing signal 783. The comparator 798 of the first circuit may be configured to receive as inputs the voltage sense signal 783 and a reference voltage, Vdet. If the voltage sensing signal 783 is out of a predetermined range, the comparator 798 may be configured to generate the at least one digital signal as a fault signal 784, as feedback to the second circuit 712 through the isolation system 705.

The fault signal 784 and the analog feedback signal 7186 may be reproduced by the isolation system 705 into a reproduced fault signal 792 and a reproduced analog feedback signal 790. The reproduced analog feedback signal 790 may be coupled to the SMPS controller 764 as feedback so that the SMPS controller may adjust the power supply to the first circuit 711. If a fault signal 792 is detected, the SMPS controller 764 may be configured to shutdown the power supply from the second circuit 712 to the first circuit 711. The voltage sensing circuit 780, 782 and the current sensing circuit 776 may define the first control circuit 7002 interfacing with the isolation system 705. Similarly the SMPS controller 764 may define the second control circuit 7004 interfacing with the isolation system 705.

Figure 16:
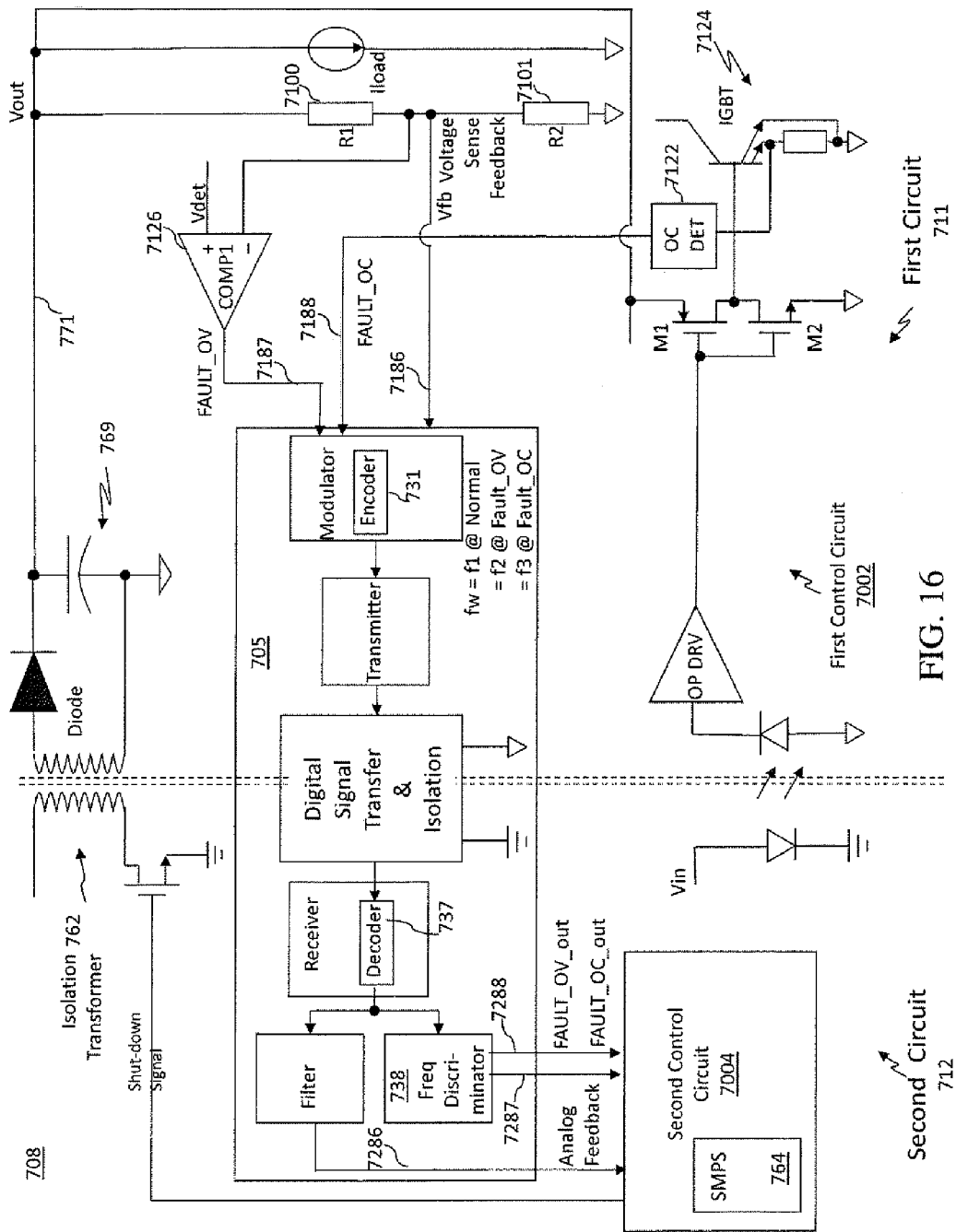
FIG. 16 shows a block diagram of an embodiment of a direct current to direct current converter feedback regulation control system.

Referring to FIG. 16, the DC/DC regulation control system 708 may comprise a first circuit 711, a second circuit 712, an isolation transformer 762 and an isolation system 705. The second circuit 712 may comprise a SMPS controller 764 controlling current flowing through the isolation transformer 762. The isolation transformer 762 may be configured to provide power supply to the first circuit 711. The power supply may be regulated by the second circuit 712. The first circuit 711 may comprise a rectifier circuit 769, a voltage monitoring circuit 7100, 7101, an insulated gate bipolar transistor 7124 and a current monitoring circuit 7122. The voltage monitoring circuit 7100, 7101 may be configured to generate a voltage sensing signal as an analog feedback signal 7186 to the second circuit 712. In addition, a comparator 7126 may be configured to generate an over voltage fault signal 7187 if the voltage sensing signal 7186 is over a specific reference voltage Vdet as shown in FIG. 16. The current monitoring circuit 7122 may be configured to generate an over current fault signal 7188. The over voltage fault signal 7187, the over current fault signal 7188 and the analog feedback signal 7186 may be transmitted across to the second circuit 712 through the isolation system 705.

In the second circuit 712, the over voltage fault signal 7187 and the over current fault signal 7188 may be reproduced by the frequency discriminator 738 into a reproduced over voltage fault signal 7287 and a reproduced over current fault signal 7288. Similarly, the analog feedback signal 7186 may be reproduced into a reproduced analog feedback signal 7286. The reproduced analog feedback signal 7286, the reproduced over voltage fault signal 7287 and the reproduced over current fault signal 7288 may be coupled to the SMPS controller 764 for control use, such as to shutdown or to adjust the power supply. In one embodiment where the isolation system 705 comprises an encoder 731 and a decoder 737, the accuracy of the regulator voltage for the DC/DC regulation control system 708 may be 16V+/−0.05V. In another embodiment having a similar DC/DC regulation control system 708 without the encoder 731 and the decoder 737, the accuracy may be 16V+/−0.5V. This is because the accuracy of the DC/DC regulation control system 708 may be a function of the pulse width error. With the encoder 731 and the decoder 737, the pulse width error may be substantially reduced as explained previously.

Figure 17:
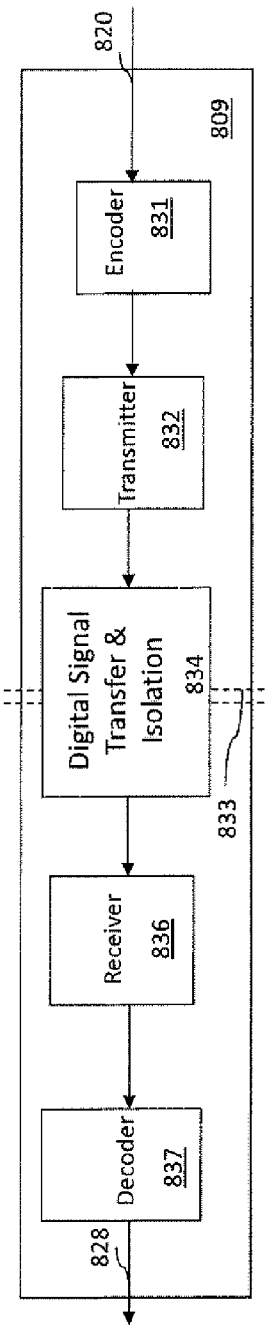
FIG. 17 shows a block diagram of an embodiment of an alternative isolator.

FIG. 17 shows a block diagram of an embodiment of an alternative isolator 809. The alternative isolator 809 may comprise an encoder 831, a transmitter 832, a signal isolator 834 having an isolation barrier 833, a receiver 836 and a decoder 837. The isolator 809 may be substantially similar to the isolation system 405 and the isolator 605 shown in FIGS. 11A and 13A respectively but may differ at least in that the isolator 809 does not comprise the modulator 430 and the retrieval circuit 439 shown in FIG. 11A.

Referring to FIG. 17, the encoder 831 may be coupled to a digital signal 820 having a plurality of pulses as inputs. The encoder 831 may be configured to encode each pulse of the digital signal into an encoded signal respectively such that the respective pulse of the digital signal is converted into a major pulse and a minor pulse as shown in FIG. 11D. The transmitter 832 may be electrically coupled to the encoder 831, and configured to transmit the encoded signal over to the receiver 836. The receiver 836 may be formed proximate to the transmitter 832 to receive the encoded signal. The encoded signal may be electrically coupled to the signal isolator 834 to be converted therein into an isolation signal in order to be sent across the isolation barrier 833.

The isolation barrier 833 may be formed proximate to the transmitter 832 and the receiver 836 to provide an electrical isolation between the transmitter 832 and the receiver 836 while allowing the encoded signal from the transmitter 832 to transmit through the isolation barrier 833. The decoder 837 may be electrically coupled to the receiver 836. The decoder 837 may be configured to decode the encoded signal into a reproduced digital signal 828 that is substantially similar to the digital signal 820. The circuit of the decoder 837 may be substantially similar to the embodiment shown in FIG. 11k and FIG. 12. Similarly, the circuit of the encoder 837 may be substantially similar to the embodiment shown in FIGS. 11G-11J and FIG. 12. The timing chart shown in FIGS. 11D-F and FIG. 12 may be applicable to the isolator 805.

Figure 18:
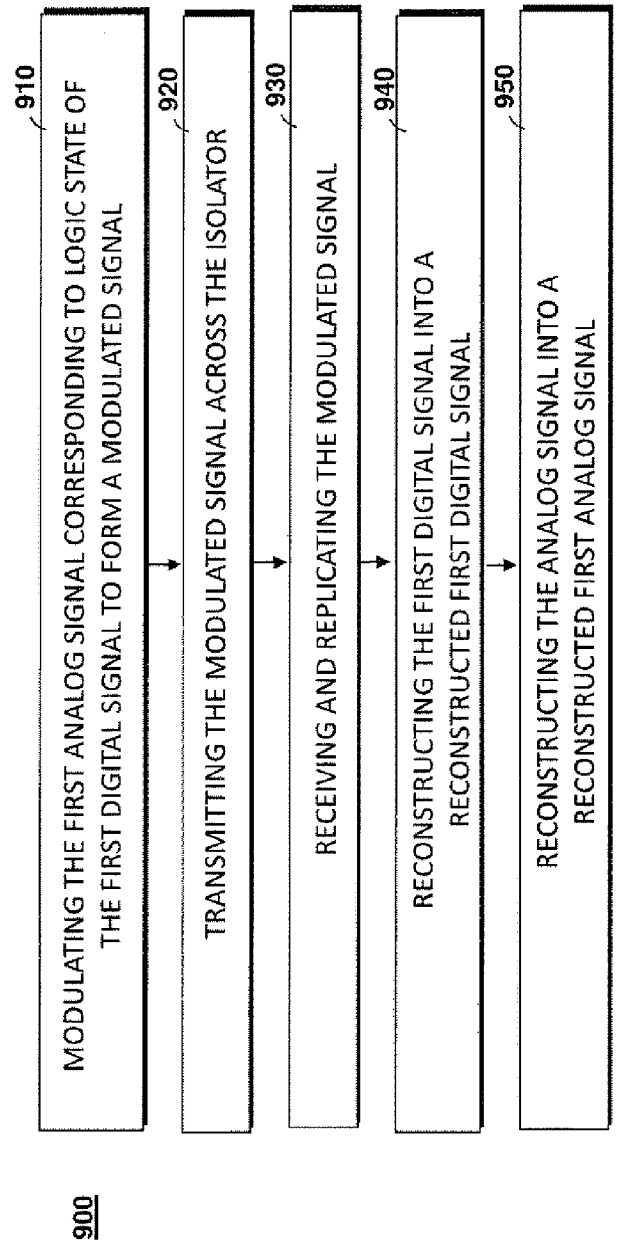
FIG. 18 shows an embodiment illustrating a method for conveying a first digital signal and a first analog signal across an isolator.

FIG. 18 shows a flow chart illustrating a method 900 for conveying a first digital signal and a first analog signal across an isolator. The method 900 may be related to the previously presented embodiments. In step 910, the first analog signal may be modulated corresponding to logic state of the first digital signal to form a modulated signal. As explained in FIGS. 2, 3, 10 and 11A, the first analog signal may be modulated through pulse width modulation, whereas the first digital signal may be modulated through frequency modulation. However, other type of modulation may be possible.

This may be followed by step 920 in which the modulated signal may be transmitted across the isolator. In step 930, the modulated signal may be received and may be reproduced into a reproduced modulated signal. Then the method 900 may proceed to step 940 in which the first digital signal from the reproduced modulated signal may be reconstructed into a reconstructed first digital signal. Step 940 may be implemented using a frequency discriminator to reconstruct the first digital signal according to the frequency detected. In step 950 which may be performed in parallel or after step 940, the analog signal may be reconstructed from the reproduced modulated signal into a reconstructed first analog signal. The analog signal may be reconstructed by using a charge pump circuit to charge and discharge a capacitor in accordance with pulse width of the modulated signal. The charge pump circuit may be configured to generate a charging current generated in accordance with the logic state of the reconstructed first digital signal. Alternatively, the reconstructed first analog signal may be formed using a filtering circuit.

Figure 19:
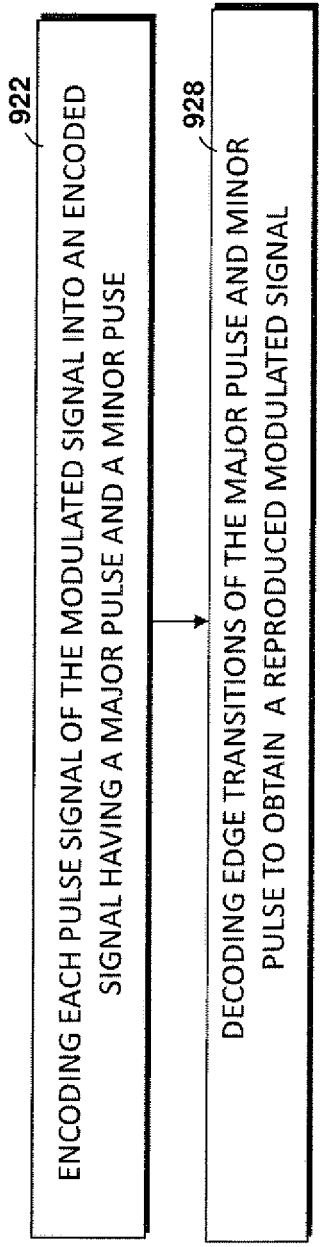
FIG. 19 shows an embodiment illustrating a method for encoding and decoding a signal.

Optionally, step 910 of the method 900 may comprise modulating the first analog signal corresponding to logic state of the first digital signal and a second digital signal, whereas step 940 may comprise reconstructing the second digital signal from the reproduced modulated signal into a reconstructed second digital signal. In addition, the method 900 may further comprise steps 922 and 928 shown in FIG. 19 between steps 920 and 930 to increase accuracy of the signal. In step 922, each pulse of the modulated signal may be encoded into an encoded signal encoding each pulse of the modulated signal into a major pulse and a minor pulse with the major pulse having pulse duration substantially longer than pulse duration of the minor pulse. In step 928, the modulated signal may be reproduced by decoding edge transitions of the major pulse and the minor pulse to obtain the reproduced modulated signal.

Figure 20:
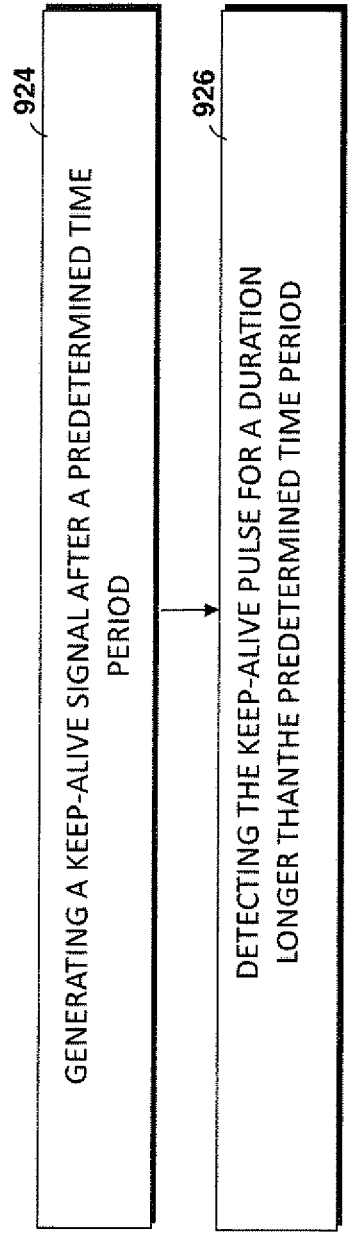
FIG. 20 shows an embodiment illustrating a method for conveying keep-alive pulses.

Alternatively, the method 900 may further comprise steps 924 and 926 shown in FIG. 20 between steps 922 and 928 to incorporate fault prevention. Referring to FIG. 20, in step 924, a keep-alive pulse may be generated after a predetermined time period. In step 926, the keep-alive pulse may be detected for duration longer than the predetermined time period. If there is any missing keep-alive pulse, the decoder may be configured to initiate a fault signal, or initiate fault prevention steps accordingly such as initiating a shut down sequence.

Figure 21A:
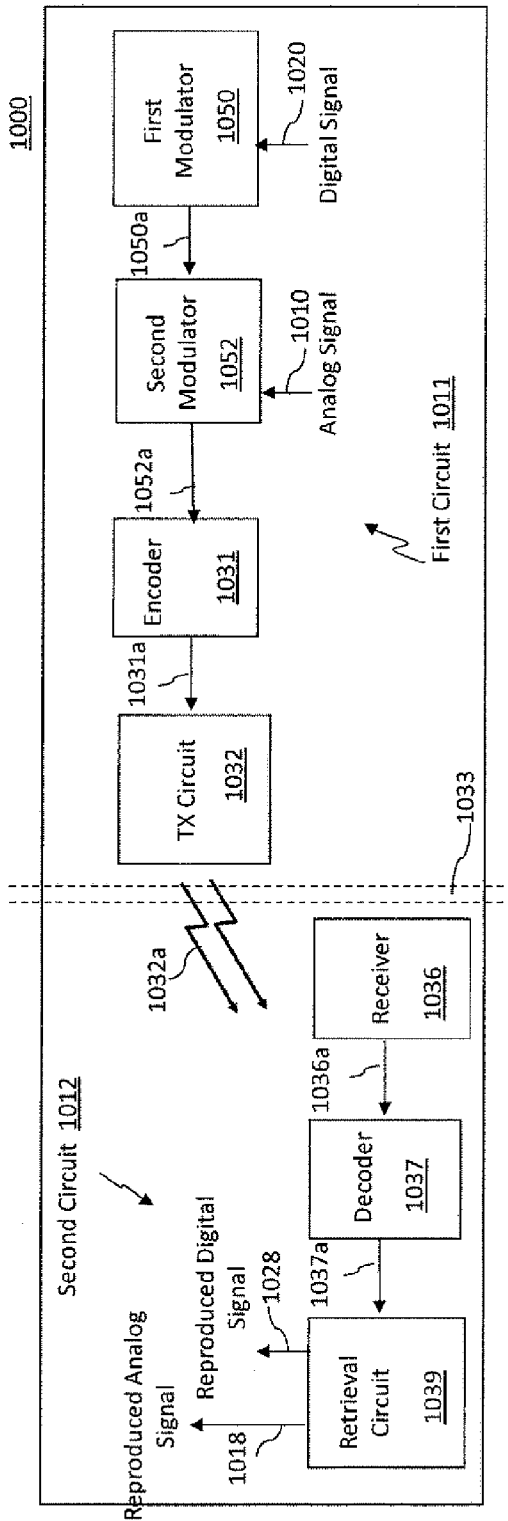
FIG. 21A shows a block diagram illustrating a modulation scheme of an isolation system.

FIG. 21A shows a block diagram illustrating a modulation scheme of an isolation system 1000. The modulation scheme of the isolation system 1000 may be substantially applicable to the previously illustrated embodiments such as the embodiments shown in FIG. 8, FIG. 9, FIG. 10, FIG. 11A, FIG. 13A, FIG. 14, FIG. 15 and FIG. 16. The isolation system 1000 may comprise a first circuit 1011 having at least an analog signal 1010 and a digital signal 1020, and a second circuit 1012 being proximate to but distanced away from the first circuit 1011. An isolation material 1033 may be configured to electrically isolate the first circuit 1011 from the second circuit 1012. For example, in one embodiment, at least a portion of the first circuit 1011 and the second circuit 1012 may be integrated into two separate semiconductor dies, such as the dies 6208 and 6210 shown in FIG. 13B that are packaged in a same housing. However, the two semiconductor dies 6208 and 6210 may not be in direct contact and may be distanced away from each other as shown in FIG. 13B. The isolation material 1033 may be the material forming the body of the housing that electrically isolates the first circuit 1011 and the second circuit 1012. An example of the die implementation may be substantially similar to embodiment shown in FIG. 13B.

The first circuit 1011 may comprise a first modulator 1050 and a second modulator 1052. The first modulator 1050 may be configured to modulate one of the analog signal 1010 and the digital signal 1020 to form a first modulated signal 1050*a* as output of the first modulator 1050. The first modulator 1050 may comprise a frequency modulation circuit configured to perform frequency modulation. An example of circuit implementation of frequency modulation may be the wave generator 450 shown in FIG. 11A. In the example shown in FIG. 11A, the wave generator 450 may be configured to generate wave signal or periodic signal in a first frequency when the digital signal 1020 is in a first state, and configured to generate the wave signal in a second frequency when the digital signal is in a second state. The first frequency may be substantially different from the second frequency. The first frequency may be at least two or three times the second frequency. In another embodiment, the first frequency may be less than half or one third of the second frequency.

Figure 21B:
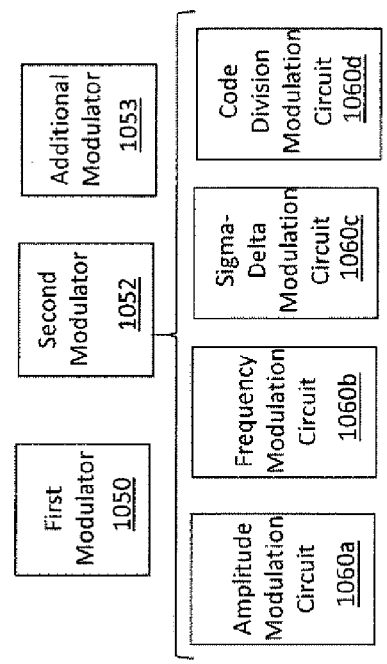
FIG. 21B shows a block diagram illustrating candidates of modulation circuit.

The first modulator 1050 may employ other modulation schemes such as code division modulation, sigma delta modulation, amplitude modulation, or other similar modulation schemes. As shown in FIG. 21B, the first modulator 1050 may comprise an amplitude modulation circuit 1060*a*, a frequency modulation circuit 1060*b*, a sigma-delta modulation circuit 1060*c*, a code division modulation circuit 1060*d* or other modulation circuits according to the modulation schemes. In addition, the drawings in FIG. 21A shows that the first modulator 1050 operates in accordance with a digital signal 1020. However, in other embodiments, the first modulator may be employed to modulate the analog signal 1010. The digital signal 1020 may be a single bit, or a multiple-bit digital signal.

Similarly, the second modulator 1052 may be configured to modulate the other one of the analog signal 1010 and the digital signal 1020 with the first modulated signal 1050*a* to form a second modulated signal 1052*a* as output of the second modulator 1052. For example, in one embodiment where the first modulator 1050 is configured to modulate the digital signal 1020 into the first modulated signal 1050*a*, the first modulated signal 1050*a* may contain the digital signal 1020 in a modulated form. Subsequently, the second modulator 1052 may be configured to modulate the analog signal 1010 with the first modulated signal 1050*a* into the second modulated signal 1052*a*. Therefore, the second modulated signal 1052*a* may have the digital signal 1020 and the analog signal 1010 in modulated form.

In another embodiment where the first modulator 1050 is configured to modulate the analog signal 1010 into the first modulated signal 1050*a*, the first modulated signal 1050*a* may contain the analog signal 1010 in a modulated form. Subsequently, the second modulator 1052 may be configured to modulate the digital signal 1020 with the first modulated signal 1050*a* Therefore, the second modulated signal 1052*a* may have the digital signal 1020 and the analog signal 1010 in modulated form as well. Accordingly, regardless of the sequence of modulation, the second modulated signal 1052*a* may contain the analog signal 1010 and the digital signal 1020 in modulated forms that can be retrieved through demodulation process.

The second modulator 1052 may be coupled directly or indirectly to the first modulator 1050. The second modulator 1052 may comprise a pulse width modulation circuit (not shown) configured to perform pulse width modulation in accordance with the other one of the analog signal 1010 and the digital signal 1020. An example of circuit implementation of pulse width modulation circuit may be illustrated in the embodiment shown in FIG. 11A such as the comparator 452. The pulse width modulation circuit such as the comparator 452 shown in FIG. 11A may be electrically coupled to the first modulated signal 1050*a* (or wave signal 451 shown in FIG. 11A), and the other one of the analog signal 1010 and the digital signal 1020 as inputs either directly or indirectly. The pulse width modulation circuit such as the comparator 452 shown in FIG. 11A may be configured to generate the second modulated signal 1052*a* as output.

The second modulator 1052 may comprise modulation circuits according to the modulation schemes employed. As shown in FIG. 21B, the second modulator 1052 may comprise an amplitude modulation circuit 1060*a*, a frequency modulation circuit 1060*b*, a sigma-delta modulation circuit 1060*c*, a code division modulation circuit 1060*d* or other modulation circuits according to the modulation schemes. For example, in another embodiment, the second modulator 1052 may comprise a sigma delta modulation circuit 1060*c* configured to perform sigma delta modulation in accordance with the other one of the analog signal 1010 and the digital signal 1020.

Optionally, the isolation system 1000 may comprise an encoder 1031 and a decoder 1037. The second modulated signal 1052a may comprise a plurality of pulses. The encoder 1031 may be coupled directly or indirectly to the second modulator 1052 so as to receive the second modulated signal 1052a as input either directly or indirectly, and convert each pulse of the second modulated signal 1052a into an encoded signal 1031a as output having a major pulse and a minor pulse respectively. The decoder 1037 residing in the second circuit 1012 may be configured to reproduce the second modulated signal 1052a from the major pulse and the minor pulse of the encoded signal 1031a.

The isolation system 1000 may comprise a transmitting circuit 1032 residing within the first circuit 1011. The transmitting circuit 1032 may be configured to generate a transmission signal 1032a that corresponds to the analog signal 1010 and the digital signal 1020. The transmission signal 1032a may be substantially similar to the second modulated signal 1052a or a second modulated signal 1052a that may have been further encoded or modulated. The transmission signal 1032a may have the analog signal 1010 and the digital signal 1020 in a transformed form similar to the second modulated signal 1052a. The transmitting circuit 1032 may be configured to transmit the transmission signal 1032a across the isolation material 1033 from the first circuit 1011 to the second circuit 1012. The transmitting circuit 1032 may be coupled to the second modulator 1052 directly, or may be coupled to the second modulator 1052 indirectly through other circuits such as the encoder 1031 as shown in FIG. 21A.

In the embodiment shown in FIG. 21A, the transmitting circuit 1032 may be coupled to the encoder 1031 such that the encoder 1031 provides its output as input to the transmitting circuit 1032. The transmitting circuit 1032 may be configured to transmit the encoded signal 1031a across the isolation material 1033 to the second circuit 1012. An example of waveforms of encoded signal 1031a may be shown in FIGS. 11B and 11C that may be formed correspond to the analog signal 1010 and the digital signal 1020.

The transmitting circuit 1032 may comprise at least an emitter such as the emitter 4351 shown in FIG. 11L. The emitter may be configured to generate the transmission signal 1032a. The transmission signal 1032a may be in a form of electric field, light, electro-magnetic radiation, magnetic field or other radiation form suitable to convey signal across the isolation material 1033. Depending on the isolation technology, the transmitting circuit 1032 may be integrated into two or more semiconductor dies. For example, as shown in FIG. 13B, the transmitting circuit 1032 may comprise a transmitter 634 in one semiconductor die 6206, and an emitter 6208 implemented in another separate semiconductor die.

The isolation system 1000 may further comprise a receiver 1036 and a retrieval circuit 1039 residing within the second circuit 1012. The receiver 1036 may be configured to detect the transmission signal 1032a and reproduce as output, a reproduced transmission signal 1036a. The receiver 1036 may be coupled to an optional decoder 1037 as shown in FIG. 21A to produce a decoded signal 1037a. The retrieval circuit 1039 may be configured to reconstruct the digital signal 1020 and the analog signal 1010 from the reproduced transmission signal 1036a or the decoded signal 1037a into a reproduced digital signal 1028 and a reproduced analog signal 1018 respectively. The retrieval circuit 1039 may comprise demodulation circuits (not shown) so as to reproduce the analog signal 1010 and the digital signal 1020.

The reproduced signals such as the reproduced digital signal 1028, the reproduced analog signal 1018, reproduced transmission signal 1036a, or the decoded signal 1037a may contain similar or identical information relative to the respective source signals but may appear in other form. For example, the reproduced analog signal 1018 may be in digital form with series of digital number representative of the analog signal 1010. The reproduced analog signal 1018 may differ from the analog signal 1010 for the reason that the reproduced analog signal 1018 is in digital form but the analog signal 1010 is in analog form. In another embodiment, the reproduced analog signal 1018 may be in analog form similar to the original analog signal 1010, but the reproduced analog signal 1018 may have a different voltage range (e.g., larger or smaller than the analog signal 1010). In yet another embodiment, both the original analog signal 1010 and the reproduced analog signal 1018 may be in analog form, but may differ in that the original analog signal 1010 is a voltage signal whereas the reproduced analog signal 1018 is a current signal, or vice versa.

The isolation system 1000 may comprise further additional modulator (not shown) in addition to the first modulator 1050 and the second modulator 1052. An example of an isolation system 1000 having additional modulator 1153 is illustrated in an isolation system 1100 shown in FIG. 22A. The additional modulator 1153 (e.g., also referred to herein as a third modulator 1153) may employ modulation schemes different from the first and second modulators 1150, 1152 and may comprise an amplitude modulation circuit 1060a, a frequency modulation circuit 1060b, a sigma-delta modulation circuit 1060c, and/or a code division modulation circuit 1060d as shown in FIG. 21B. The isolation system 1100 may comprise a first modulator 1150, a second modulator 1152, an encoder 1131, a transmitting circuit 1132, a receiver 1136, and a decoder 1137. The isolation system 1100 may operate in a substantially similar manner compared to the isolation system 1000. For example, the first modulator 1150 may be configured to modulate one of a digital signal 1120 and an analog signal 1110 to generate a first modulated signal 1150a. The first modulated signal 1150a may be coupled to the second modulator 1152. The second modulator 1152 may be configured to modulate the other one of the digital signal 1120 and the analog signal 1110 so as to generate a second modulated signal 1152a.

In addition, the isolation system 1100 may comprise at least an additional block such as a third modulator 1153 that may be coupled to the second modulator 1152 so as to receive the second modulated signal 1152a. The third modulator 1153 may be configured to modulate the second modulated signal 1152a with an additional signal 1125 to generate a third modulated signal 1153a. In one embodiment, the third modulator 1153 may be configured to modulate the additional signal 1125 with the second modulated signal 1152a and configured to produce the third modulated signal 1153a as output of the third modulator 1153. The encoder 1131 may be coupled to the third modulator 1153 so as to receive the third modulated signal 1153a and convert each of a plurality of pulse signal of the third modulated signal 1153a into a major pulse and a minor pulse as shown in FIG. 11A, FIG. 12, FIG. 13 and FIG. 21A.

The additional signal 1125 may be in digital or analog form. For example, in one embodiment where the additional signal 1125 is in analog form, the third modulator 1153 may comprise an amplitude modulation circuit (not shown) configured to modulate the second modulated signal 1152a in accordance with the additional signal 1125. In yet another embodiment, the third modulator 1153 may comprise a sigma delta modulation circuit (not shown) configured to modulate the second modulated signal 1152a in accordance with the additional signal 1125. The third modulator 1153 may comprise other modulation circuits shown in FIG. 21B using other modulation schemes.

The modulation process by any of the first modulator 1150, the second modulator 1152, the third modulator 1153 or any other modulator may add modulation noise and noise from other sources to the modulated signals 1150a, 1152a, 1153a respectively. Generally, the analog signal 1110 may be more susceptible to modulation noise compared to the digital signal 1120. Analog signals with higher precision may be more susceptible to modulation noise compared to analog signals with lower precision. For example, a 16-bit analog signal that requires sixteen bits accuracy may be more susceptible to noise compared to a 4-bit analog signal that requires four bits accuracy.

Accordingly, the first modulator 1150, the second modulator 1152, and the third modulator 1153 may be selected carefully according to the precision of the analog signal 1110. FIG. 22B shows measurement results of an isolation system 1100 having a high-resolution second modulator 1152 employed to modulate an analog signal 1110a in the first circuit 1111. As shown in FIG. 22B, the reproduced analog signal 1118a in second circuit 1112 may have noise after transmission. However, the signal to noise ratio may be within an acceptable range. This may not be the case when a low-resolution second modulator 1152 is used as shown in measurement results shown in FIG. 22C. FIG. 22C shows measurement results of an isolation system 1100 having a low-resolution second modulator 1152 employed to modulate an analog signal 1110b in a first circuit 1111. As shown in FIG. 22C, the reproduced analog signal 1118b in second circuit 1112 may have noise beyond acceptable level after transmission across the isolation material 1133.

Circuit implementation of the isolation system 1100 will require relatively less silicon area and be less complicated, if the additional signal 1125 is in digital form. If both the additional signal 1125 and the analog signal 1110 are high precision analog signals, the circuit implementation of the isolation system 1100 into silicon dies may require more silicon area. However, if only one of the additional signal 1125 and the analog signal 1110 is a high precision analog signal, circuit implementation of the isolation system 1100 into silicon dies may be relatively more straightforward without adding much die size.

Figure 22D:
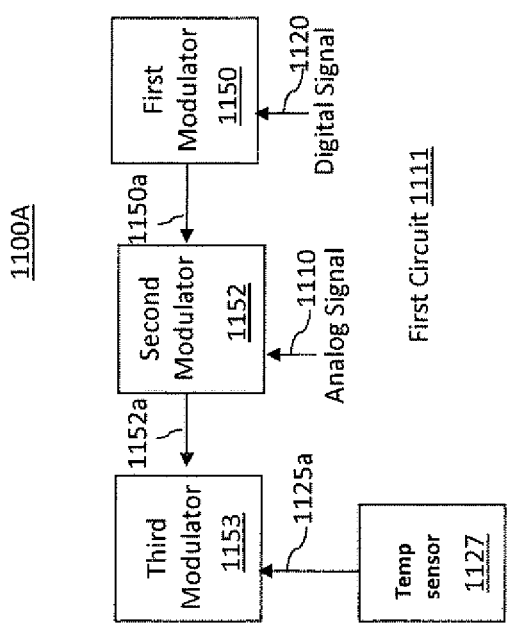
FIG. 22D illustrates an arrangement of the isolation system having a low precision modulator coupled with a high precision modulator.

FIG. 22D illustrates an arrangement of the isolation system 1100A wherein the third modulator 1153 may be a low precision modulator relative to the second modulator 1152 and the first modulator 1150. In other words, the first modulator 1150 and the second modulator 1152 may have a higher precision in modulating the digital signal 1120 or the analog signal 1110 respectively compared to the third modulator 1153. For example, the first modulator 1150 may be configured to modulate at least four-bit of digital signal 1120, whereas the second modulator 1152 may be configured to modulate an analog signal with precision of at least eight-bit accuracy. The third modulator 1153 may be configured to modulate the additional signal 1125 with precision up to three-bit accuracy in either digital or analog form.

As shown in the embodiment in FIG. 22D, the first circuit 1111 may comprise a temperature sensor 1127 configured to generate a temperature signal 1125a. The third modulator 1153 may be coupled to the temperature sensor 1127 that may be configured to produce the temperature signal 1125a having less than three-bit accuracy. The isolator system 1100A may form a portion of a direct current to direct current converter feedback regulation control system such as the direct current to direct current converter feedback regulation control system 708 shown in FIG. 16. The temperature sensor 1127 may be used to sense the IGBT 7124 (See FIG. 16) temperature during operation of the direct current to direct current converter feedback regulation control system 708. An example of circuit implementation of temperature sensing in the direct current to direct current converter feedback regulation control system 708 is shown in FIG. 23.

Figure 23:
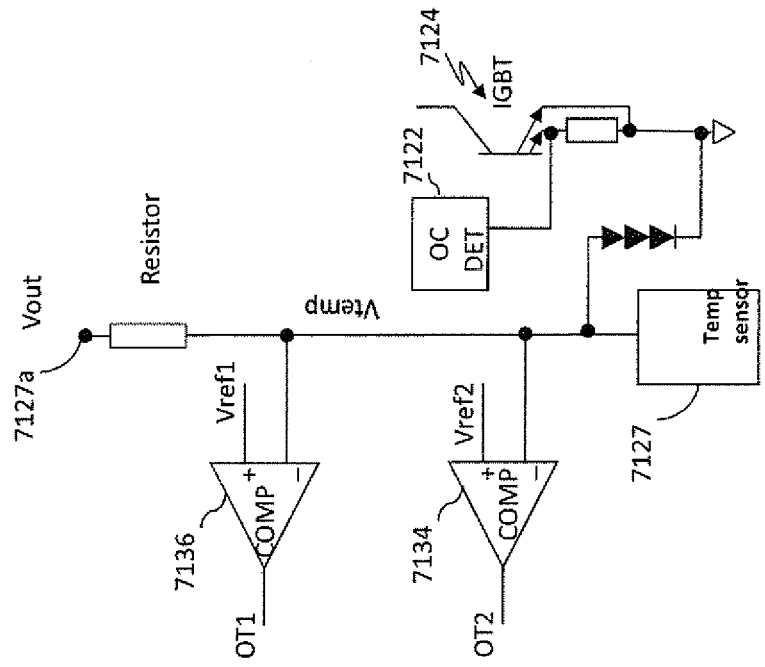
FIG. 23 shows an embodiment illustrating a circuit diagram of a temperature sensor.

The circuit diagram shown in FIG. 23 illustrates only relevant portions of the direct current to direct current converter feedback regulation control system 708 showing the IGBT 7124 and the temperature sensor circuit 7127. Referring to FIG. 16 and FIG. 23, the temperature sensor 7127 may be configured to generate an analog temperature signal Vout, 7127a. If the temperature is too high, the IGBT 7124 may need to be shut down. However, the controller 7004 residing in the second circuit 712 (See FIG. 16) may not need the full analog temperature signal 7127a. Comparators 7134 and 7136 may be added near the IGBT 7124 to sense discrete temperature point. Instead of transmitting the entire high precision temperature signal 7127a, a much reduced low precision temperature signal OT1, OT2 may be transmitted over to the second circuit 712 using a lower precision modulators such as the third modulator 1153 illustrated in FIG. 22D. The low precision temperature signal OT1, OT2 may be obtained using comparators 7134 and 7136 as illustrated in FIG. 23. In another embodiment, the temperature sensor 7127 may be a low precision sensor configured to produce the temperature signal 7127a having less than three bit precision in which the low precision temperature signal 7127a is transmitted through a low precision modulator.

Figure 24:
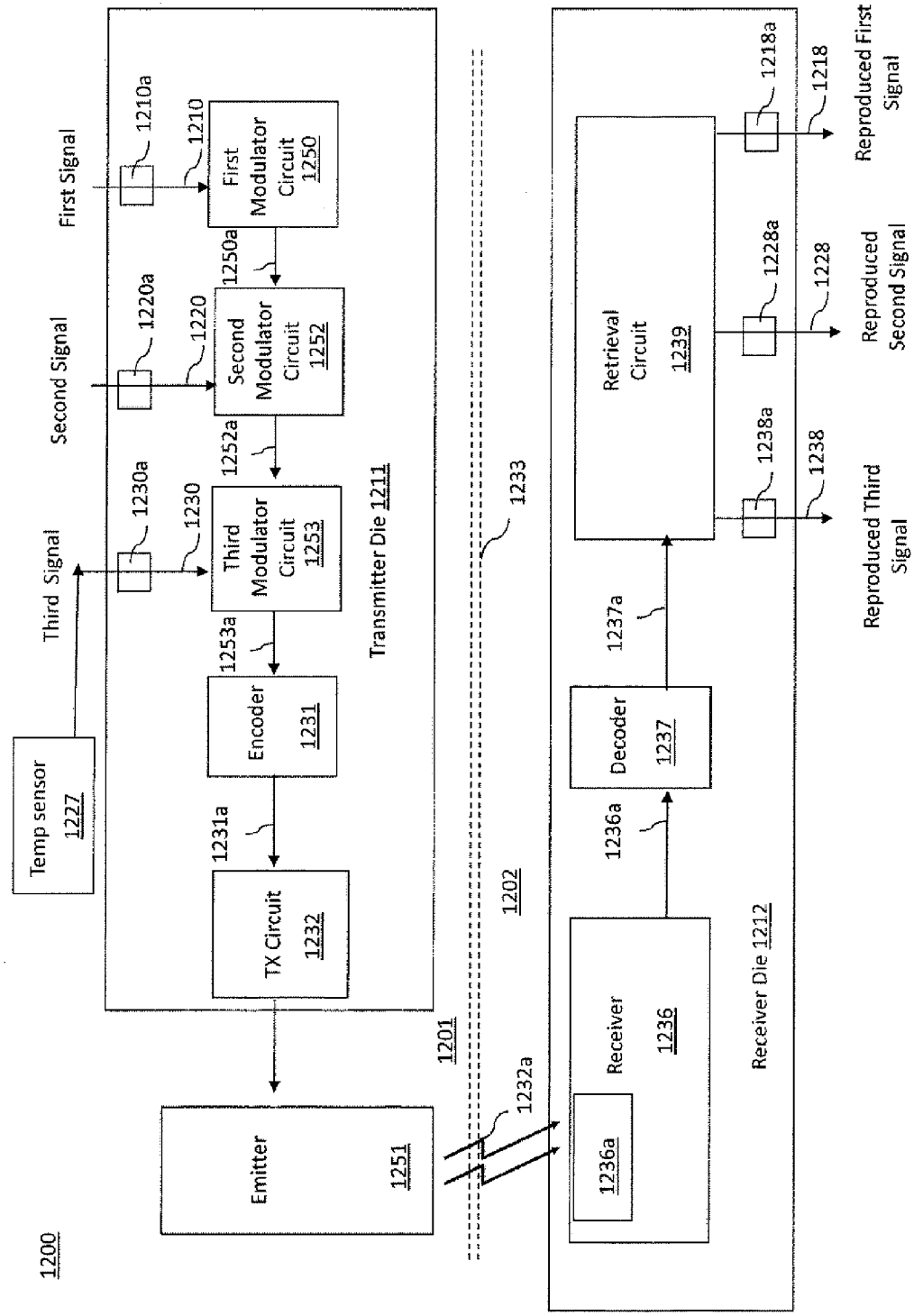
FIG. 24 shows embodiment illustrating a block diagram of an isolator.

FIG. 24 shows embodiment illustrating a block diagram of an isolator 1200. The isolator 1200 may be adapted to convey a first signal 1210 and a second signal 1220 from a first circuit 1201 to a second circuit 1202 isolated from the first circuit 1201. The isolator 1200 may comprise a transmitter die 1211, a receiver die 1212, and an isolation material 1233. The transmitter die 1211, the receiver die 1212, and the isolation material 1233 may be housed in a semiconductor package where the isolation material 1233 is configured to electrically isolate the transmitter die 1211 from the receiver die 1212. In one embodiment, the isolation material 1233 may surround the transmitter die 1211 so as to electrically isolate the transmitter die 1211 from the receiver die 1212.

The transmitter die 1211 may have input terminals 1210a, 1220a configured to receive the first signal 1210 and the second signal 1220 respectively. The receiver die 1212 may have output terminals 1218a, 1228a configured to output a reproduced first signal 1218 and a reproduced second signal 1228 respectively. The transmitter die 1211 may comprise a first modulator circuit 1250 and a second modulator circuit 1252. The first modulator circuit 1250 and the second modulator circuit 1252 may be configured to receive the first signal 1210 and the second signal 1220 respectively, either directly or indirectly. The first modulator circuit 1250 may be configured to generate a first modulated signal 1250a that is modulated in accordance with the first signal 1210 as output of the first modulator circuit 1250. The second modulator circuit 1252 may be configured to modulate the second signal 1220 with the first modulated signal 1250a to generate a second modulated signal 1252a as output of the second modulator circuit 1252.

In one embodiment, the first modulator circuit 1250 may be formed within the transmitter die 1211 and may be coupled to the input terminal 1210a so as to receive the first signal 1210. Similarly, the second modulator circuit 1252 may be formed within the transmitter die 1211 and may be coupled to the input terminal 1220a so as to receive the second signal 1220.

The isolator 1200 may further comprise an emitter 1251 configured to generate a transmission signal 1232*a* that correspond to the first signal 1210 and the second signal 1220. For example, the transmission signal 1232*a* may be substantially similar to the second modulated signal 1252*a* in which the first signal 1210 and the second signal 1220 may had been modulated. Similarly, the transmission signal 1232*a* may be substantially similar to the second modulated signal 1252*a* that may be further encoded or modulated in subsequent blocks located after the second modulator circuit 1252 but prior to the transmission circuit 1232. The transmission circuit 1232 may be a driver configured to drive the emitter 1251.

The emitter 1251 may be configured to transmit the transmission signal 1232*a* across the isolation material 1233 to the receiver die 1212. Depending on the technology, the emitter 1251 may be implemented integrally with the transmitter die 1211, or alternatively, as shown in FIG. 24, the emitter 1251 may be implemented as a separate die. The receiver die 1212 may comprise a receiver 1236 configured to detect the transmission signal 1232*a* and generate the reproduced first signal 1218 and the reproduced second signal 1228. Alternatively, the receiver die 1212 may comprise a retrieval circuit 1239 coupled directly or indirectly to the receiver 1236 to generate the reproduced first signal 1218 and the reproduced second signal 1228. In another embodiment, the retrieval circuit 1239 may be part of the receiver 1236, and therefore, the reproduced first signal 1218 and the reproduced second signal 1228 may be generated within the receiver 1236.

Optionally the isolator 1200 may comprise a third modulator circuit 1253, an encoder 1231, and a decoder 1237. The third modulator circuit 1253 and the encoder 1231 may be formed within the transmitter die 1211. The decoder 1237 may be formed within the receiver die 1212. The third modulator circuit 1253 may be configured to modulate the second modulated signal 1252*a* in accordance with a third signal 1230 to produce a third modulated signal 1253*a*. The decoder 1237 may be configured to convert the major pulse and the minor pulse generated by the encoder 1231 into a decoded pulse signal 1237*a*.

In the embodiment shown in FIG. 24, the receiver 1236 may reproduce the transmission signal 1232*a* into a received signal 1236*a*. The received signal 1236*a* may be substantially similar to the transmission signal 1232*a* but may be in other form. For example, the received signal 1236*a* may be a digital form electrical signal or an analog form of electrical signal instead of a radiation of light, magnetic field, electric field or any other form of radiation.

Optionally, the transmitter die 1211 of the isolator 1200 may further comprise a third input terminal 1230*a* that may be coupled to a low resolution temperature sensor 1227 shown in FIG. 22D. The low resolution temperature sensor 1227 may be configured to generate the third signal 1230. Optionally, the third modulator circuit 1253 may have a substantially lower resolution compared to the second modulator circuit 1252.

The encoder 1231 may be configured to convert a pulse of the third modulated signal 1253*a* or the second modulated signal 1252*a* into a major pulse and a minor pulse similar to previously discussed embodiments. However, the arrangement may be altered as deemed necessary. For example, in one embodiment, the position of the third modulator circuit 1253 and the encoder 1231 may be reversed. In other words, the third modulator circuit 1253 may be coupled to the encoder 1231, whereas the encoder 1231 may be coupled to the second modulator circuit 1252. In such arrangement, the third modulator circuit 1253 may be configured to modulate the major pulse and the minor pulse generated by the encoder 1231 in accordance with the third signal 1230.

Figure 25A:
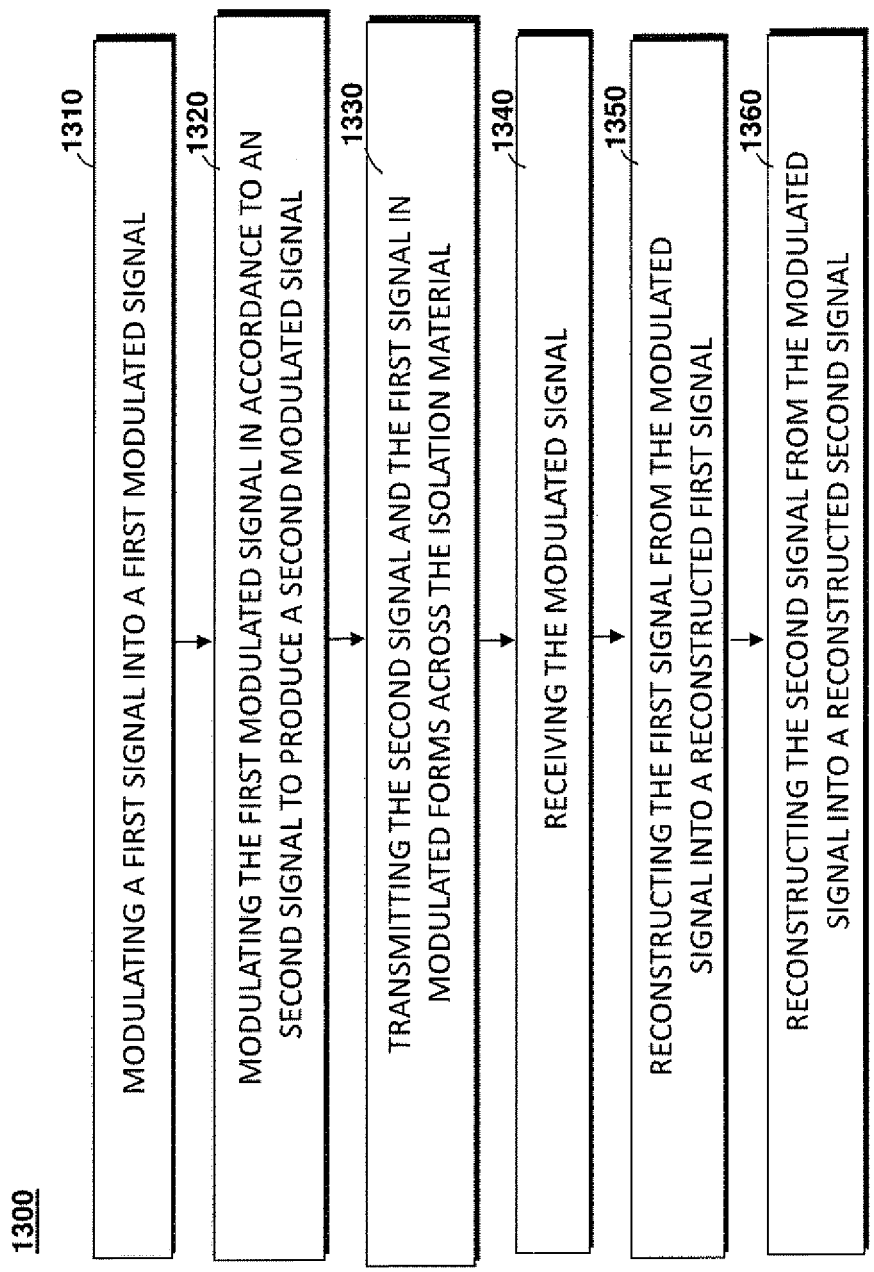
FIG. 25A shows an embodiment illustrating a method for conveying multiple signals.

FIG. 25A shows an embodiment illustrating a method 1300 for conveying a first signal and a second signal across an isolation material from a first system to a second system. In step 1310, a first signal may be modulated into a first modulated signal. In step 1320, the first modulated signal may be modulated in accordance with a second signal to produce a second modulated signal. Subsequently, in step 1330 the first signal and the second signal may be transmitted across the isolation material as a radiation signal, which is received in step 1340. In step 1350, the first signal may be reconstructed from the radiation signal into a reconstructed first signal. In step 1360, the second signal from the radiation signal may be reconstructed into a reconstructed second signal. The reconstructed first and second signals may appear in different form compared to the first and second signals respectively. However, the reconstructed first and second signals may carry substantially similar information as the first signal and second signal respectively.

Figure 25B:
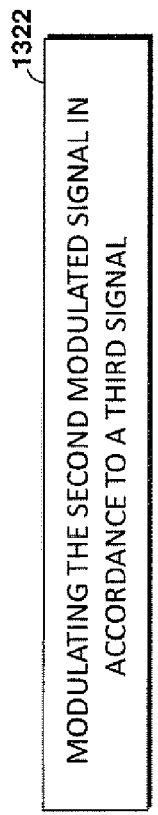
FIGS. 25B-25D illustrate optional steps of the method shown in FIG. 25A.
Figure 25C:
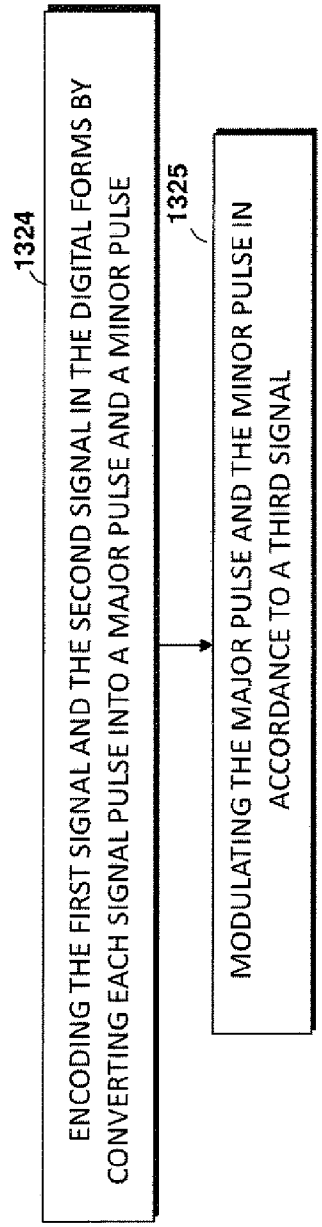
Figure 25D:
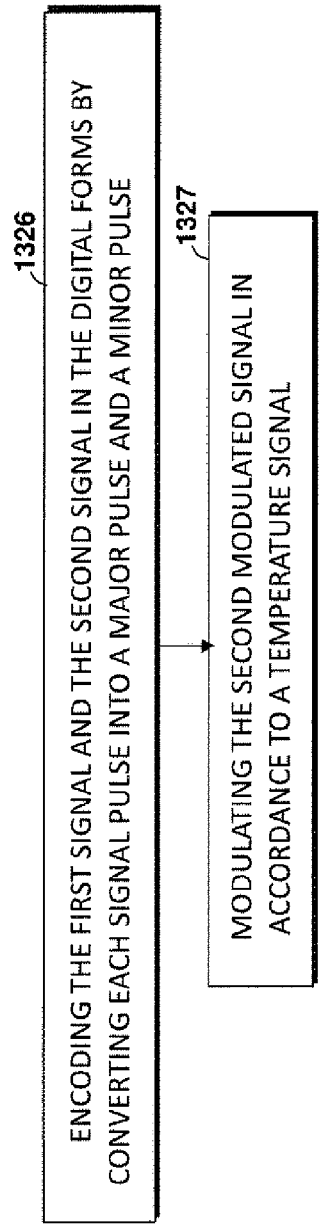

FIGS. 25B-25D illustrate optional steps of the method shown in FIG. 25A. For example, step 1322 shown in FIG. 25B that may be performed after step 1320, the second modulated signal may be modulated in accordance with a third signal. Similarly, the step 1320 may be followed by step 1324 and step 1325 shown in FIG. 25C in which one of the first modulated signal and the second modulated signal may be encoded by converting each signal pulse into a major pulse and a minor pulse. Subsequent to the step 1324, the major pulse and the minor pulse may be modulated in accordance with a third signal in step 1326. FIG. 25D shows steps 1326 and 1327 that may take place after step 1320. In step 1326, a temperature signal indicative of a temperature reading of the first system may be generated. Next, in step 1327, the second modulated signal may be modulated in accordance with the temperature signal.

Figure 26:
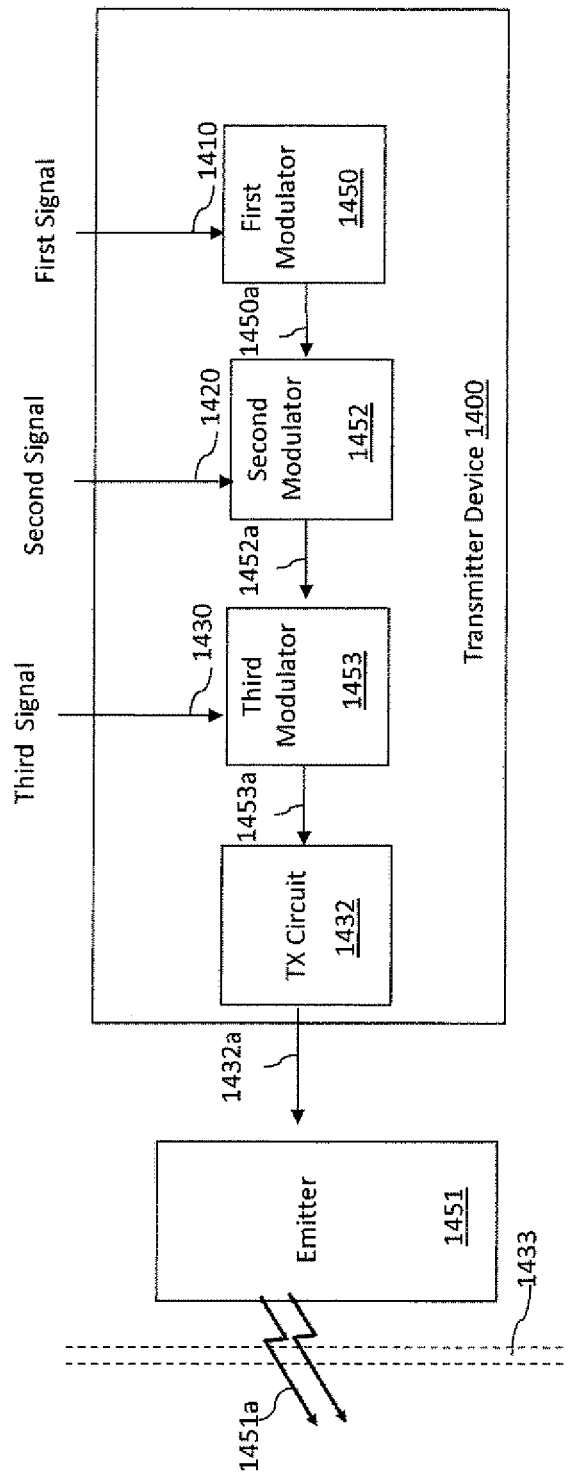
FIG. 26 shows a block diagram of an isolation transmission device.

FIG. 26 shows a block diagram of an isolation transmission device 1400. The transmission device 1400 may be adapted to transmit a first signal 1410 and a second signal 1420 across an isolation material 1433. The transmission device 1400 may comprise a first modulator 1450, a second modulator 1452, an optional third modulator 1453, and a transmitter circuit 1432. The first modulator 1450 may be configured to modulate the first signal 1410 into a first modulated signal 1450*a*. The second modulator 1452 may be configured to modulate the second signal 1420 with the first modulated signal 1450*a* so as to generate a second modulated signal 1452*a*. The optional third modulator 1453 may be configured to modulate a third signal 1430 with the second modulated signal 1452*a* into a third modulated signal 1453*a*. The transmitter circuit 1432 may be coupled directly or indirectly to the second modulator 1452 or the third modulator 1453. The transmitter circuit 1432 may be configured to generate a drive signal 1432*a* corresponding to the second modulated signal 1452*a* or the third modulated signal 1453*a* so as to drive an external emitter 1451. The external emitter 1451 may be configured to generate a radiation 1451*a* across the isolation barrier 1433. The radiation 1451*a* may not be an electrical signal. For example, the radiation may be electric field, magnetic field, light or other similar form that will enable electrical isolation with the transmission device 1400 and the emitter 1451.

Different aspects, embodiments or implementations may, but need not, yield one or more of the following advantages. For example, the size of the circuits and the pulse duration discussed in FIGS. 11A-11L and other embodiments may be advantageous for improving accuracy of the reproduction of the modulated signal. The first, second and third modulator shown in FIG. 21A and FIG. 22A, as well as the first, second and third modulator circuit shown in FIG. 24 and FIG. 26 may be advantageous for enabling transmission of multiple high precision digital or analog signals across an isolation system using a single device.

Although specific embodiments of the invention have been described and illustrated herein above, the invention should not be limited to any specific forms or arrangements of parts so described and illustrated. For example, the signal isolator may be optical isolators, magnetic isolators, capacitive isolators or any other isolators developed in future. Likewise, when a system is discussed, the discussion may be applicable to device, apparatus, circuits, or methods. The scope of the invention is to be defined by the claims appended hereto and their equivalents.

We claim:

1. An isolator system, comprising:
    a first circuit, the first circuit having an analog signal and a digital signal;
    a second circuit being proximate to but distanced away from the first circuit;
    an isolation material configured to electrically isolate the first circuit from the second circuit;
    a first modulator of the first circuit, the first modulator configured to modulate one of the analog signal and the digital signal to form a first modulated signal as output of the first modulator;
    a second modulator of the first circuit, the second modulator configured to modulate the other one of the analog signal and the digital signal with the first modulated signal to form a second modulated signal as output of the second modulator;
    a transmitting circuit of the first circuit configured to generate a transmission signal that correspond to the analog signal and the digital signal, and configured to transmit the transmission signal across the isolation material from the first circuit to the second circuit;
    a receiver of the second circuit configured to detect the transmission signal and generate a reproduced transmission signal as its output; and
    a retrieval circuit of the second circuit configured to reconstruct the digital signal and the analog signal from the reproduced transmission signal.

2. The isolator system of claim 1, wherein the first circuit further comprises a third modulator, the third modulator configured to modulate an additional signal with the second modulated signal, to produce a third modulated signal as output of the third modulator.

3. The isolator system of claim 2 wherein the third modulator comprises an amplitude modulation circuit configured to modulate the second modulated signal in accordance with the additional signal.

4. The isolator system of claim 2 wherein the third modulator comprises a sigma delta modulation circuit configured to modulate the second modulated signal in accordance with the additional signal.

5. The isolator system of claim 2, wherein the second modulator has a higher precision in modulating analog signals as compared to the third modulator.

6. The isolator system of claim 2, wherein the third modulator is configured to modulate analog signals with precision of at least three-bit accuracy.

7. The isolator system of claim 2, wherein the second modulator is configured to modulate analog signals with precision of at least eight-bit accuracy.

8. The isolator system of claim 2, wherein the first circuit comprises a temperature sensor configured to generate a temperature signal.

9. The isolator system of claim 8 wherein the temperature sensor is a low precision sensor configured to produce the temperature signal having less than three-bit precision.

10. The isolator system of claim 8, wherein the temperature signal of the temperature sensor is coupled to the third modulator as an input to the third modulator either directly or indirectly.

11. The isolator system of claim 2 wherein the first circuit further comprises an encoder circuit coupled to the third modulator, and wherein the encoder circuit is configured to convert a pulse signal into a major pulse and a minor pulse.

12. The isolator system of claim 1, wherein the isolator system forms a portion of a direct current to direct current converter feedback regulation control system.

13. The isolator system of claim 1, wherein the first modulator comprises a wave generator circuit configured to generate a wave signal.

14. The isolator system of claim 13, wherein the wave generator circuit is configured to generate the wave signal in a first frequency when the one of the analog signal and the digital signal is in a first state and is configured to generate the wave signal in a second frequency when the one of the analog signal and the digital signal is in a second state, wherein the first frequency is different from the second frequency.

15. The isolator system of claim 1, wherein the first modulator comprises a frequency modulation circuit configured to perform frequency modulation.

16. The isolator system of claim 1, wherein the second modulator comprises a comparator electrically coupled to the first modulated signal, and the other one of the analog signal and the digital signal, and wherein the comparator is configured to generate the second modulated signal as output.

17. The isolator system of claim 1, wherein the second modulator comprises a pulse width modulation circuit configured to perform pulse width modulation in accordance to the other one of the analog signal and the digital signal.

18. The isolator system of claim 1, wherein the first modulator comprises a code division modulation circuit configured to perform code division modulation in accordance with the one of the analog signal and the digital signal.

19. The isolator system of claim 1, wherein the second modulator comprises a sigma delta modulation circuit configured to perform sigma delta modulation in accordance with the other one of the analog signal and the digital signal.

20. The isolator system of claim 1, wherein:
    the second modulated signal comprises a plurality of pulses; and
    the first circuit comprises an encoder configured to encode each pulse of the second modulated signal into an encoded signal having a major pulse and a minor pulse respectively.

21. The isolator system of claim 20, wherein the transmitting circuit is coupled to the encoder, and the transmitting circuit is configured to transmit the encoded signal across the isolation material to the second circuit.

22. The isolator system of claim 21, wherein the second circuit comprises a decoder configured to reproduce the second modulated signal from the major pulse and the minor pulse of the encoded signal.

23. An isolator adapted to convey a first signal and a second signal from a first circuit to a second circuit isolated from the first circuit, the isolator comprising:
    a transmitter die having input terminals configured to receive the first signal and the second signal;

a receiver die having output terminals configured to output a reproduced first signal and a reproduced second signal;

an isolation material surrounding the transmitter die so as to electrically isolate the transmitter die from the receiver die;

a first modulator circuit formed within the transmitter die, the first modulator circuit being configured to receive the first signal and generate a first modulated signal that is modulated in accordance with the first signal as output of the first modulator circuit;

a second modulator circuit formed within the transmitter die, the second modulator circuit being configured to modulate the second signal with the first modulated signal to form a second modulated signal as output of the second modulator circuit;

an emitter configured to generate a transmission signal that correspond to the first signal and the second signal, and configured to transmit the transmission signal across the isolation material from the transmitter die to the receiver die; and a receiver of the receiver die configured to detect the transmission signal and reproduce as output to the receiver, the reproduced first signal and the reproduced second signal.

24. The isolator of claim 23 further comprising a third modulator circuit formed within the transmitter die, wherein the third modulator circuit is configured to modulate the second modulated signal in accordance with a third signal to produce a third modulated signal.

25. The isolator of claim 24 further comprising an encoder circuit formed within the transmitter die, wherein the encoder circuit is configured to convert a pulse of the third modulated signal into a major pulse and a minor pulse.

26. The isolator of claim 25 further comprising a decoder circuit formed within the receiver die, wherein the decoder circuit is configured to convert the major pulse and the minor pulse generated by the encoder circuit into a reproduced pulse signal.

27. The isolator of claim 24, wherein the transmitter die further comprises a third input terminal configured to be coupled to a low resolution temperature sensor, wherein the low resolution temperature sensor is configured to generate the third signal.

28. The isolator of claim 24, wherein the third modulator circuit has a substantially lower resolution compared to the second modulator circuit.

29. The isolator of claim 23, further comprising an encoder circuit formed within the transmitter die, wherein the encoder circuit is configured to convert a pulse of the second modulated signal into a major pulse and a minor pulse.

30. The isolator of claim 29 further comprising a third modulator circuit coupled to the encoder circuit, wherein the third modulator circuit is configured to modulate the major pulse and the minor pulse in accordance with a third signal.

31. A method for conveying a first signal and a second signal across an isolation material from a first system to a second system, the method comprising:

modulating a first signal into a first modulated signal;

modulating the first modulated signal in accordance with a second signal to produce a second modulated signal;

transmitting the first signal and the second signal across the isolation material as a radiation signal;

receiving the radiation;

reconstructing the first signal from the radiation signal into a reconstructed first signal; and reconstructing the second signal from the radiation signal into a reconstructed second signal.

32. The method of claim 31 further comprising modulating the second modulated signal in accordance with a third signal.

33. The method of claim 31, further comprising encoding one of the first modulated signal and the second modulated signal by encoding a pulse signal into a major pulse and a minor pulse.

34. The method of claim 31 further comprising generating a temperature signal indicative of a temperature reading of the first system, and modulating the second modulated signal in accordance with the temperature signal.

35. A transmitting device adapted to transmit a first signal and a second signal across an isolation material, the transmitting device comprising:

a first modulator configured to modulate the first signal into a first modulated signal;

a second modulator configured to modulate the second signal with the first modulated signal so as to generate a second modulated signal; and a transmitter circuit coupled to the second modulator configured to generate a drive signal corresponding to the second modulated signal so as to drive an external emitter.

* * * * *